United States Patent
Ohara et al.

(10) Patent No.: US 7,405,019 B2
(45) Date of Patent: Jul. 29, 2008

(54) POLYMER ELECTROLYTE FUEL CELL

(75) Inventors: Hideo Ohara, Katano (JP); Hiroki Kusakabe, Sakai (JP); Kazuhito Hatoh, Osaka (JP); Nobuhiro Hase, Mino (JP); Shinsuke Takeguchi, Osaka (JP); Takayuki Urata, Kawabe-gun (JP); Soichi Shibata, Hirakata (JP); Takeshi Tomizawa, Ikoma (JP); Eiichi Yasumoto, Soraku-gun (JP); Hideo Kasahara, Neyagawa (JP); Toshihiro Matsumoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 784 days.

(21) Appl. No.: 10/796,293

(22) Filed: Mar. 10, 2004

(65) Prior Publication Data

US 2004/0209148 A1   Oct. 21, 2004

(30) Foreign Application Priority Data

Mar. 14, 2003 (JP) ............................. 2003-070357
Mar. 14, 2003 (JP) ............................. 2003-070358

(51) Int. Cl.
*H01M 2/08* (2006.01)
*H01M 8/10* (2006.01)

(52) U.S. Cl. .............................. 429/38; 429/35; 429/30
(58) Field of Classification Search ................... 429/35, 429/38, 30
See application file for complete search history.

(56) References Cited

U.S. PATENT DOCUMENTS

| | | | |
|---|---|---|---|
| 4,756,981 A | 7/1988 | Breault et al. ................. | 429/36 |
| 5,942,347 A * | 8/1999 | Koncar et al. ................. | 429/30 |
| 6,190,793 B1 | 2/2001 | Barton et al. ................. | 429/34 |
| 6,245,453 B1 | 6/2001 | Iwase et al. ................... | 429/34 |
| 6,248,466 B1 | 6/2001 | Takahashi et al. ............. | 429/38 |
| 6,261,711 B1 | 7/2001 | Matlock et al. ............... | 429/34 |
| 6,440,597 B1 | 8/2002 | Mizuno ........................ | 429/34 |
| 6,472,094 B1 | 10/2002 | Nonoyama et al. ........... | 429/34 |
| 6,531,245 B2 | 3/2003 | Mizuno et al. ............... | 429/129 |

(Continued)

FOREIGN PATENT DOCUMENTS

EP   1223629   7/2002

(Continued)

OTHER PUBLICATIONS

European Search Report dated Jan. 31, 2007.

*Primary Examiner*—Patrick Ryan
*Assistant Examiner*—Thomas H. Parsons
(74) *Attorney, Agent, or Firm*—Dickinson Wright, PLLC

(57) ABSTRACT

A highly reliable polymer electrolyte fuel cell includes an anode-side separator plate and a cathode-side separator plate that are provided with an anode-side sealing member and a cathode-side sealing member, respectively. The anode-side and cathode-side sealing members seal the cell in cooperation with a polymer electrolyte membrane at sealing parts where the anode-side and cathode-side sealing members are opposed to each other, thereby preventing gas from leaking out of gas flow channels. One of the anode-side and cathode-side sealing members has a pointed rib that comes in contact with the sealing parts in a linear manner, and the other sealing member comes in contact with the sealing parts surface to surface.

38 Claims, 27 Drawing Sheets

U.S. PATENT DOCUMENTS

| | | |
|---|---|---|
| 6,596,427 B1 | 7/2003 | Wozniczka et al. ............ 429/32 |
| 6,602,632 B2 | 8/2003 | Wakahoi et al. ................ 429/35 |
| 6,686,083 B1 | 2/2004 | Saito et al. ..................... 429/34 |
| 2002/0102453 A1 | 8/2002 | Suenaga et al. ................ 429/37 |
| 2002/0117780 A1 | 8/2002 | Inoue et al. ................... 264/299 |
| 2003/0003342 A1 | 1/2003 | Sugita et al. ................... 429/35 |
| 2003/0082429 A1 | 5/2003 | Nishimura et al. ............. 429/35 |
| 2003/0091885 A1 | 5/2003 | Kobayashi et al. ............ 429/32 |
| 2003/0124406 A1 | 7/2003 | Ohtani et al. .................. 429/34 |
| 2003/0141672 A1 | 7/2003 | Andou et al. ................. 429/628 |
| 2003/0150162 A1 | 8/2003 | Inagaki et al. .................. 48/195 |
| 2003/0180622 A1 | 9/2003 | Tsukuda et al. .............. 429/249 |
| 2003/0235744 A1 | 12/2003 | Pflaesterer .................... 429/35 |

FOREIGN PATENT DOCUMENTS

| | | |
|---|---|---|
| JP | 2002141082 | 5/2002 |
| JP | 2002231264 | 8/2002 |

\* cited by examiner

POLYMER ELECTROLYTE FUEL CELL

BACKGROUND OF THE INVENTION

The present invention relates to polymer electrolyte fuel cells for use in portable power sources, electric vehicle power sources, domestic cogeneration systems, or the like.

A fuel cell including a polymer electrolyte membrane generates electric power and heat simultaneously by electrochemically reacting a fuel gas containing hydrogen with an oxidant gas containing oxygen, such as air. The fuel cell includes a polymer electrolyte membrane that selectively transports hydrogen ions and a pair of electrodes (anode and cathode) formed on both sides of the polymer electrolyte membrane. The electrode includes a catalyst layer formed on each side of the polymer electrolyte membrane and a gas diffusion layer formed on the outer face of the catalyst layer. The catalyst layer is composed mainly of a carbon powder carrying a platinum group metal catalyst, and the gas diffusion layer has excellent gas permeability and electronic conductivity.

Around the electrodes, gas sealing materials or gaskets are arranged so as to sandwich the polymer electrolyte membrane, in order to prevent the supplied fuel gas and oxidant gas from leaking out and mixing together. The gas sealing materials or gaskets are combined integrally with the electrodes and the polymer electrolyte membrane beforehand. This combined structure is called an electrolyte membrane-electrode assembly (MEA).

Disposed outside the MEA are conductive separator plates for mechanically securing the MEA and connecting adjacent MEAs electrically in series. The separator plates have a gas flow channel for supplying a reactive gas to the electrode surface and discharging generated gas and surplus gas. Although the gas flow channel may be provided independently of the separator plate, grooves are usually formed in the surface of the separator plate to provide the gas flow channel.

In order to supply the reactive gas to the grooves, it is necessary to use a piping jig which, depending on the number of separator plates, branches off from the supply pipe of the reactive gas into the grooves of the respective separator plates. This jig is called a "manifold," and the above-described type of manifold, connecting the supply pipe of the reactive gas with the grooves of the respective separator plates, is called an "external manifold." A manifold having a simpler structure is called an "internal manifold." The internal manifold includes through-holes that are formed in the respective separator plates with the gas flow channel. The throughholes are connected to the inlet and outlet of the gas flow channel so that the reactive gas is supplied directly from these holes to the gas flow channel.

Since the fuel cell generates heat during operation, it is necessary to cool the fuel cell with cooling water or the like, in order to keep the cell under good temperature conditions. A cooling section for flowing cooling water therein is usually provided for every group of one to three cells. The cooling section is often provided by forming a cooling water flow channel in the backside of the separator plate. The MEAs and the separator plates are alternately stacked to form a stack of 10 to 200 cells, and a current collector plate and an insulator plate are attached to each end of the cell stack. The resultant stack is sandwiched between end plates and clamped with clamping bolts from both ends. This is the structure of a typical fuel cell.

The gaskets, used in such a polymer electrolyte fuel cell, seal in gas while allowing the separator plate to contact the electrode, so the gaskets are required to have high dimensional accuracy, sufficient elasticity, and sufficient interference. To meet such requirements, sheet-like gaskets made of resin or rubber and O-rings made of rubber have been used in the related art.

Also, attempts have recently been made to decrease the load applied to the gaskets, in order to reduce the clamping load of the stack and achieve weight reduction, simplification and cost reduction of the constituent members. One such attempt is to employ gaskets having a triangular or semicircular cross section in addition to the O-ring gaskets (e.g., Japanese Laid-Open Patent Publication No. 2002-141082). Other attempts to mount the gaskets on the separator plates, not the MEAs, have also been made for ease of assembly (e.g., Japanese Laid-Open Patent Publication No. 2002-231264).

FIG. 13 is a longitudinal sectional view of the vicinity of O-ring gaskets of a related art fuel cell. O-rings 236 and 246 are fitted into O-ring grooves 236a and 246a formed in an anode-side separator plate 210 and a cathode-side separator plate 220. The O-ring 236 presses an electrolyte membrane 231 against the cathode-side separator plate 220, and the O-ring 246 presses the electrolyte membrane 231 against the anode-side separator plate 210. As a result, the gaps between the electrolyte membrane and these anode-side and cathode-side separator plates are sealed by the O-rings 236 and 246. Reference character 232a represents an anode, 232b a cathode, 212b a fuel gas flow channel, and 223b an oxidant gas flow channel.

In this way, since the sealing is performed at two locations by the O-ring gaskets, this related art sealing method has a problem of requiring a large sealing space.

Also, with internal-manifold-type separator plates, the gas sealing section extends from the manifold to the electrode section, so the electrolyte membrane needs to be large enough to cover the manifold, which leads to high costs. Further, as the membrane size increases, the handling of the membrane becomes more difficult during the assembly, because the membrane has a thickness of approximately 25 to 50 µm.

On the other hand, when the membrane size is decreased to reduce costs and improve handling and strength, the electrolyte membrane is covered with a somewhat rigid protective film. If a unit cell includes such a downsized electrolyte membrane, the thickness of the electrolyte membrane creates a difference in height around the electrodes, thereby posing a problem of degradation in sealing characteristics. Further, when the above-mentioned O-rings are used as the gaskets, it takes considerable time to fit the O-rings, which are thin and not rigid themselves, without twisting them during the assembly of the cell stack, thereby presenting a problem of high manufacturing costs.

Also, since the separator plates are made of a conductive material, inclusion of conductive foreign matter in an assembling process may lead to short-circuits between the separator plates sandwiching the MEA. Warpage or distortion of the separator plates, distortion resulting from the assembly of a fuel cell, or the like may also lead to short-circuits between the separator plates. Further, inclusion of conductive foreign matter between the assembled fuel cell and a heat insulator may lead to short-circuits.

Moreover, when the O-rings are used for sealing, a fuel cell is assembled by stacking the components of the fuel cell, for example, placing an MEA on a separator plate, and then, placing thereon another separator, or a gasket and another separator. In this assembling process, the gasket or the separator plate to be placed on the MEA is assembled along the guide pins of an assembling jig. However, since these components have dimensional errors, they cannot be assembled efficiently and successfully, unless the clearance between the gasket and the MEA is large enough to accommodate the dimensional errors. Thus, reactive gas passes through the resultant clearance between the gasket and the electrode, bypassing the gas flow channel of the separator plate.

Due to assembling errors of the MEA and the gasket and other factors, the size of the clearance between the electrode and the gasket varies from cell to cell, resulting in variations in pressure losses in the respective cells. The varied pressure losses in the respective cells cause variations in the flow rate of reactive gas, because the reactive gas flows into the respective cells of a fuel cell in amounts depending on the varied pressure losses in the respective cells. As a result, the respective cells exhibit performance variations, which involve such detrimental effects as deterioration in generated voltages, durability and low-output-operation stability, etc. These detrimental effects are remarkable on the anode side, where the reactive gas utilization is comparatively high.

Also, reducing the clearance between the gasket and the electrode requires an improvement in the accuracy of dimensions of the components, thereby inviting a decrease in yield and an increase in component costs. Further, when the clearance is reduced, the assembly of the components becomes difficult, and the assembling reliability lowers. Thus, sealing failure is caused, for example, by part of the electrode overlapping the sealing section, and a tensile stress and a shearing stress are excessively applied to the electrolyte membrane, inducing breakage of the electrolyte membrane, a decline in durability, and the like.

Recently, it has been requested to heighten the degree of humidification of the supplied gases, in order to enhance cell performance. On the oxidant gas side, water is generated by the reaction, and the water should be discharged from the electrode promptly and stably. If the clearance between the gasket and the electrode is reduced, or substantially removed, to prevent the above-described bypass of reactive gas while using the related art gasket, a large pressure is necessary for discharging the water from the electrode, inviting a problem of system efficiency degradation. Moreover, decreasing the clamping force of the sealing section is also a problem to be solved, for the purposes of weight reduction, size reduction and cost reduction of clamping members of the stack. Under such situations, there is a demand for simple and effective sealing configurations.

BRIEF SUMMARY OF THE INVENTION

An object of the present invention is to provide a highly reliable fuel cell at low costs, by using a sealing member that is compact and has excellent gas tightness, in order to solve the above-mentioned problems.

A polymer electrolyte fuel cell in accordance with the present invention includes a membrane electrode assembly, an anode-side separator plate, a cathode-side separator plate, an anode-side sealing member, and a cathode-side sealing member. The membrane electrode assembly includes a hydrogen-ion conductive polymer electrolyte membrane and an anode and a cathode sandwiching the polymer electrolyte membrane. The anode-side separator plate has a pair of fuel gas manifold apertures, a pair of oxidant gas manifold apertures, and a gas flow channel that is connected to the pair of fuel gas manifold apertures for supplying and discharging a fuel gas to and from the anode. The cathode-side separator plate has a pair of fuel gas manifold apertures, a pair of oxidant gas manifold apertures, and a gas flow channel connected to the pair of oxidant gas manifold apertures for supplying and discharging an oxidant gas to and from the cathode. The anode-side sealing member is provided on the anode-side surface of the anode-side separator plate, and the cathode-side sealing member is provided on the cathode-side surface of the cathode-side separator plate. The membrane electrode assembly is sandwiched under pressure between the anode-side and cathode-side separator plates to form a cell. The anode-side sealing member and the cathode-side sealing member seal the cell in cooperation with the polymer electrolyte membrane at sealing parts where the anode-side and cathode-side sealing members are opposed to each other, thereby preventing the fuel gas and the oxidant gas from leaking out of the fuel gas flow channel and the oxidant gas flow channel. One of the anode-side and cathode-side sealing members has a pointed rib that comes in contact with the sealing parts in a linear manner, and the other sealing member comes in contact with the sealing parts surface to surface.

In a first preferable embodiment of the present invention, the polymer electrolyte membrane has a pair of fuel gas manifold apertures and a pair of oxidant gas manifold apertures. The anode-side sealing member has a first anode-side sealing section, which surrounds the anode and the fuel and oxidant gas manifold apertures to form a closed loop, and a second anode-side sealing section, which separates the anode from the fuel and oxidant gas manifold apertures. The cathode-side sealing member has a first cathode-side sealing section, which surrounds the cathode and the fuel and oxidant gas manifold apertures to form a closed loop, and a second cathode-side sealing section, which separates the cathode from the fuel and oxidant gas manifold apertures. One of the anode-side and cathode-side sealing members has a pointed rib. The anode-side and cathode-side sealing members are sandwiched between the anode-side and cathode-side separator plates and pressed against the polymer electrolyte membrane, in such a manner that the pointed rib comes in contact with the polymer electrolyte membrane in a linear manner and the other sealing member comes in contact with the polymer electrolyte membrane surface to surface.

In a second preferable embodiment of the present invention, the polymer electrolyte membrane has a pair of fuel gas manifold apertures and a pair of oxidant gas manifold apertures. The anode-side sealing member has a first anode-side sealing section, which surrounds the anode and the fuel and oxidant gas manifold apertures to form a closed loop, and a second anode-side sealing section, which separates the anode from the oxidant gas manifold apertures. The cathode-side sealing member has a first cathode-side sealing section, which surrounds the cathode and the fuel and oxidant gas manifold apertures to form a closed loop, and a second cathode-side sealing section, which separates the cathode from the fuel gas manifold apertures. One of the anode-side and cathode-side sealing members has a pointed rib, and the anode-side and cathode-side sealing members are sandwiched between the anode-side and cathode-side separator plates and pressed against the polymer electrolyte membrane, in such a manner that the pointed rib comes in contact with the polymer electrolyte membrane in a linear manner and the other sealing member comes in contact with the polymer electrolyte membrane surface to surface.

In a third preferable embodiment of the present invention, the polymer electrolyte membrane is large enough to cover the anode and the cathode but not so large as to cover any part of the fuel and oxidant gas manifold apertures. The anode-side sealing member has a first anode-side sealing section, which surrounds the anode and the fuel gas manifold apertures to form a closed loop, and a second anode-side sealing section, which surrounds the polymer electrolyte membrane in combination with the first anode-side sealing section. The first anode-side sealing section is in contact with the polymer electrolyte membrane at the anode surrounding part. The cathode-side sealing member has a first cathode-side sealing section, which surrounds the cathode and the oxidant gas manifold apertures to form a closed loop, and a second cathode-side sealing section, which surrounds the polymer electrolyte membrane in combination with the first cathode-side sealing section. The first cathode-side sealing section is in contact with the polymer electrolyte membrane at the cathode surrounding part. The anode-side and cathode-side sealing sections correspond in position except unavoidable parts, and the anode-side and cathode-side sealing members are sandwiched between the anode-side and cathode-side separator plates and pressed against each other or the polymer electrolyte membrane at the respective sealing sections. At the pressed parts, one of the sealing members has a pointed rib that comes in contact with the polymer electrolyte membrane or the other sealing member in a linear manner, and the other sealing member comes in contact with the polymer electrolyte membrane or the one of the sealing members surface to surface.

In the third embodiment, the one of the sealing members is preferably so configured that the height of the rib, at the part of the first sealing section not in contact with the polymer electrolyte membrane, and the height of the rib at the second sealing section are greater than the height of the rib at the part of the first sealing section in contact with the polymer electrolyte membrane.

In a fourth preferable embodiment of the present invention, the rib of the one of the sealing members is, at the anode or cathode surrounding part, shaped like a wedge of which cross section is thin on the inner side and thick on the outer side.

In the fourth embodiment, the one of the sealing members is preferably the cathode-side sealing member. The cathode-side sealing member may include: (a) a first part that surrounds the oxidant gas flow channel and the pair of oxidant gas manifold apertures to form a closed loop; (b) a pair of second parts that surround each of the pair of fuel gas manifold apertures to form closed loops; and (c) third parts that connect the first part with the second part. The first part may be shaped like a wedge of which cross section is thin on the inner side and thick on the outer side, and the second parts may be shaped like a wedge of which cross section is thick on the inner side and thin on the outer side.

An anode-side separator plate and/or a cathode-side separator plate may be provided with a sealing member, for example, as follows.

(a) The main surface of a separator plate is covered with a sealing member.

(b) A sealing member is molded on a separator plate.

(c) A sealing member is fitted to a separator plate.

(d) A sealing member is bonded to a separator plate.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
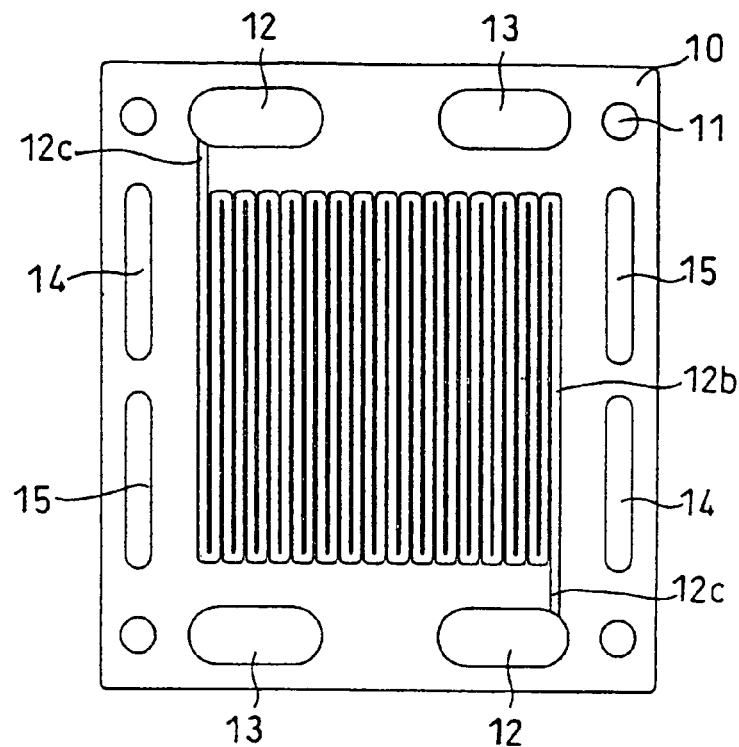
FIG. 1 is a front view of an anode-side separator plate in Embodiment 1 of the present invention.

In one aspect of the present invention, the anode-side sealing member and the cathode-side sealing member seal the cell in cooperation with the polymer electrolyte membrane at sealing parts where the anode-side and cathode-side sealing members are opposed to each other. One of the anode-side and cathode-side sealing members has a pointed rib that comes in contact with the sealing parts in a linear manner, and the other sealing member comes in contact with the sealing parts surface to surface. Accordingly, the fuel gas and the oxidant gas are prevented from leaking out of the fuel gas flow channel and the oxidant gas flow channel.

The present invention is based on the finding that the use of such sealing members makes it possible to save the space the sealing members need and reduce the clamping load of a cell stack, while ensuring stable gas tightness.

In another aspect of the present invention, the sealing member, which intervenes between the polymer electrolyte membrane and each separator plate and constitutes a sealing section, has a particular shape in cross section. Specifically, the anode-side sealing member is flat, and the cathode-side sealing member is shaped like a wedge of which cross section is thin on the cathode facing side and thick on the other side at the cathode surrounding part. This configuration saves the space necessary for the sealing section, decreases the clamping load of the stack, and further, ensures that there is a necessary and minimum clearance between the electrode and the sealing member for water discharge and ease of assembly. This configuration also facilitates assembly of a cell and ensures discharge of water even when the pressure loss of water is low.

In still another aspect, the present invention is based on the finding that the configuration of the sealing member can be defined by the configuration of a gas flow channel of a separator plate and hydraulic diameter (d) of the clearance between the sealing member and the electrode. This clearance is determined by limiting factors relating to assembling characteristics.

That is, the present invention is designed such that one-side clearance "cl" between the cathode and the cathode surrounding part of the cathode-side sealing member and hydraulic diameter "d" of the clearance satisfy the formula (1), and more preferably, the formula (2).

$$d < (D \times l \times P)/0.54L \quad (1)$$

wherein "l" is the length of one-side clearance, "d" is the hydraulic diameter of the one-side clearance, "L" is the length of a gas flow channel per 1 path of a cathode-side separator plate, "D" is the hydraulic diameter of the gas flow channel per 1 path of the cathode-side separator plate, "P" is the number of paths of the gas flow channel per the cathode-side separator plate, and the hydraulic diameter
=area of cross section÷peripheral length of cross section× 4.

$$0.25 \text{ mm} < cl \quad (2)$$

When the above formula(e) is/are satisfied, the variations in the dimensions of respective components and the adverse effects of assembling errors are reduced, and the resultant sealing member enables a cell configuration having little variation in pressure loss.

In still another aspect, the present inventors have found that the practically operable range is defined by the ratio of pressure loss Pc in the clearance to pressure loss Pf in the gas flow channel. That is, it is effective that 0.9<Pc/Pf.

As a rubber layer used in the sealing member, polyisoprene, butyl rubber, ethylene propylene rubber, etc., may be used as well as fluorocarbon rubber. As an adhesive, polyisobutylene, ethylene propylene rubber, butyl rubber, composites thereof, etc., may be used.

Referring now to the drawings, the present invention is described in detail by way of examples. The drawings are used herein simply to describe the structures of respective elements, and therefore, relative position and size of the respective elements are not necessarily accurate.

Embodiment 1

Figure 2:
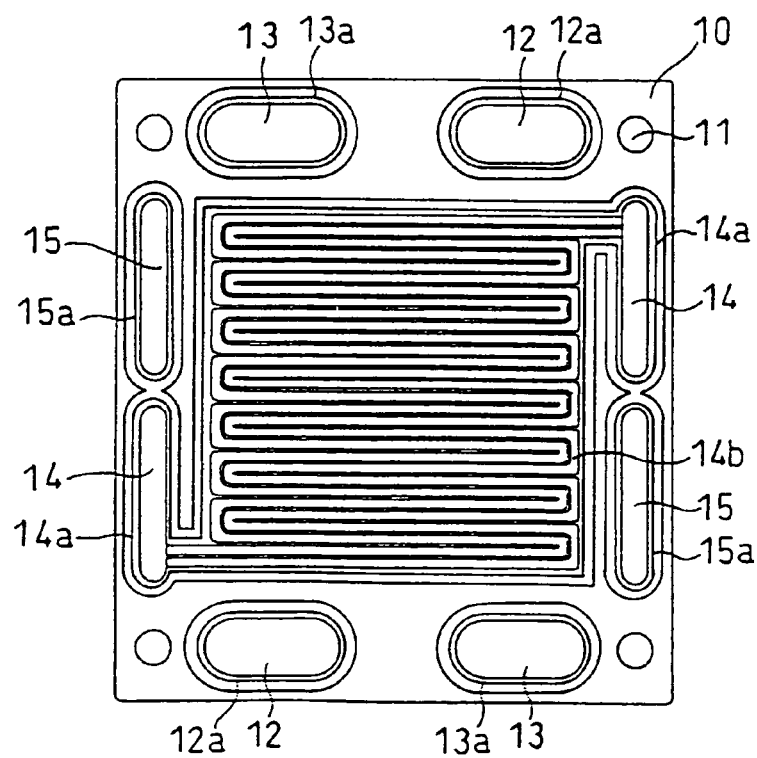
FIG. 2 is a back view of the anode-side separator plate of FIG. 1.

FIG. 1 is a front view of an anode-side separator plate, and FIG. 2 is a back view thereof.

The anode-side separator plate 10 has, on the anode facing side, a gas flow channel 12b that is connected to the pair of fuel gas manifold apertures 12 for supplying and discharging a fuel gas to and from an anode. The gas flow channel 12b includes one groove. Connection grooves 12c connect the gas flow channel 12b with the fuel gas manifold apertures 12.

The separator plate 10 has, on the backside, a cooling water flow channel 14b that is connected to the pair of cooling water manifold apertures 14. The flow channel 14b includes two parallel grooves. The separator plate 10 also has O-ring grooves 12a, 13a, and 15a for receiving O-rings, which surround each of the fuel gas manifold apertures 12, the oxidant gas manifold apertures 13, and the spare manifold apertures 15. Further, there is provided an O-ring groove 14a for receiving an O-ring, which surrounds the cooling water manifold apertures 14 and the cooling water flow channel 14b.

Figure 3:
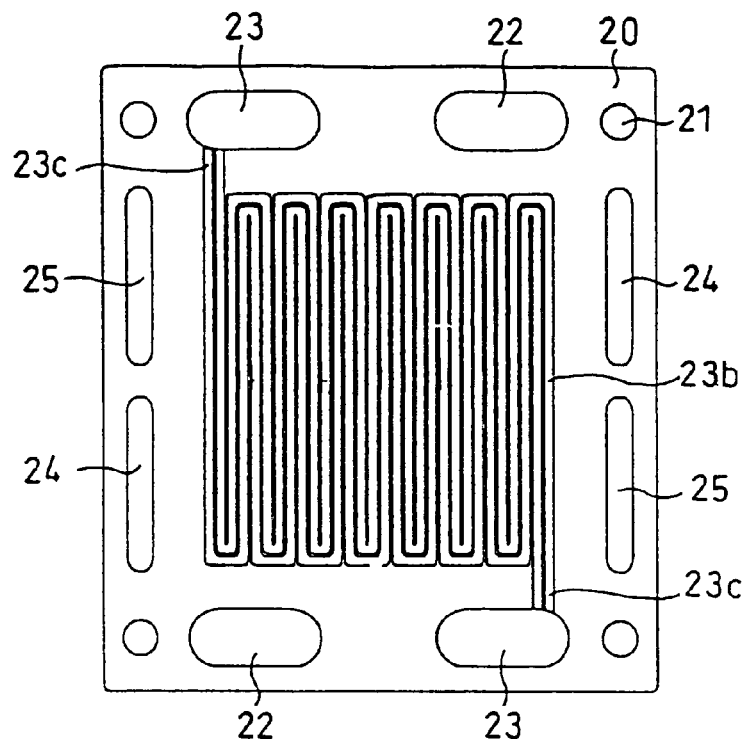
FIG. 3 is a front view of a cathode-side separator plate in Embodiment 1 of the present invention.
Figure 4:
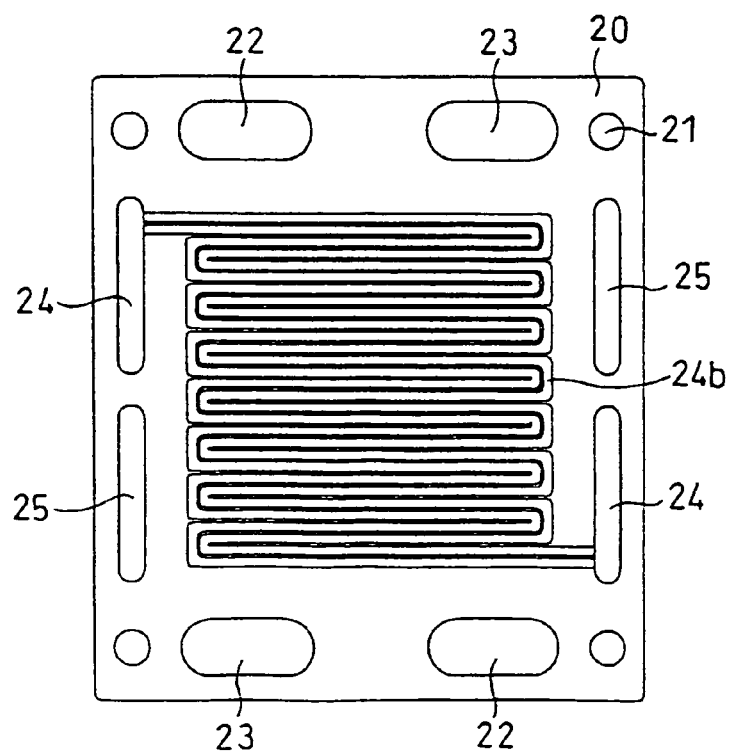
FIG. 4 is a back view of the cathode-side separator plate of FIG. 3.

FIG. 3 is a front view of a cathode-side separator plate, and FIG. 4 is a back view thereof.

A cathode-side separator plate 20 has a pair of fuel gas manifold apertures 22, a pair of oxidant gas manifold apertures 23, a pair of cooling water manifold apertures 24, a pair of spare manifold apertures 25, and four bolt holes 21.

The cathode-side separator plate 20 has, on the cathode facing side, a gas flow channel 23b that is connected to the pair of oxidant gas manifold apertures 23 for supplying and discharging an oxidant gas to and from a cathode. The gas flow channel 23b includes two grooves. Connection grooves 23c connect the gas flow channel 23b with the oxidant gas manifold apertures 23.

The separator plate 20 has, on the backside, a cooling water flow channel 24b that is connected to the pair of cooling water manifold apertures 24. The flow channel 24b includes two parallel grooves.

Figure 5:
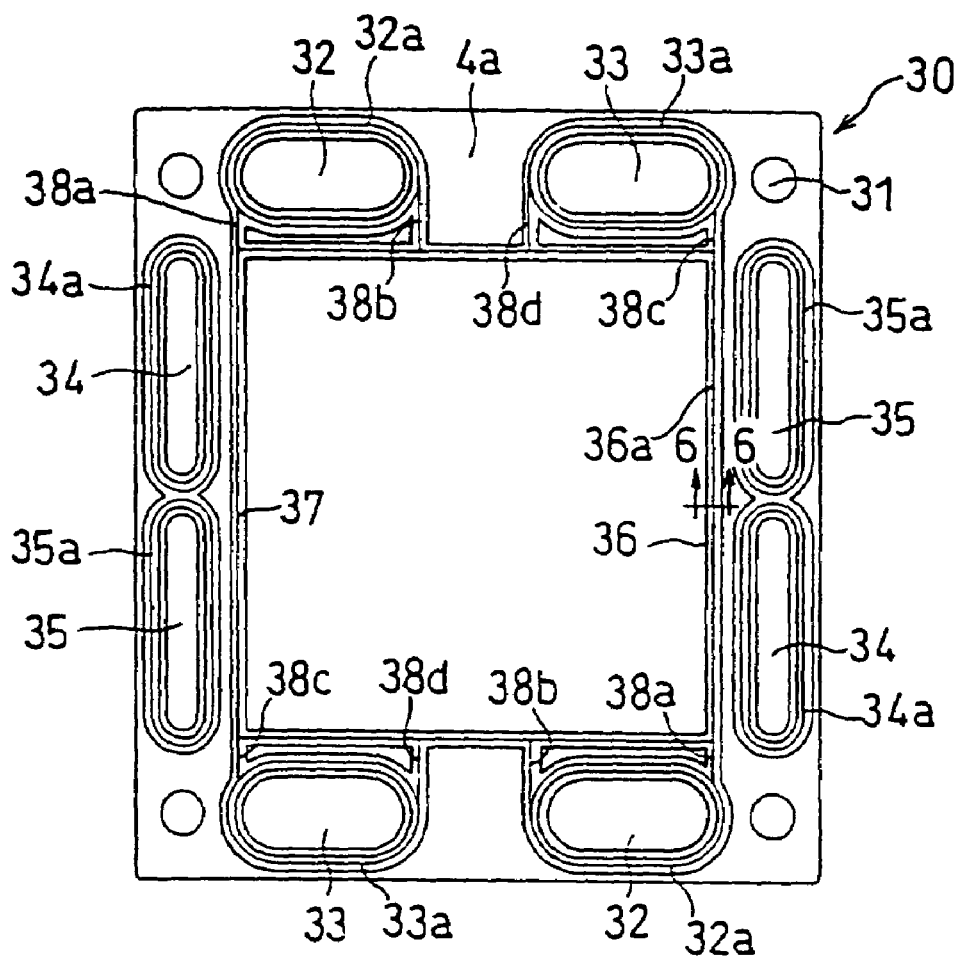
FIG. 5 is a front view of an anode-side sealing composite member in Embodiment 1 of the present invention.
Figure 6:
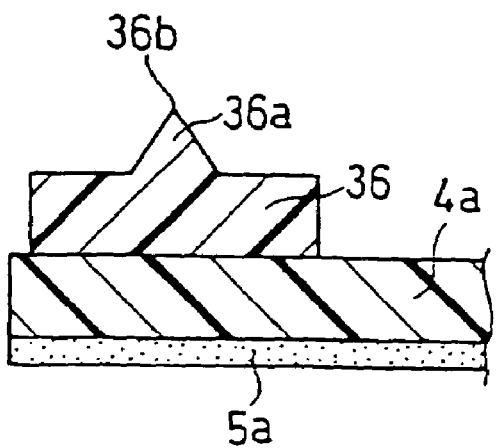
FIG. 6 is an enlarged sectional view taken on line 6-6 of FIG. 5.
Figure 7:
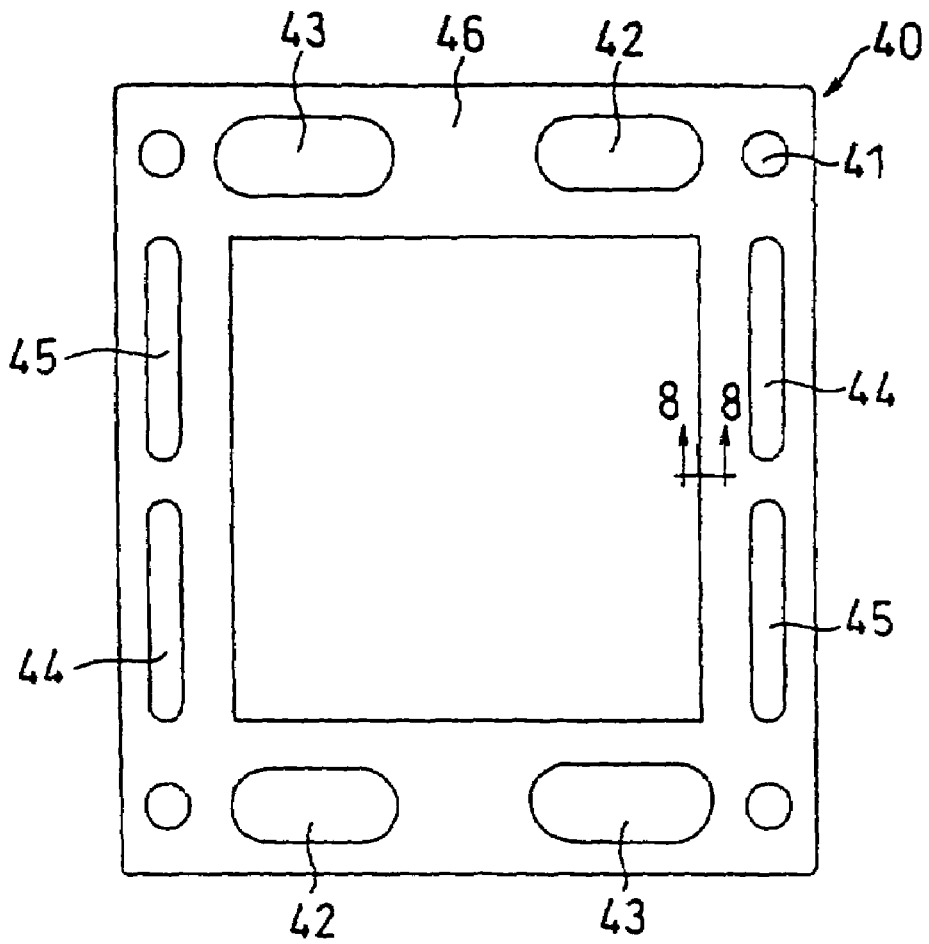
FIG. 7 is a front view of a cathode-side sealing composite member in Embodiment 1 of the present invention.
Figure 8:
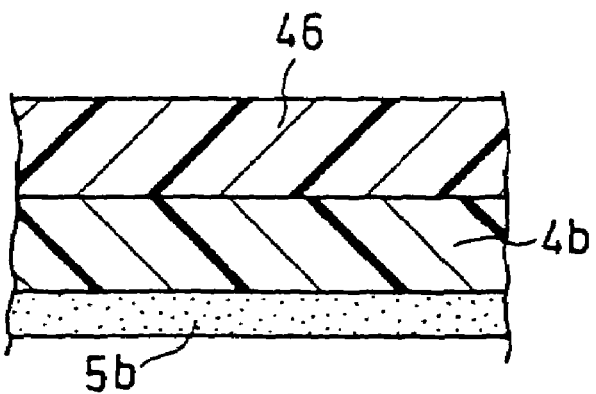
FIG. 8 is an enlarged sectional view taken on line 8-8 of FIG. 7.

FIG. 5 is a front view of an anode-side sealing composite member, and FIG. 6 is a partially enlarged sectional view thereof. FIG. 7 is a front view of a cathode-side sealing composite member, and FIG. 8 is a partially enlarged sectional view thereof.

An anode-side sealing composite member 30, to be bonded to the anode-side separator plate 10, includes a film 4a made of polyimide, an anode-side sealing member 36 formed on one side of the film 4a and having a rib 36a, and an adhesive layer 5a formed on the other side of the film 4a and adhering to the anode-side separator plate 10.

For the adhesive layer 5a, polyisobutylene, ethylene propylene rubber, butyl rubber and the like may be used singly or in combination of two or more of them as an adhesive.

The film 4a and the adhesive layer 5a have fuel gas manifold apertures 32, oxidant gas manifold apertures 33, cooling water manifold apertures 34, spare manifold apertures 35, and bolt holes 31, which correspond to the respective manifold apertures of the anode-side separator plate 10; their parts corresponding to the anode are cut away.

The anode-side sealing member 36 has an electrode sealing part 37, which surrounds the anode, and manifold aperture sealing parts 32a and 33a, which surround each of the fuel gas manifold apertures 32 and the oxidant gas manifold apertures 33. This member 36 also has sealing parts 38a, 38b and 38c, 38d, which connect the right and left ends of the manifold aperture sealing parts 32a and 33a to the electrode sealing part 37. The sealing parts 38a and 38b are positioned on both sides of each connection groove 12c of the anode-side separator plate 10 and prevent gas leakage from the sides of each connection groove 12c. The sealing parts 38c and 38d are positioned on both sides of the location corresponding to each connection groove 23c of the cathode-side separator plate 20. The anode-side sealing member 36 further has manifold aperture sealing parts 34a and 35a surrounding the manifold apertures 34 and 35, respectively.

The rib 36a is triangular in cross section, and the base of the triangle is included in the main surface of the anode-side sealing member 36. A pointed top 36b, which is the apex of the triangle and faces the base, is pressed against a cathode-side sealing member 46 that will be described later, with an electrolyte membrane between the pointed rib 36b and the sealing member 46.

A cathode-side sealing composite member 40, to be bonded to the cathode-side separator plate 20, includes a film 4b made of polyimide, a sheet-shaped cathode-side sealing member 46 formed on one side of the film 4b, and an adhesive layer 5b formed on the other side of the film 4b and adhering to the cathode-side separator plate 20.

For the adhesive layer 5b, polyisobutylene, ethylene propylene rubber, butyl rubber and the like may be used singly or in combination of two or more of them as an adhesive.

The film 4b and the adhesive layer 5b have fuel gas manifold apertures 42, oxidant gas manifold apertures 43, cooling water manifold apertures 44, spare manifold apertures 45, and bolt holes 41, which correspond to the respective manifold apertures of the cathode-side separator plate 20; their parts corresponding to the cathode are cut away.

The cathode-side sealing member 46 is in the form of a flat plate and has the same shape as the film 4b and the adhesive layer 5b.

The anode-side sealing member 36 is fixed to the anode-side separator plate 10 by bonding the adhesive layer 5a of the anode-side sealing composite member 30 to the anode-facing side of the anode-side separator plate 10.

The cathode-side sealing member 46 is fixed to the cathode-side separator plate 20 by bonding the adhesive layer 5b of the cathode-side sealing composite member 40 to the cathode-facing side of the cathode-side separator plate 20.

Figure 11:
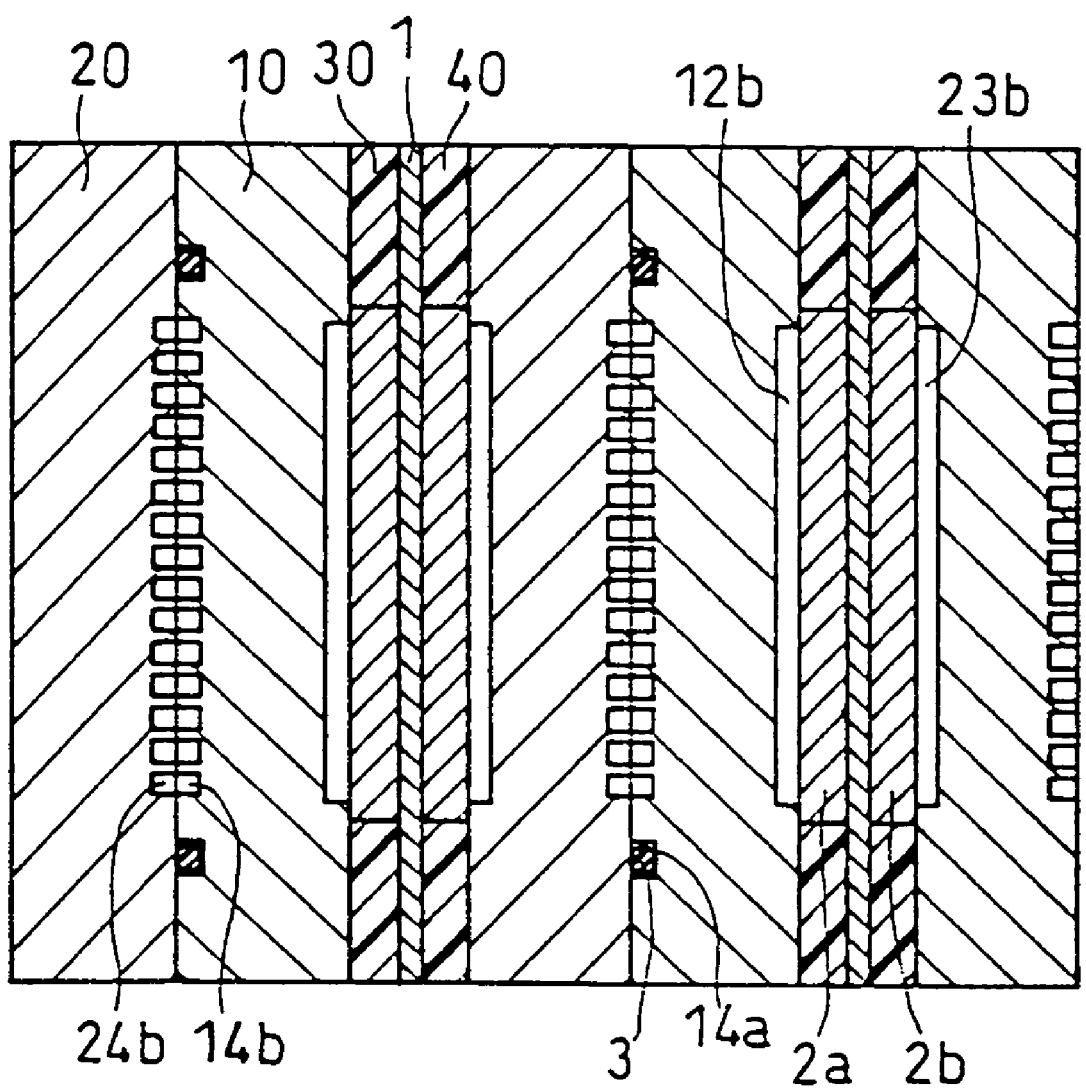
FIG. 11 is a longitudinal sectional view of the main part of a fuel cell in accordance with the present invention.

As illustrated in FIG. 11, a fuel cell is fabricated by sandwiching an MEA between the anode-side separator plate 10 having the anode-side sealing composite member 30 and the cathode-side separator plate 20 having the cathode-side sealing composite member 40. The MEA includes an anode 2a and a cathode 2b sandwiching a hydrogen-ion conductive polymer electrolyte membrane 1. In FIG. 11, reference character 3 represents O-rings fitted into grooves 12a to 15a.

Figure 12:
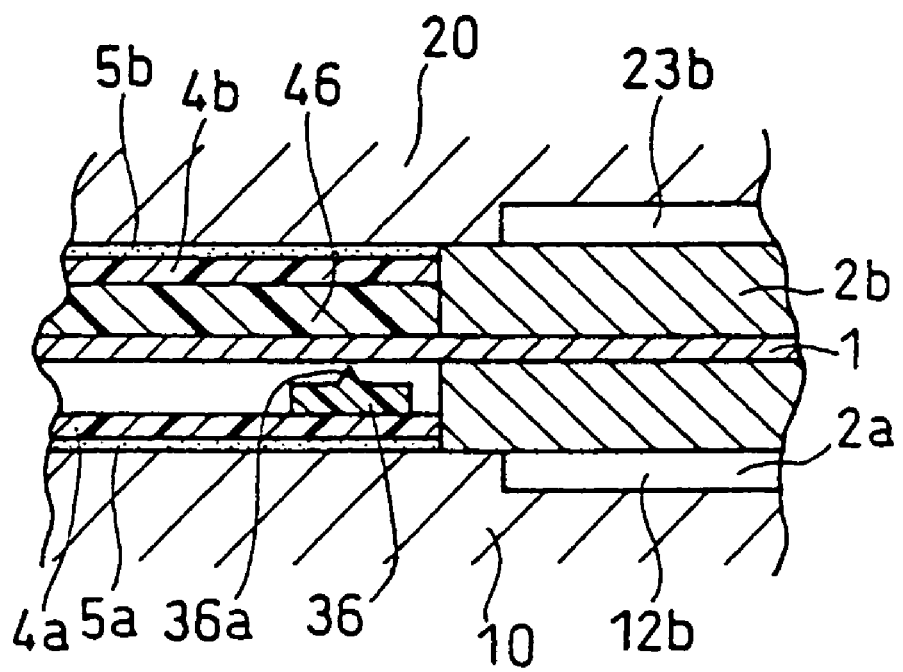
FIG. 12 is an enlarged sectional view of the vicinity of sealing members of the fuel cell of FIG. 11.

As illustrated in FIG. 12, this fuel cell is structured such that the pointed top 36a of the anode-side sealing member 36 is pressed against the cathode-side sealing member 46, with the electrolyte membrane 1 between the two sealing members.

The use of the above-described anode-side and cathode-side sealing members makes it possible to save the space the sealing members need and reduce the clamping load of the cell stack, while ensuring stable gas tightness.

This fuel cell includes the anode-side sealing member bonded to the anode-side separator plate and the cathode-side sealing member bonded to the cathode-side separator plate. This pair of sealing members includes: (a) a pair of electrode sealing parts sandwiching the polymer electrolyte membrane around the anode and the cathode; (b) a pair of manifold aperture sealing parts sandwiching the polymer electrolyte membrane around each of the fuel gas manifold apertures and the oxidant gas manifold apertures; and (c) a pair of connection groove sealing parts sandwiching the polymer electrolyte membrane on both sides of each connection groove.

At the respective sealing parts, one of the anode-side and cathode-side sealing members has a pointed rib that comes in contact with the polymer electrolyte membrane in a linear manner, and the other sealing member comes in contact with the polymer electrolyte membrane surface to surface. Accordingly, the gas tightness between the polymer electrolyte membrane and the respective separator plates is retained.

Figure 9:
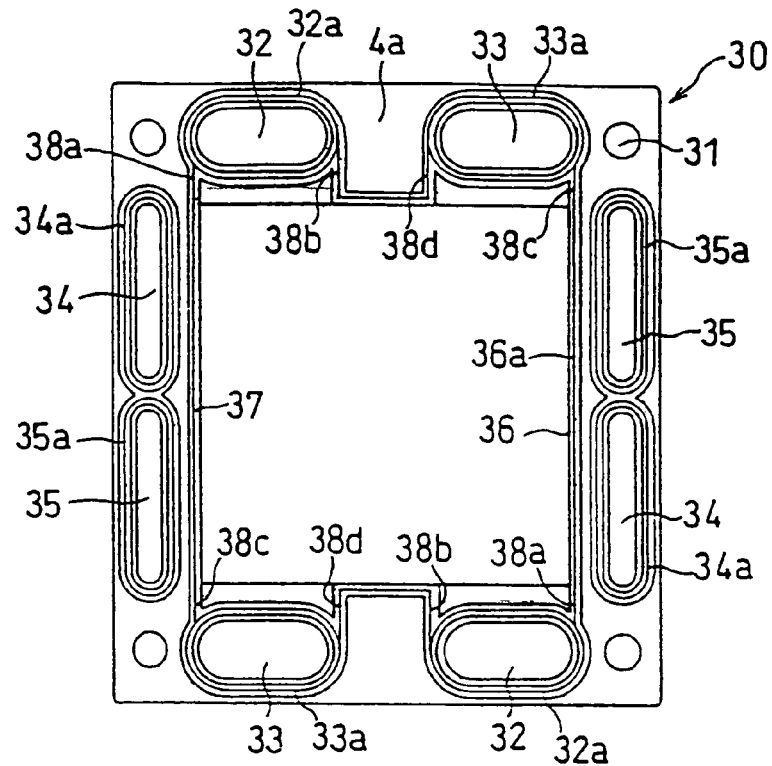
FIG. 9 is a front view of another anode-side sealing composite member in Embodiment 1 of the present invention.
Figure 10:
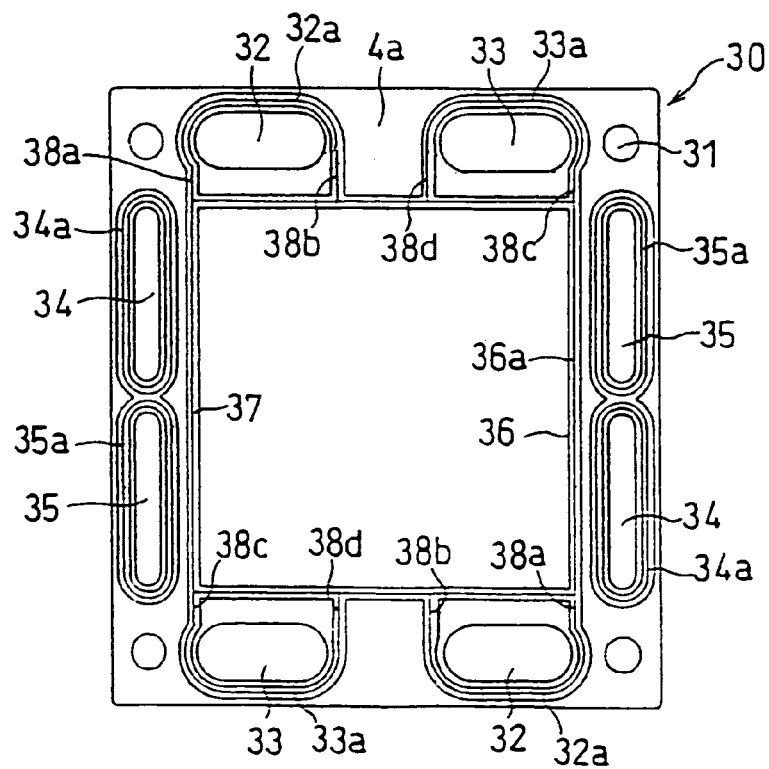
FIG. 10 is a front view of still another anode-side sealing composite member in Embodiment 1 of the present invention.

In the anode-side sealing composite member 30, the fuel gas manifold apertures 32 are separated from the anode by the manifold aperture sealing parts 32a and the electrode sealing part 37 surrounding the anode. Likewise, the oxidant gas manifold apertures 33 are separated from the anode by the manifold aperture sealing parts 33a and the electrode sealing part 37. The manifold apertures 32 and 33 may be separated from the anode by only the manifold aperture sealing parts 32a and 33a, as illustrated in FIG. 9, or by only the electrode sealing part 37 surrounding the anode, as illustrated in FIG. 10.

The cathode-side sealing composite member 40 has such a size as to cover the whole main surface of the separator plate 20, including the electrode sealing part, the manifold aperture sealing parts, and the connection groove sealing parts. However, the sealing composite member 40 may have the same size as the anode-side sealing member 36.

Embodiment 2

Figure 14:
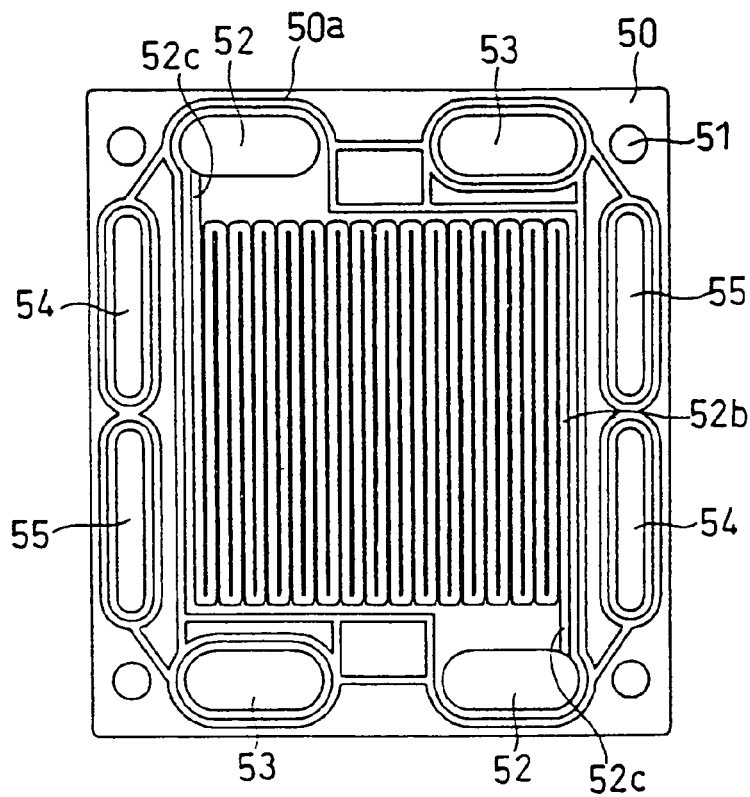
FIG. 14 is a front view of an anode-side separator plate in Embodiment 2 of the present invention.
Figure 15:
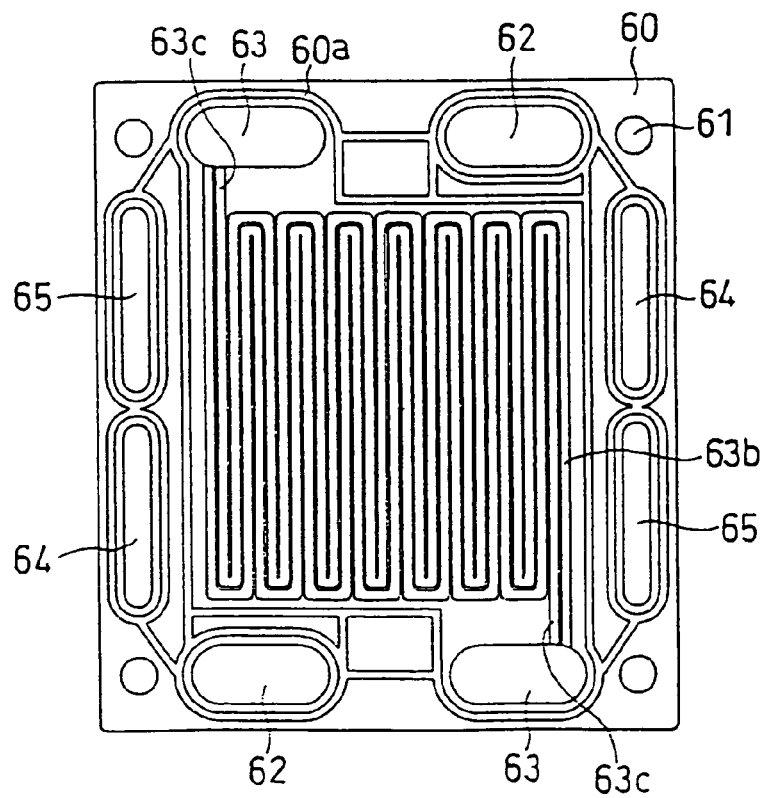
FIG. 15 is a front view of a cathode-side separator plate in Embodiment 2 of the present invention.

FIG. 14 is a front view of an anode-side separator plate, and FIG. 15 is a front view of a cathode-side separator plate.

An anode-side separator plate 50 has a pair of fuel gas manifold apertures 52, a pair of oxidant gas manifold apertures 53, a pair of cooling water manifold apertures 54, a pair of spare manifold apertures 55, and four bolt holes 51.

A cathode-side separator plate 60 has a pair of fuel gas manifold apertures 62, a pair of oxidant gas manifold apertures 63, a pair of cooling water manifold apertures 64, a pair of spare manifold apertures 65, and four bolt holes 61.

The anode-side separator plate 50 and the cathode-side separator plate 60 have sealing member grooves 50a and 60a, respectively, at predetermined positions, for receiving an anode-side sealing member 56 and a cathode-side sealing member 66 which will be described later.

Figure 16:
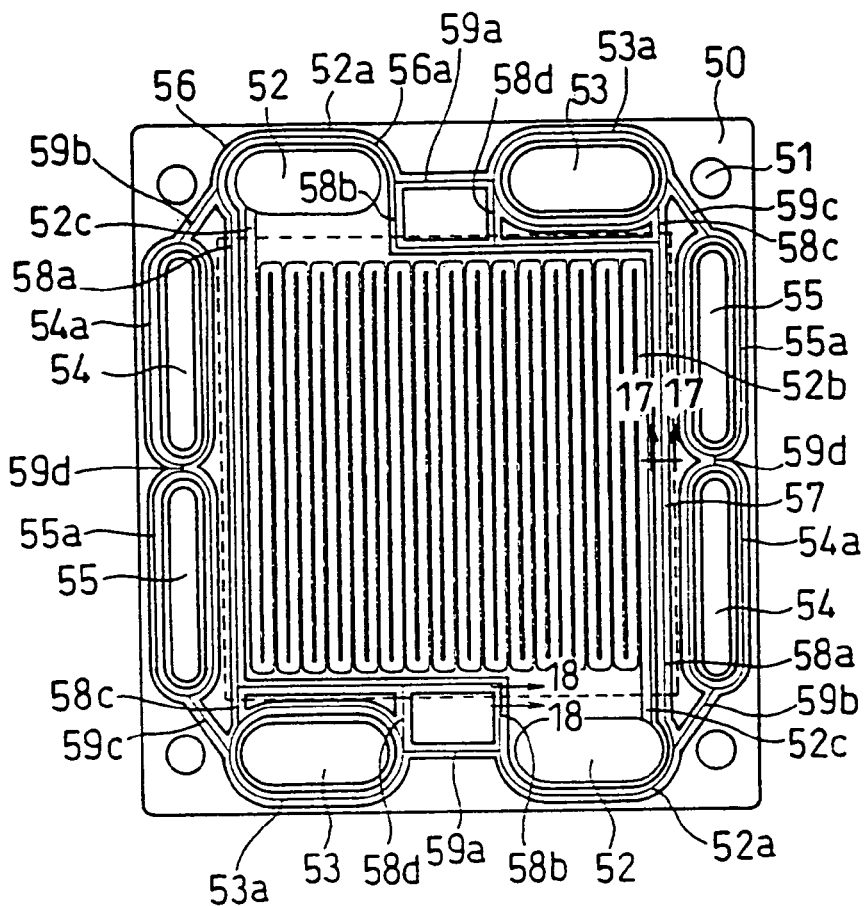
FIG. 16 is a front view of the anode-side separator plate having a sealing member in Embodiment 2 of the present invention.
Figure 17:
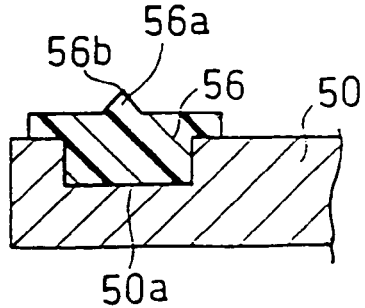
FIG. 17 is an enlarged sectional view taken on line 17-17 of FIG. 16.
Figure 19:
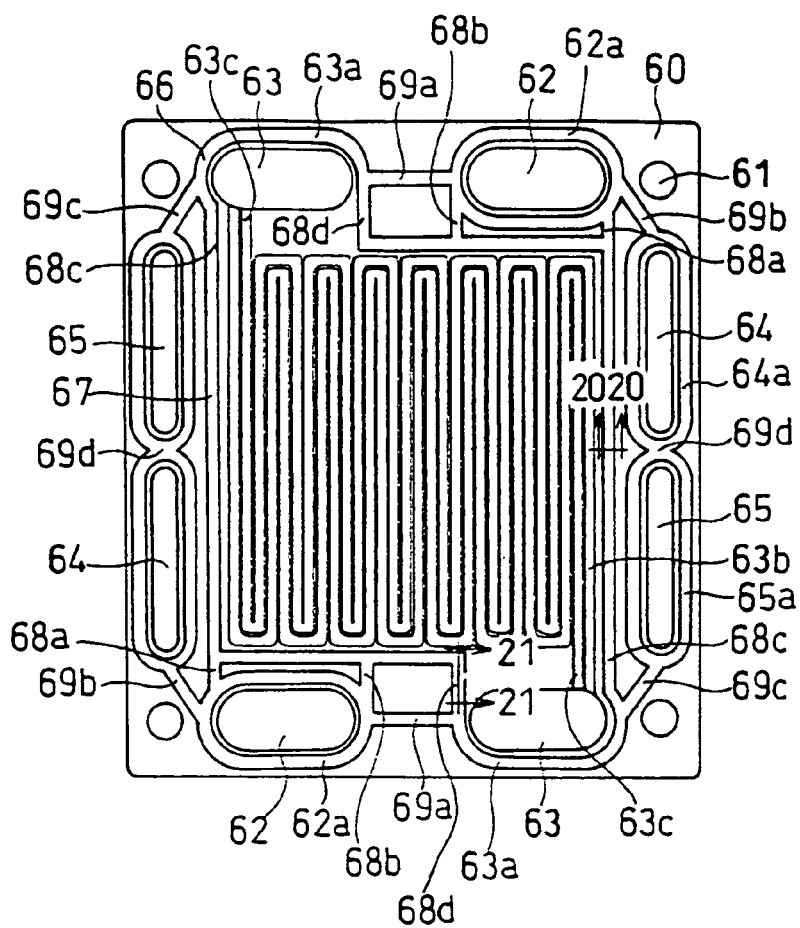
FIG. 19 is a front view of the cathode-side separator plate having a sealing member in Embodiment 2 of the present invention.
Figure 20:
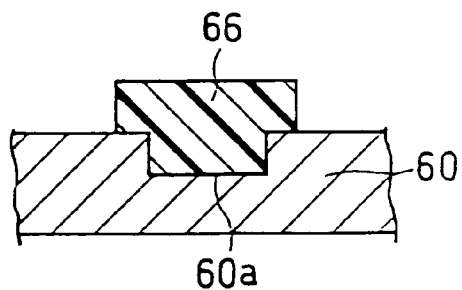
FIG. 20 is a longitudinal sectional view of the vicinity of the sealing member of the cathode-side separator plate of FIG. 19.

FIG. 16 is a front view of the anode-side separator plate 50 in which the anode-side sealing member 56 is fitted to the groove 50a, and FIG. 17 is a partially enlarged sectional view thereof. FIG. 19 is a front view of the cathode-side separator plate 60 in which the cathode-side sealing member 66 is fitted to the groove 60a, and FIG. 20 is a partially enlarged sectional view thereof.

The anode-side sealing member 56 having a predetermined rib 56a is mounted along the sealing member groove 50a of the anode-side separator plate 50.

The anode-side sealing member 56 includes a first anode-side sealing section that surrounds a gas flow channel 52b and the pair of fuel gas manifold apertures 52 to form a closed loop. The sealing member 56 also includes: manifold aperture sealing parts 53a, 54a, and 55a, which surround each of the oxidant gas manifold apertures 53, the cooling water manifold apertures 54, and the spare manifold apertures 55; and sealing parts 58c and 58d located on both sides of each connection groove 63c of the cathode-side separator plate 60.

The first anode-side sealing section includes: an electrode sealing part 57 mostly surrounding the gas flow channel 52b; manifold aperture sealing parts 52a surrounding the outer half of the fuel gas manifold apertures 52; and sealing parts 58a and 58b located on both sides of each connection groove 52c. The connection grooves 52c connect the manifold apertures 52 to the gas flow channel 52b. The first anode-side sealing section corresponds to the diagonally shaded area in FIG. 22.

The anode-side sealing member 56 further includes sealing parts 59a, 59b, 59c, and 59d. The sealing parts 59a connect the fuel gas manifold aperture sealing parts 52a with the oxidant gas manifold aperture sealing parts 53a. The sealing parts 59b connect the fuel gas manifold aperture sealing parts 52a with the cooling water manifold aperture sealing parts 54a. The sealing parts 59c connect the oxidant gas manifold aperture sealing parts 53a with the spare manifold aperture sealing parts 55a. And the sealing parts 59d connect the cooling water manifold aperture sealing parts 54a with the spare manifold aperture sealing parts 55a.

A second anode-side sealing section includes: the manifold aperture sealing parts 53a, 54a, and 55a; and the sealing parts 59a, 59b, 59c, and 59d connecting the respective manifold aperture sealing parts. This second sealing section forms a closed loop in combination with the fuel gas manifold aperture sealing parts 52a of the first anode-side sealing part, and the manifold apertures 53, 54, and 55 are located outside the closed loop.

The cathode-side sealing member 66, which has a flat surface on the side facing the anode-side separator plate, is mounted along the sealing member groove 60a of the cathode-side separator plate 60.

The cathode-side sealing member 66 includes a first cathode-side sealing section that surrounds a gas flow channel 63b and the pair of oxidant gas manifold apertures 63 to form a closed loop. The sealing member 66 also includes: manifold aperture sealing parts 62a, 64a, and 65a, which surround each of the fuel gas manifold apertures 62, the cooling water manifold apertures 64, and the spare manifold apertures 65; and sealing parts 68a and 68b located on both sides of each connection groove 52c of the anode-side separator plate 50.

The first cathode-side sealing section includes: an electrode sealing part 67 mostly surrounding the gas flow channel 63b; manifold aperture sealing parts 63a surrounding the outer half of the oxidant gas manifold apertures 63; and sealing parts 68c and 68d located on both sides of each connection groove 63c. The connection grooves 63c connect the manifold apertures 63 to the gas flow channel 63b. The first cathode-side sealing section corresponds to the diagonally shaded area in FIG. 23.

The cathode-side sealing member 66 further includes sealing parts 69a, 69b, 69c, and 69d. The sealing parts 69a connect the fuel gas manifold aperture sealing parts 62a with the oxidant gas manifold aperture sealing parts 63a. The sealing parts 69b connect the fuel gas manifold aperture sealing parts 62a with the cooling water manifold aperture sealing parts 64a. The sealing parts 69c connect the oxidant gas manifold aperture sealing parts 63a with the spare manifold aperture sealing parts 65a. And the sealing parts 69d connect the cooling water manifold aperture sealing parts 64a with the spare manifold aperture sealing parts 65a.

A second cathode-side sealing section includes: the manifold aperture sealing parts 62a, 64a, and 65a; and the sealing parts 69a, 69b, 69c, and 69d connecting the respective manifold aperture sealing parts. This second sealing section forms a closed loop in combination with the oxidant gas manifold aperture sealing parts 63a of the first cathode-side sealing part, and the manifold apertures 62, 64, and 65 are located outside the closed loop.

A fuel cell is fabricated by sandwiching an MEA between the anode-side separator plate 50 and the cathode-side separator plate 60, such that a pointed top 56b of the rib 56a on the anode-side sealing member 56 is pressed against the cathode-side sealing member 66 with the electrolyte membrane between the two sealing members.

The use of the above-described anode-side and cathode-side sealing members makes it possible to save the space the sealing members need and reduce the clamping load of the cell stack, while ensuring stable gas tightness.

Figure 22:
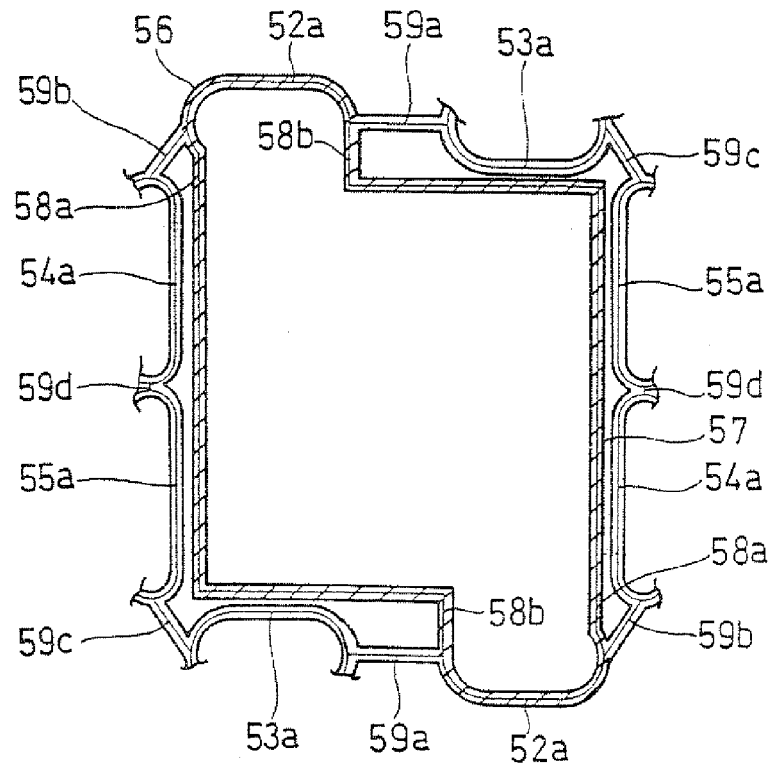
FIG. 22 is a view showing first and second anode-side sealing sections of the anode-side sealing member of FIG. 16.

This embodiment further enables the use of a polymer electrolyte membrane which is slightly smaller than that of the separator plate. The outer shape of such a polymer electrolyte membrane is shown by the dotted line in FIG. 16. When a polymer electrolyte membrane of such size is used, gaps occur at the area where the sealing parts 58a and 58b and the polymer electrolyte membrane contact. Through the gaps, the fuel gas leaks out from the first anode-side sealing section, but the second anode-side sealing section prevents this leaked gas from leaking out of the unit cell. Thus, the second anode-side sealing section is indispensable for preventing the outward leakage of the gas. In FIG. 22, the second sealing section is illustrated outside the first anode-side sealing section.

Figure 23:
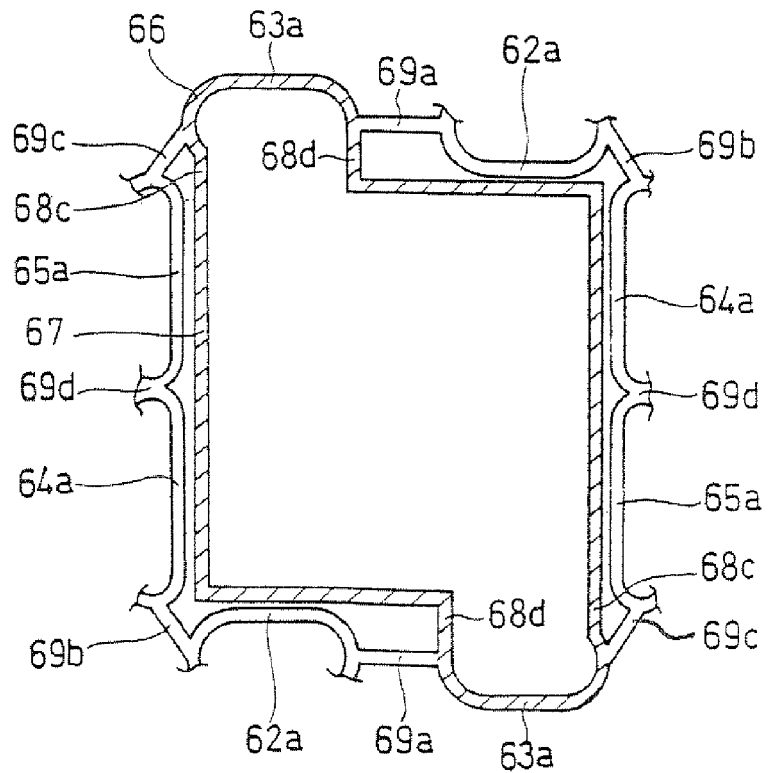
FIG. 23 is a view showing first and second cathode-side sealing sections of the cathode-side sealing member of FIG. 19.

Also, gaps occur at the area where the sealing parts 68c and 68d and the polymer electrolyte membrane contact. Through the gaps, the oxidant gas leaks out from the first cathode-side sealing section, but the second cathode-side sealing section prevents this leaked gas from leaking out of the unit cell. Thus, the second cathode-side sealing section is indispensable for preventing the outward leakage of the gas. In FIG. 23, the second sealing section is illustrated outside the first cathode-side sealing section.

Further, since each of the second anode-side sealing section and the second cathode-side sealing section surrounds the area on the inner side of the manifold apertures other than the manifold apertures connected to the gas flow channel, the cross leakage of the gases does not occur within the fuel cell.

As described above, the use of the anode-side and cathode-side separator plates provided with the anode-side and cathode-side sealing members of this embodiment ensures stable gas tightness, even in the case of using a polymer electrolyte membrane having such a small size as shown by the dotted line in FIG. 16. This also enables a reduction in the size of the polymer electrolyte membrane, thereby making it possible to decrease the clamping load of the stack.

In the above description, the rib 56a, which forms the respective sealing parts of the anode-side sealing member 56, has been described as having a uniform height. However, sealing effects can be enhanced by setting the height of the rib such that the rib not contacting the polymer electrolyte membrane is higher than the rib contacting the polymer electrolyte membrane by the thickness of the polymer electrolyte membrane.

Figure 18:
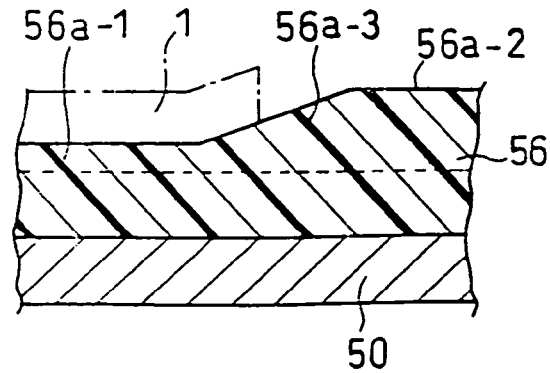
FIG. 18 is an enlarged sectional view of the anode-side separator plate having a modified sealing member in Embodiment 2 of the present invention, taken on the line corresponding to line 18-18 of FIG. 16.

FIG. 18 is an enlarged sectional view of the separator plate 50 provided with such an anode-side sealing member, taken on the line corresponding to line 18-18 of FIG. 16. With respect to the rib 56a of the sealing member 56, the part contacting the polymer electrolyte membrane 1 having such a size as shown by the dotted line in FIG. 16 is represented by 56a-1, and the part not contacting the polymer electrolyte membrane is represented by 56a-2. The rib 56a-2 is higher than the rib 56a-1 by the thickness of the polymer electrolyte membrane. The rib 56a-1 is connected to the rib 56a-2 by the part 56a-3, of which height gradually increases.

Figure 21:
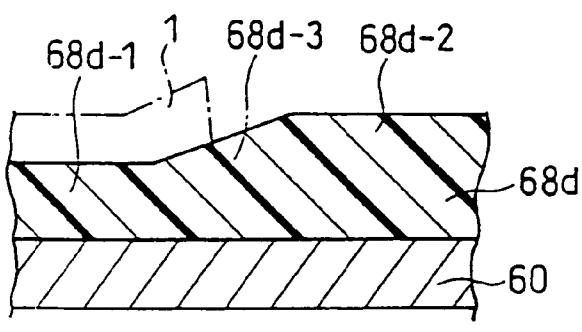
FIG. 21 is an enlarged sectional view of the cathode-side separator plate having another modified sealing member in Embodiment 2 of the present invention, taken on the line corresponding to line 21-21 of FIG. 19.

Instead of increasing the height of the rib 56 itself, the height (thickness) of the base portion of the rib may be increased so as to eventually increase the rib height. Further, instead of changing the height of the rib of the anode-side sealing member, the height (thickness) of the cathode-side sealing member may be changed. FIG. 21 is an enlarged sectional view of the cathode-side separator plate having such a sealing member, taken on the line corresponding to line 21-21 of FIG. 19. With respect to the sealing part 68d of the sealing member 66, the part contacting the polymer electrolyte membrane 1 having such a size as shown by the dotted line in FIG. 16 is represented by 68d-1, and the part not contacting the polymer electrolyte membrane is represented by 68d-2. The part 68d-2 is higher than the part 68d-1 by the thickness of the polymer electrolyte membrane. The part 68d-1 is connected to the part 68d-2 by the part 68d-3, of which height gradually increases. The other sealing parts are also structured such that the part not contacting the polymer electrolyte membrane is higher than the part contacting the polymer electrolyte membrane.

It is noted that the positions of the anode-side and cathode-side sealing members do not correspond at some parts, i.e., the oxidant gas manifold aperture sealing parts and the portions of the electrode sealing part separating the oxidant gas manifold apertures from the anode in the anode-side sealing member of FIG. 16; and the fuel gas manifold aperture sealing parts and the portions of the electrode sealing parts separating the fuel gas manifold apertures from the cathode in the cathode-side sealing member of FIG. 19. However, these two sealing members are elastic and receive an appropriate pressure from the anode-side and cathode-side separator plates when a cell stack is formed. Therefore, even if the two sealing members do not correspond in position, the sealing can be successfully done by the direct contact of one of the two sealing members with the adjacent separator plate.

Also, the sealing may be done by using such members as cover plates at the above-mentioned non-corresponding parts of one of the sealing member, in alignment with the other sealing member. In FIG. 16, for example, a cover plate covering each connection groove 52c may be provided between the sealing parts 58a and 58b in alignment with the cathode-side sealing member. In FIG. 19, a cover plate covering each connection groove 63c may be provided between the sealing parts 68c and 68d in alignment with the anode-side sealing member.

The sealing member may be provided at the sealing member groove of the separator plate by integrally molding the sealing member at the groove of the separator plate or by fitting the previously molded sealing member into the groove.

Figure 26:
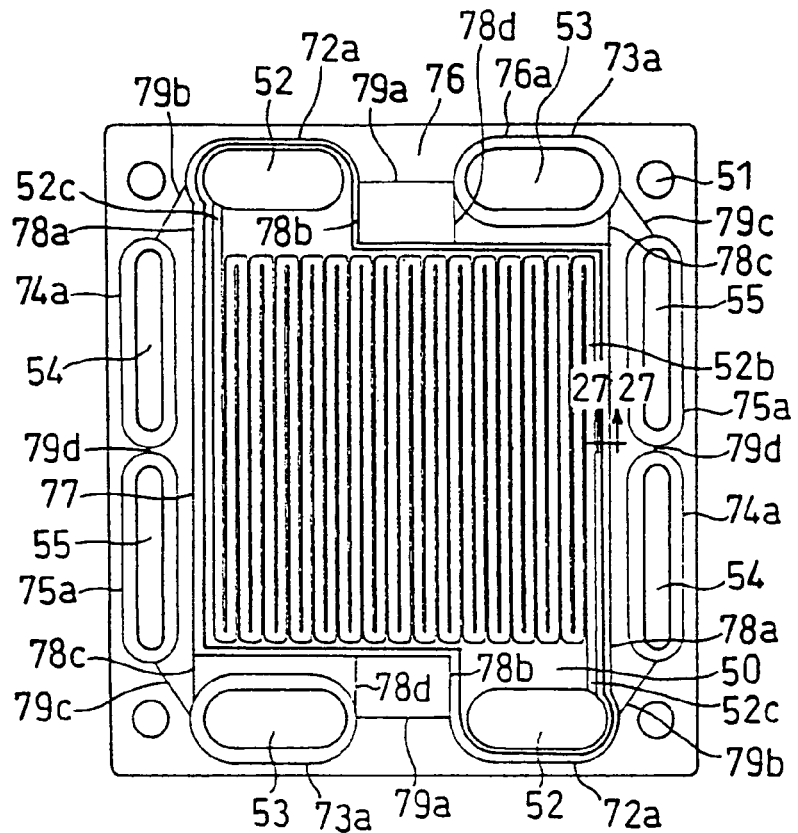
FIG. 26 is a front view of another anode-side separator plate in Embodiment 2 of the present invention.
Figure 27:
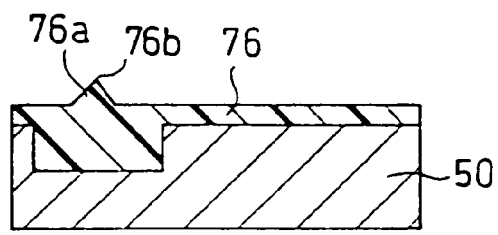
FIG. 27 is an enlarged sectional view of the vicinity of a rib at a peripheral part of the anode-side separator plate of FIG. 26.

FIGS. 26 and 27 illustrate the anode-side separator plate 50 having another anode-side sealing member 76. The sealing member 76 is integrally joined to the anode-side separator plate 50 of FIG. 14 by fitting the sealing member 76 into the groove 50a of the separator plate 50. The sealing member 76 is different from the sealing member 56 in that the sealing member 76 covers the main surface of the separator plate 50, except the manifold apertures 53 to 55, the bolt holes 51, and the area surrounded by the first anode-side sealing section that is described below. The sealing member 76 has a rib 76a at the same position as that of the rib 56a of the sealing member 56 as illustrated in FIG. 16. In FIG. 26, the rib 76a's pointed top 76b is illustrated as one line. The sealing member 76 can prevent the contact of a pair of separator plates sandwiching an MEA and therefore prevent a short-circuit between the separator plates.

The anode-side sealing member 76 includes a first anode-side sealing section that surrounds the gas flow channel 52b and the pair of fuel gas manifold apertures 52 to form a closed loop. The sealing member 76 also includes: manifold aperture sealing parts 73a, 74a, and 75a, which surround each of the oxidant gas manifold apertures 53, the cooling water manifold apertures 54, and the spare manifold apertures 55; and sealing parts 78c and 78d located on both sides of each connection groove 63c of the cathode-side separator plate 60. The anode-side sealing member 76 further has sealing parts 79a connecting the manifold aperture sealing parts 72a and 73a, sealing parts 79b connecting the manifold aperture sealing parts 72a and 74a, sealing parts 79c connecting the manifold aperture sealing parts 73a and 75a, and sealing parts 79d connecting the manifold aperture sealing parts 74a and 75a.

The first anode-side sealing section includes: an electrode sealing part 77 mostly surrounding the gas flow channel 52b; manifold aperture sealing parts 72a surrounding the outer half of the fuel gas manifold apertures 52; and sealing parts 78a and 78b located on both sides of each connection groove 52c. The positions of these sealing parts correspond to the sealing parts of the sealing member in FIG. 16.

Figure 28:
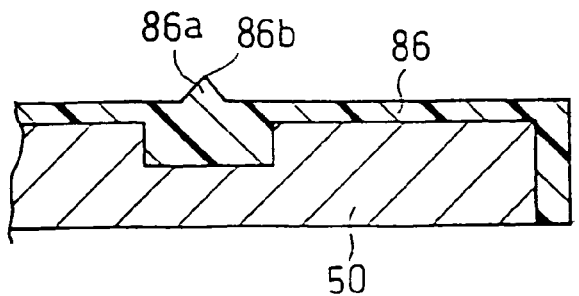
FIG. 28 is an enlarged sectional view of the vicinity of a rib at a peripheral part of still another anode-side separator plate in Embodiment 2 of the present invention.

As illustrated in FIG. 28, it is also possible to provide the anode-side separator plate 50 with an anode-side sealing member 86, which covers not only the main surface but also the side faces of the separator plate 50 and has a rib 86a at the same position as that of the rib 56a of FIG. 16. Reference character 86b represents the pointed top of the rib 86a. The sealing member 86 can prevent a short-circuit which may occur after the fabrication of a fuel cell, as well as the short-circuit between a pair of separator plates sandwiching an MEA.

EXAMPLE 1

(i) Production of Separator Plate

An anode-side separator plate 10 of FIGS. 1 and 2 and a cathode-side separator plate 20 of FIGS. 3 and 4 in Embodiment 1 were produced by machining isotropic graphite plates. The thickness of the separator plates was 3 mm. The width of grooves constituting the gas and cooling water flow channels was 2 mm, and the pitch thereof was 3 mm.

Sealing composite members 30 and 40 of Embodiment 1, having adhesive layers and illustrated in FIGS. 5 to 8, were produced.

A polyimide film 4a of 100 μm in thickness was placed into a mold. After the mold was closed, fluorocarbon rubber was injection molded at a temperature of 200° C. and a molding pressure of 150 kgf/cm$^2$, to form a predetermined sealing member 36 on the polyimide film 4a. In the same manner, a sealing member 46 was molded on a polyimide film 4b of 100 μm in thickness. Secondary cross-linking was performed at 200° C. for 10 hours. Thereafter, adhesive layers 5a and 5b, made of butyl rubber and having a thickness of 25 μm, were transferred to the polyimide films 4a and 4b, respectively, and the surfaces of the adhesive layers 5a and 5b were covered with a release film made of polypropylene.

The thickness of the anode-side sealing member 36 was 100 μm, and the width thereof was 3 mm. The height of a rib 36a from the main surface of the sealing member 36 was 300 μm. The thickness of the cathode-side sealing member 46 was 125 μm. The anode-side and cathode-side sealing composite members 30 and 40 were punched with a trimming die, to make manifold apertures 32 to 35 and 42 to 45 for fuel and oxidant gases, cooling water and spare purpose, bolt holes 31 and 41, and the electrode facing parts.

The resultant sealing composite members 30 and 40 with the adhesive layers were placed on the separator plates 10 and 20, respectively, and hot pressed thereto at a temperature of 100° C. and a press load of 2,000 kgf for one minute.

(iii) Production of MEA

An electrode catalyst powder was prepared by placing platinum particles, having an average particle size of approximately 30 Å, on an acetylene black carbon powder in a weight ratio of 1:4. A dispersion of this catalyst powder in isopropanol was mixed with a dispersion of perfluorocarbon sulfonic acid powder in ethyl alcohol, to form an electrode paste. The electrode paste was applied by screen printing onto one side of a 250 μm thick carbon fiber nonwoven fabric, to form a catalyst layer. In this way, electrodes were obtained. In the catalyst layer, the content of platinum was 0.5 mg/cm$^2$, and the content of perfluorocarbon sulfonic acid was 1.2 mg/cm$^2$.

The cathode and the anode produced in the above manner had the same constitution. A hydrogen-ion conductive polymer electrolyte membrane was sandwiched between a pair of the electrodes, having an area of 100 cm$^2$, in such a manner that the printed catalyst layers faced inward. The resultant structure was hot pressed to produce a membrane electrode assembly (MEA). The hydrogen-ion conductive polymer electrolyte membrane used was a thin film of perfluorocarbon sulfonic acid having a thickness of 25 μm.

The electrolyte membrane had the same size as the separator plate and was punched with a trimming die to make holes that would become a pair of fuel gas manifold apertures, a pair of cooling water manifold apertures, and a pair of oxidant gas manifold apertures.

(iv) Fabrication of Fuel Cell

FIG. 11 is a longitudinal sectional view of the main part of a fuel cell.

A unit cell was assembled by sandwiching an MEA between the anode-side separator plate 10 having the anode-side sealing composite member 30 and the cathode-side separator plate 20 having the cathode-side sealing composite member 40. The MEA includes a hydrogen-ion conductive polymer electrolyte membrane 1 interposed between a pair of electrodes 2a and 2b. Therein, O-rings 3 were fitted into O-ring grooves 12a to 15a of the anode-side separator plate 10. In stacking the unit cells, a cooling section was provided by combining the separator plate 10 with the separator plate 20 of the adjoining unit cell, such that their cooling water flow channels 14b and 24b faced each other.

In this way, 50 unit cells were stacked to form a cell stack, and a current collector plate and an insulator plate were attached to each end of the cell stack. The resultant stack was sandwiched between stainless steel end plates and clamped with clamping rods at a clamping load of 700 kgf, to fabricate a fuel cell. This fuel cell was named cell A.

The surface pressure applied to the MEA and the separator plate was checked with pressure-sensitive paper, and the surface pressure applied to the MEA was 10 kgf/cm$^2$. As a result, it was found that the reaction force of the sealing member was 200 kgf.

The cell A was checked for gas leakage. The leakage check was performed by closing the outlet-side manifold aperture, introducing a helium gas into the cell A from the inlet-side manifold aperture at a pressure of 0.5 kgf/cm$^2$, and measuring the flow rate of the gas which flowed thereinto. As a result, no leakages of the air, fuel gas and cooling water were observed, which confirmed that the cell A had no problem with respect to the fluid sealing characteristics.

COMPARATIVE EXAMPLE 1

Figure 13:
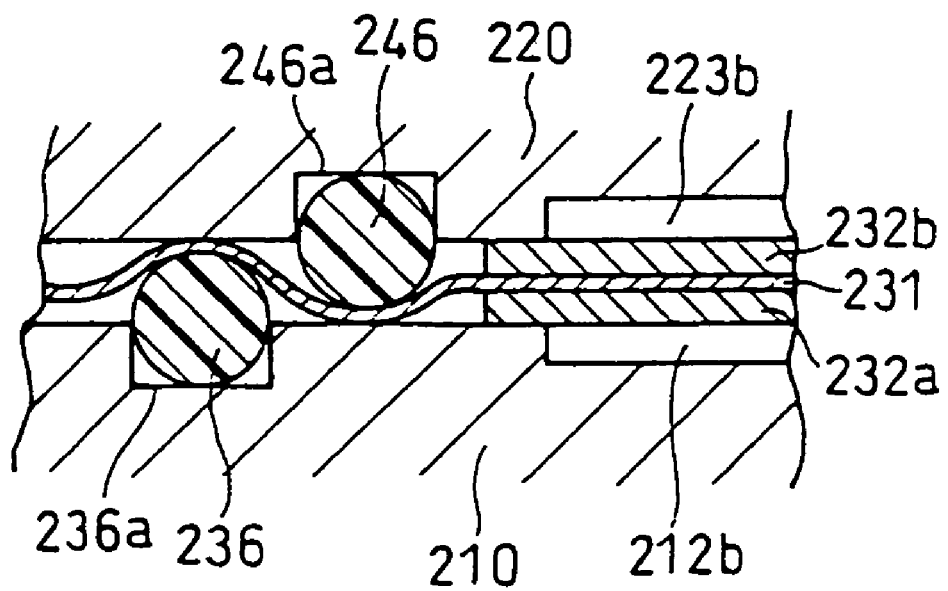
FIG. 13 is an enlarged sectional view of the vicinity of O-ring-shaped sealing members of a related art fuel cell.

Separator plates 210 and 220, having related art O-ring grooves 236a and 246a as illustrated in FIG. 13, were produced by machining isotropic graphite plates. The O-ring grooves 236a and 246a were 1.5 mm in width and 0.8 mm in depth. O-rings 236 and 246 were produced by compression molding using a predetermined mold. These O-rings were made of fluorocarbon rubber having a rubber hardness of 60.

A fuel cell was fabricated in the same manner as in Example 1, except for the use of the separator plates 210 and 220 and the O-rings 236 and 246, in place of the separator plates 10 and 20 and the sealing composite members 30 and 40 in Example 1. This fuel cell was named cell B. The other constituent components of the stack had the same configuration as those of Example 1, except that the size changes were made so as to conform to the O-ring shape.

The cell B was subjected to a gas leakage check in the same manner as in Example 1. No leakages of the air, fuel gas and cooling water were observed, which confirmed that the cell B had no problem with respect to the fluid sealing characteristics.

While each of the cell A of Example 1 and the cell B of Comparative Example 1 was retained at 85° C., a hydrogen gas humidified and heated to have a dew point of 83° C. was supplied to the anode and air humidified and heated to have a dew point of 78° C. was supplied to the cathode. As a result, both of the cells exhibited an open-circuit voltage of 50 V at the time of no load when power was not output to the outside.

Figure 29:
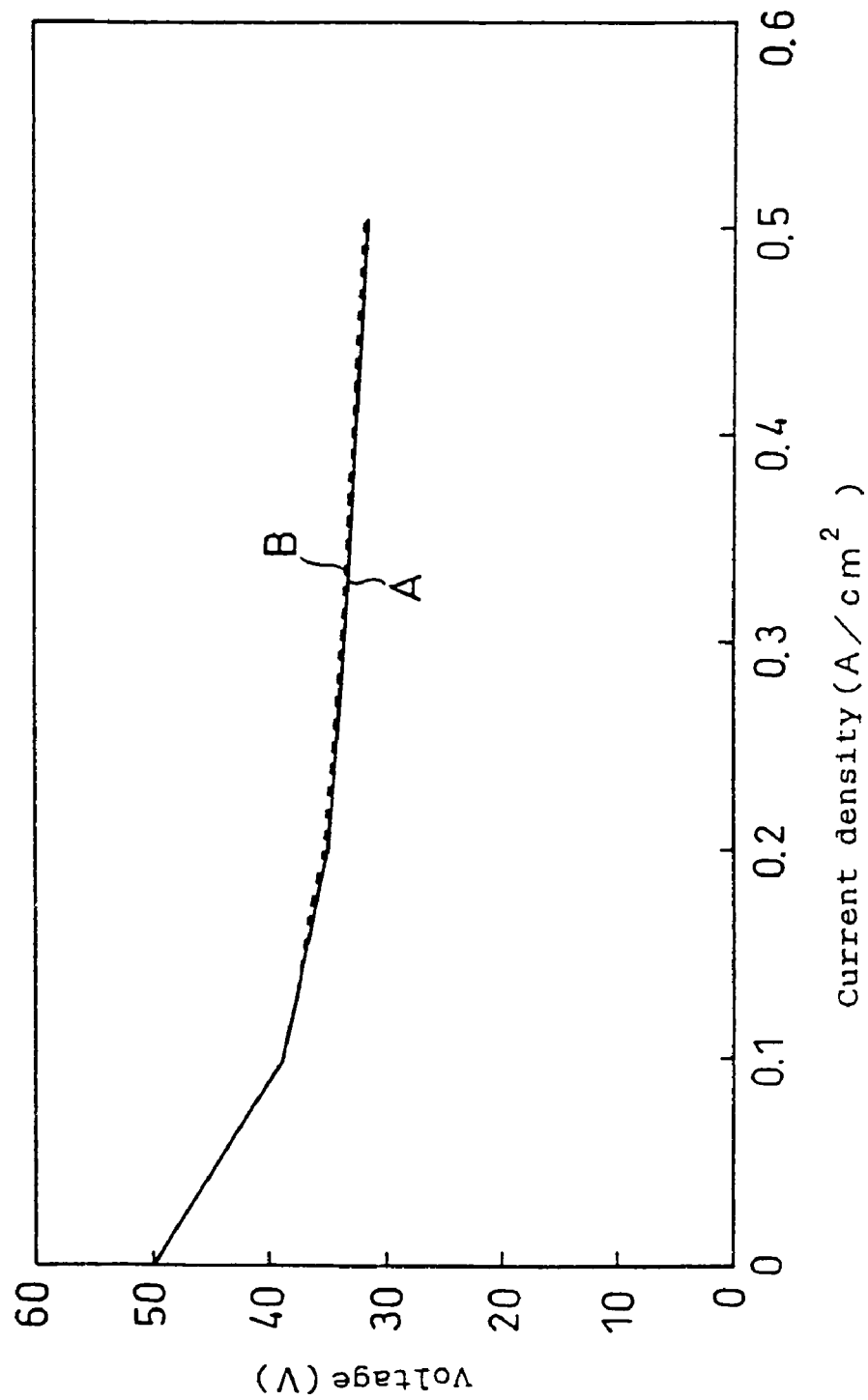
FIG. 29 is a graph showing the output characteristics of fuel cells of Example 1 and Comparative Example 1.

Also, the output characteristics of the cells A and B were evaluated under the conditions of a fuel utilization of 80%, an oxygen utilization of 40%, and a current density of 0.5 A/cm$^2$. The evaluation results are shown in FIG. 29. It was confirmed that the cell A of Example 1 of the present invention had performance equivalent to that of the cell B of Comparative Example 1.

EXAMPLE 2

An anode-side separator plate 50 and a cathode-side separator plate 60 of FIGS. 14 and 15 in Embodiment 2 were produced by machining isotropic graphite plates. The anode-side and cathode-side separator plates 50 and 60 had sealing member grooves 50a and 60a, respectively, which were 4 mm in width and 1 mm in depth. The thickness of the separator plates 50 and 60 was 3 mm. The width of grooves constituting the flow channels on both sides of the separator plates was 2 mm, and the pitch thereof was 3 mm.

Thereafter, a predetermined sealing member was molded on the separator plates 50 and 60, to produce the anode-side separator plate 50 having a sealing member 56 as illustrated in FIGS. 16 and 17 and the cathode-side separator plate 60 having a sealing member 66 as illustrated in FIGS. 19 and 20 in Embodiment 2.

The sealing member was molded on the separator plate by placing the separator plate in a mold, closing the mold, and injection molding fluorocarbon rubber at a temperature of 200° C. and a molding pressure of 150 kgf/cm$^2$. Secondary cross-linking was performed at 200° C. for 10 hours.

The thickness of the anode-side sealing member 56 was 100 μm from the surface of the anode-side separator plate 50, and the width thereof was 4.5 mm. The height of a rib 56a of the anode-side sealing member 56 from the main surface of the sealing member 56 was 300 μm. The thickness of the cathode-side sealing member 66 was 250 μm from the surface of the cathode-side separator plate 60, and the width thereof was 4.5 mm.

An MEA was produced in the same manner as in Example 1, except that the size of the polymer electrolyte membrane was reduced to the size as shown by the dotted line in FIG. 16, which is slightly smaller than that of the separator plate.

Using the separator plates and the MEAs thus produced, a fuel cell was fabricated in the same manner as in Example 1. This fuel cell was named cell C.

The cell C was subjected to a gas leakage check in the same manner as in Example 1. No leakages of the air, fuel gas and cooling water were observed, which confirmed that the cell C had no problem with respect to the fluid sealing characteristics as a stacked fuel cell.

COMPARATIVE EXAMPLE 2

Figure 24:
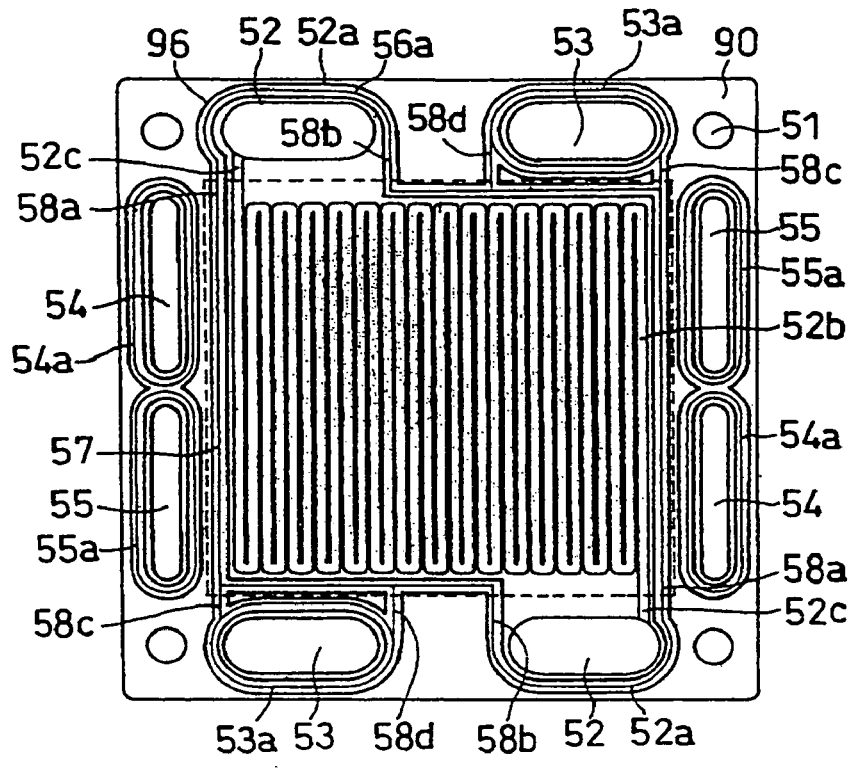
FIG. 24 is a front view of an anode-side separator plate in Comparative Example 2.
Figure 25:
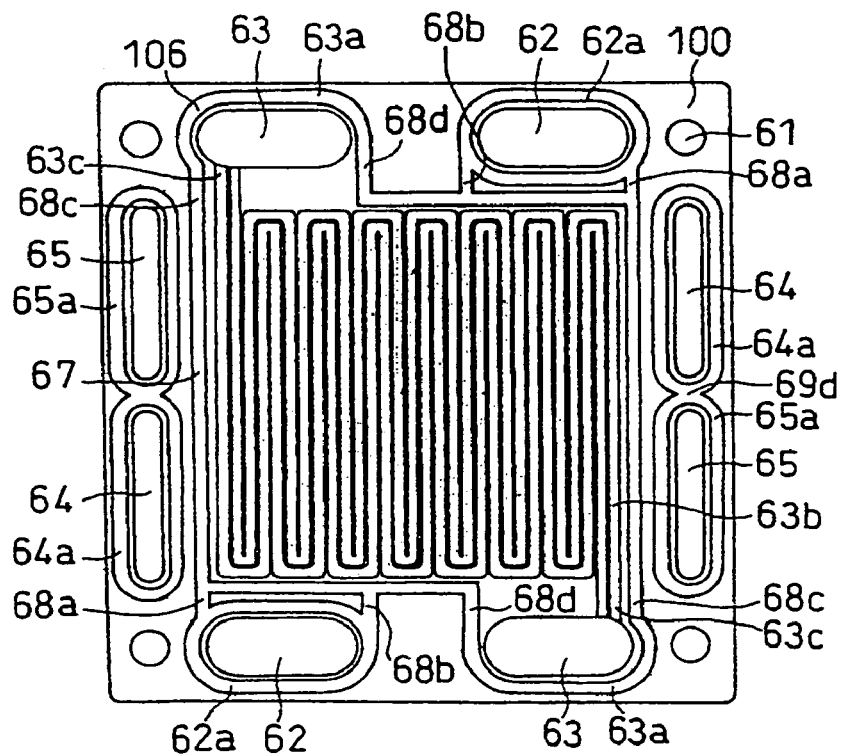
FIG. 25 is a front view of a cathode-side separator plate in Comparative Example 2.

As illustrated in FIG. 24, an anode-side separator plate 90 having a sealing member 96 was produced in the same manner as in Example 2. The sealing member 96 has the same configuration as that of the sealing member 56 in FIG. 16, except that the sealing member 96 does not have the sealing parts 59a, 59b, 59c, and 59d of the sealing member 56. Also, as illustrated in FIG. 25, a cathode-side separator plate 100 having a sealing member 106 was produced in the same manner as in Example 2. The sealing member 106 has the same configuration as that of the sealing member 66 in FIG. 19, except that the sealing member 106 does not have the sealing parts 69a, 69b, 69c, and 69d of the sealing member 66. A fuel cell was fabricated in the same manner as in Example 2 except for the use of these separator plates 90 and 100. This fuel cell was named cell D. The cell D was subjected to a gas leakage check in the same manner as in Example 1.

Since a rib 96a of the sealing member 96 has some parts not contacting the electrolyte membrane (the portion surrounded by the dotted line in FIG. 24), gas leakage was detected at these parts at a gas pressure of 5 kPa. Therefore, it was found that the cell C of Example 2 had better sealing characteristics than the cell D of Comparative Example 2.

While each of the cells C and D was retained at 85° C., a hydrogen gas humidified and heated to have a dew point of 83° C. was supplied to the anode and air humidified and heated to have a dew point of 78° C. was supplied to the cathode. As a result, at the time of no load when power was not output to the outside, the cell C of Example 2 of the present invention produced an open-circuit voltage of 50 V, while the cell D of Comparative Example 2 produced an open-circuit voltage of 42.5 V. It was found that the cell D of Comparative Example 2 caused a gas cross leakage.

Figure 30:
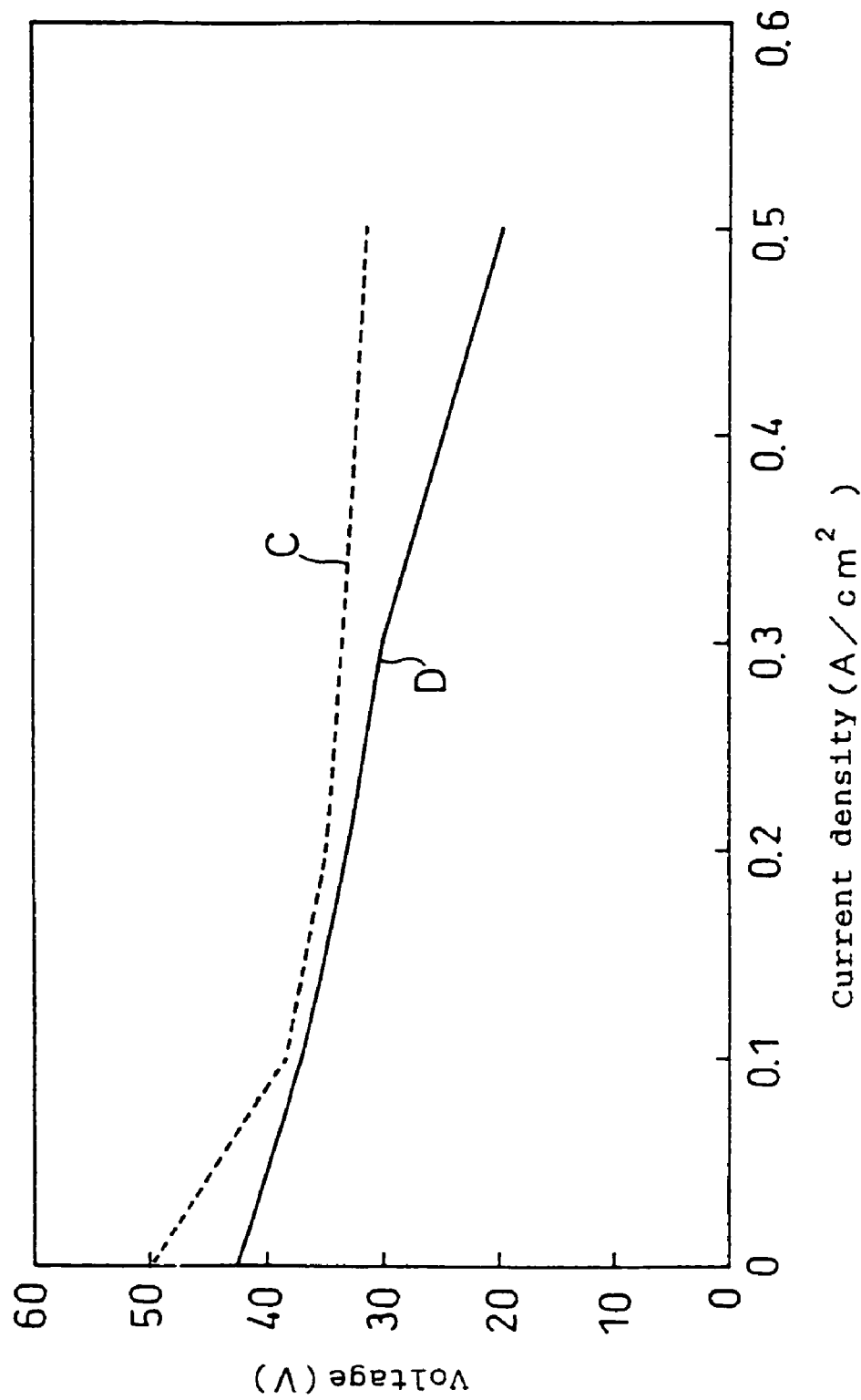
FIG. 30 is a graph showing the output characteristics of fuel cells of Example 2 and Comparative Example 2.

Also, the output characteristics of the cells C and D were evaluated under the conditions of a fuel utilization of 80%, an oxygen utilization of 40% and a current density of 0.5 A/cm$^2$. The evaluation results are shown in FIG. 30. It was found that the cell C of Example 2 had better performance than that of the cell D of Comparative Example 2.

EXAMPLE 3

The height of the rib 56a of the anode-side sealing member 56 was changed as illustrated in FIG. 18. The part 56a-1 of the rib 56a contacting the polymer electrolyte membrane was 300 μm in height from the main surface, and the part 56a-2 not contacting the polymer electrolyte membrane was 350 μm in height from the main surface. The part 56a-3, connecting these two parts, sloped gently. Except for the change in the rib height, cell C2 was fabricated in the same manner as in Example 2.

A comparison test was carried out on the cell C2 of this example and the cell C of Example 2, to examine their sealing characteristics, in the same manner as in Example 1 except that the measuring pressure was changed. As a result, with the cell C2, no leakage was detected until 300 kPa, but with the cell C, outward leakage from the manifold was detected at 200 kPa. Accordingly, it was found that the cell C2 of Example 3 had better sealing characteristics than the cell C of Example 2.

The reasons of these results are as follows. The sealing interference of the sealing part located outside the polymer electrolyte membrane was increased by the thickness of the membrane. The term "sealing interference" refers to the thickness of the sealing part to be compressed, which is necessary for the sealing part to exert sufficient elasticity for sealing. Further, at the location where the membrane thickness creates a difference in height, the difference in height was compensated or reduced by adjusting the rib height. Therefore, securing stable sealing interference throughout all the sealing parts became possible, resulting in an improvement in sealing characteristics.

EXAMPLE 4

An anode-side separator plate 50 and a cathode-side separator plates 60 were produced in the same manner as in Example 2. Separately, an anode-side sealing member 56 and a cathode-side sealing members 66 were produced.

The sealing members 56 and 66 were joined to the separator plates 50 and 60 by fitting the sealing members 56 and 66 into grooves 50a and 60a of the separator plates 50 and 60. Since the sealing members of this example were wider than the related art O-ring gaskets, they had better handling characteristics for assembly.

A fuel cell was fabricated in the same manner as in Example 2, except for the use of the anode-side and cathode-side separator plates 50 and 60 obtained in the above manner. This cell was named cell E.

The cell E was subjected to a gas leakage check in the same manner as in Example 1. No leakages of the air, fuel gas and cooling water were observed, which confirmed that the cell E had no problem with respect to the fluid sealing characteristics.

While the cell E was retained at 85° C., a hydrogen gas humidified and heated to have a dew point of 83° C. was supplied to the anode and air humidified and heated to have a dew point of 78° C. was supplied to the cathode. As a result, at the time of no load when power was not output to outside, the cell E of this example produced an open-circuit voltage of 50 V.

Figure 31:
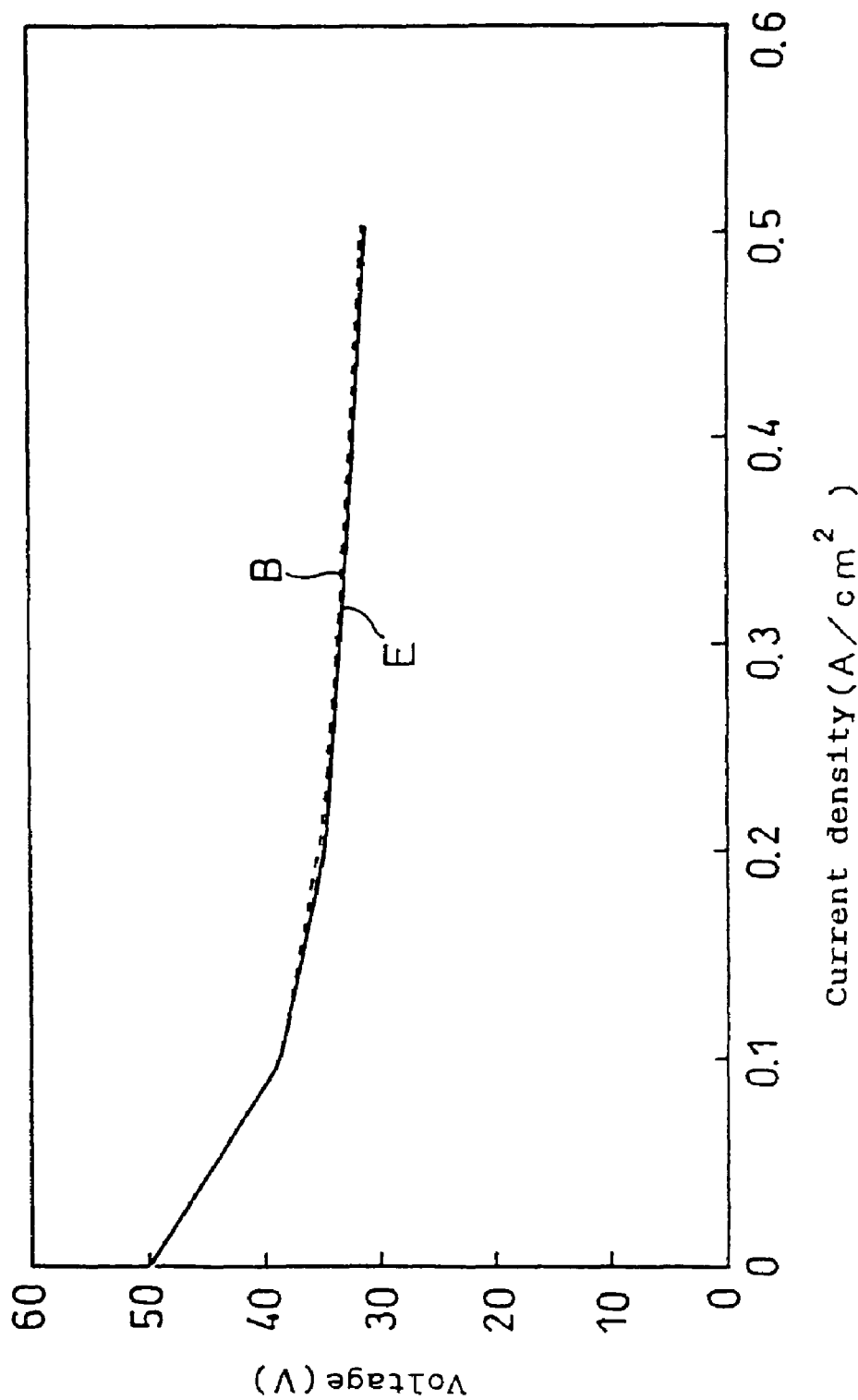
FIG. 31 is a graph showing the output characteristics of fuel cells of Example 3 and Comparative Example 1.

The cell E was examined for its output characteristics under the same conditions as those of Example 1. The evaluation results of the cell E and the cell B of Comparative Example 1 are shown in FIG. 31. It was confirmed that the cell E of this example had performance equivalent to that of the cell B of Comparative Example 1.

In order to obtain better adhesion of the sealing member to the separator plate, an adhesive made of butyl rubber may be applied to the surface of the sealing member of this example to be jointed to the separator plate. Even when such sealing members are used, it was confirmed that the performance of the resultant fuel cell was equivalent to that of the cell E of this example.

The separator plate combined integrally with the sealing member was vibrated strongly, but the sealing member did not detach from the separator plate. It was also confirmed that shock, such as vibration, during the assembly causes no trouble to the separator plate combined integrally with the sealing member.

EXAMPLE 5

An anode-side sealing member 76, as illustrated in FIGS. 26 and 27 in Embodiment 2, was provided on an anode-side separator plate 50 in the same manner as in Example 2.

The thickness of the anode-side sealing member 76 was 100 μm from the surface of the anode-side separator plate 50, and the height of a rib 76a of the sealing member 76 was 300 μm from the main surface of the sealing member 76.

In cases where some part of the separator plate 50 should not be covered with the sealing member 76 during an assembling process, part of the sealing member 76 covering substantially the whole surface of the separator plate 50 may be cut off, or the sealing member may be molded so as not to cover some part of the separator plate.

A fuel cell was fabricated in the same manner as in Example 2 except for the use of the anode-side sealing member 76. This fuel cell was named cell F.

The cell F was subjected to a gas leakage check under the same conditions as those of Example 1. No leakages of the air, fuel gas and cooling water were observed, which confirmed that the cell F had no problem with respect to the fluid sealing characteristics.

While the cell F was retained at 85° C., a hydrogen gas humidified and heated to have a dew point of 83° C. was supplied to the anode and air humidified and heated to have a dew point of 78° C. was supplied to the cathode. As a result, at the time of no load when power was not output to outside, the cell F of this example produced an open-circuit voltage of 50 V.

Figure 32:
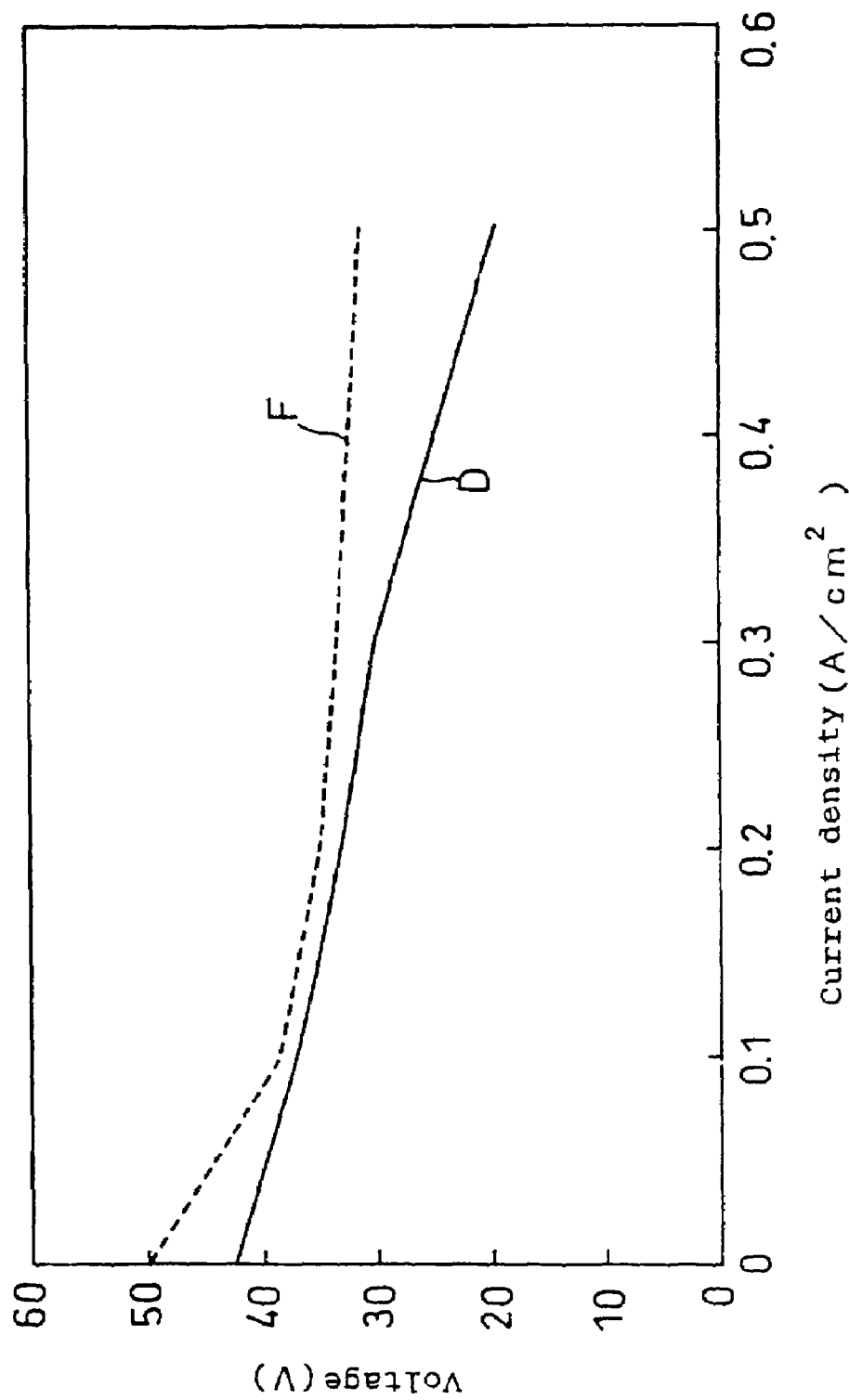
FIG. 32 is a graph showing the output characteristics of fuel cells of Example 4 and Comparative Example 2.

The cell F was examined for its output characteristics under the same conditions as those of Example 1. The evaluation results of the cell F and the cell D of Comparative Example 2 are shown in FIG. 32. As a result, it was confirmed that the cell F of this example had better performance than the cell D of Comparative Example 2.

Further, since the main surface of the anode-side separator plate 50 was covered with the sealing member 76, inclusion of conductive foreign matter caused no short-circuits.

EXAMPLE 6

An anode-side sealing member 86, as illustrated in FIG. 28 in Embodiment 2, was provided on an anode-side separator plate 50 in the same manner as in Example 2. The thickness of the anode-side sealing member 86 provided so as to cover the side faces of the anode-side separator plate 50 was 100 μm.

A fuel cell was fabricated in the same manner as in Example 2 except for the use of the anode-side sealing member 86. This fuel cell was named cell G.

The cell G was subjected to a gas leakage check in the same manner as in Example 1. No leakages of the air, fuel gas and cooling water were observed, which confirmed that the cell G had no problem with respect to the fluid sealing characteristics.

While the cell G was retained at 85° C., a hydrogen gas humidified and heated to have a dew point of 83° C. was supplied to the anode and air humidified and heated to have a dew point of 78° C. was supplied to the cathode. As a result, at the time of no load when power was not output to outside, the cell G of this example produced an open-circuit voltage of 50 V.

Figure 33:
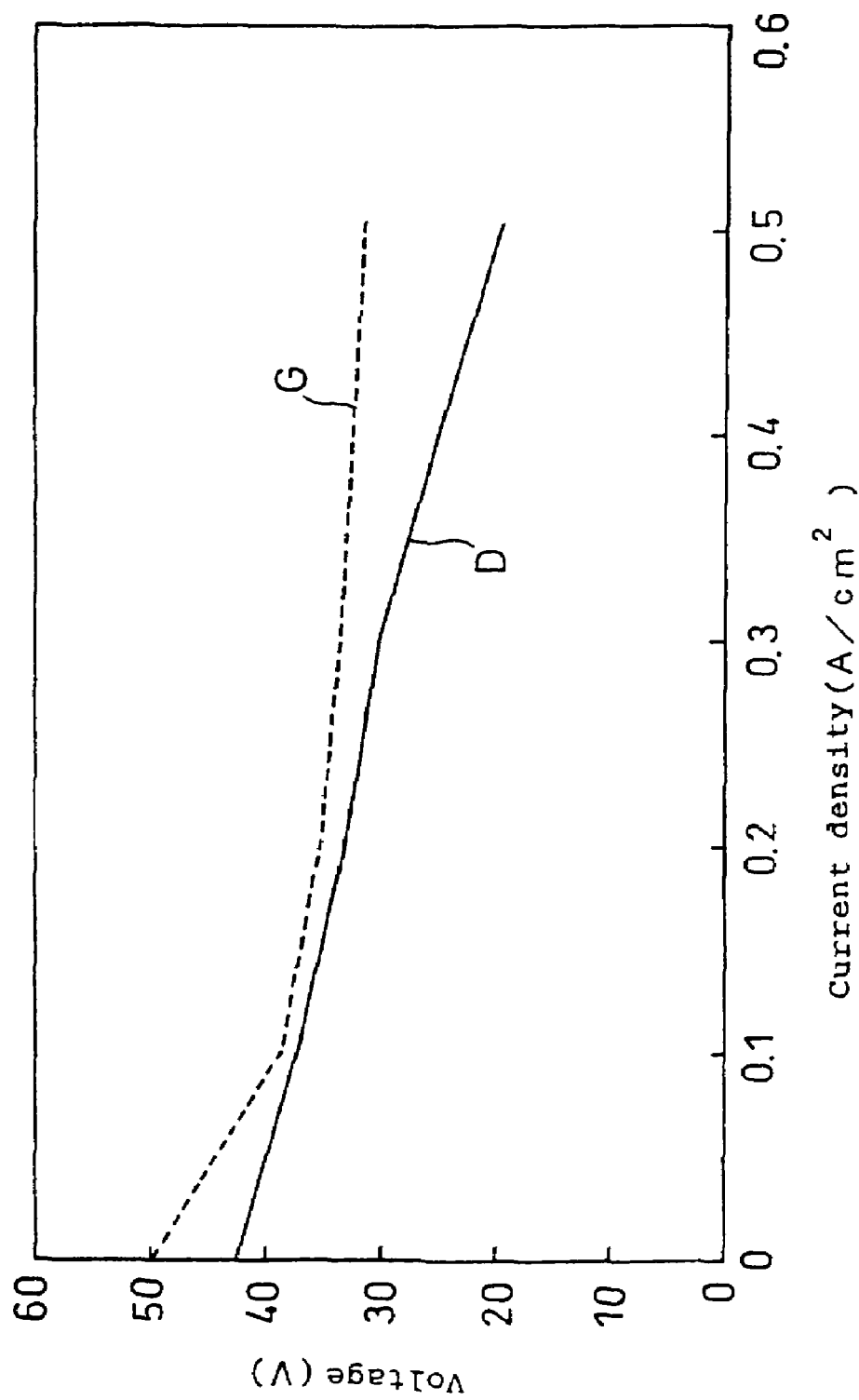
FIG. 33 is a graph showing the output characteristics of fuel cells of Example 5 and Comparative Example 2.

The cell G was examined for its output characteristics under the same conditions as those of Example 1. The evaluation results of the cell G and the cell D of Comparative Example 2 are shown in FIG. 33. As a result, it was confirmed that the cell G of this example had better performance than the cell D of Comparative Example 2.

Also, since the main surface of the anode-side separator plate 50 was covered with the sealing member 86, inclusion of conductive foreign matter caused no short-circuits. Further, the side faces of the separator plate 50 were covered with the sealing member 86, the existence of conductive foreign matter on the surface of the fuel cell caused no short-circuits, thereby reducing the danger of an electric shock during the use of the fuel cell.

Embodiment 3

Figure 34:
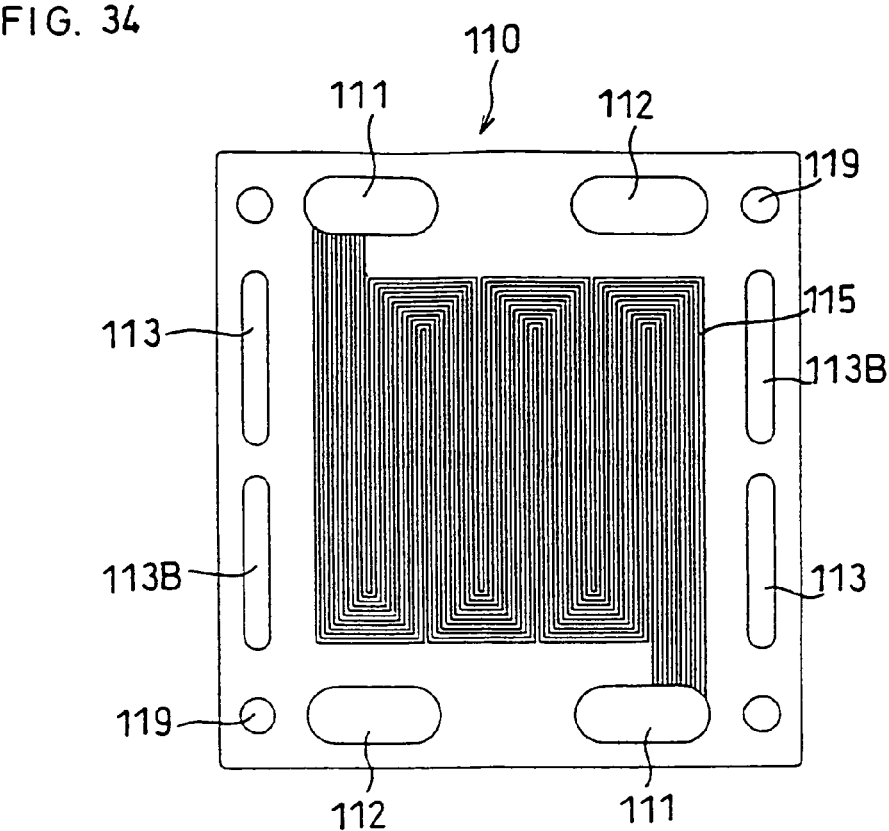
FIG. 34 is a front view of a cathode-side separator plate in Embodiment 3 of the present invention.
Figure 35:
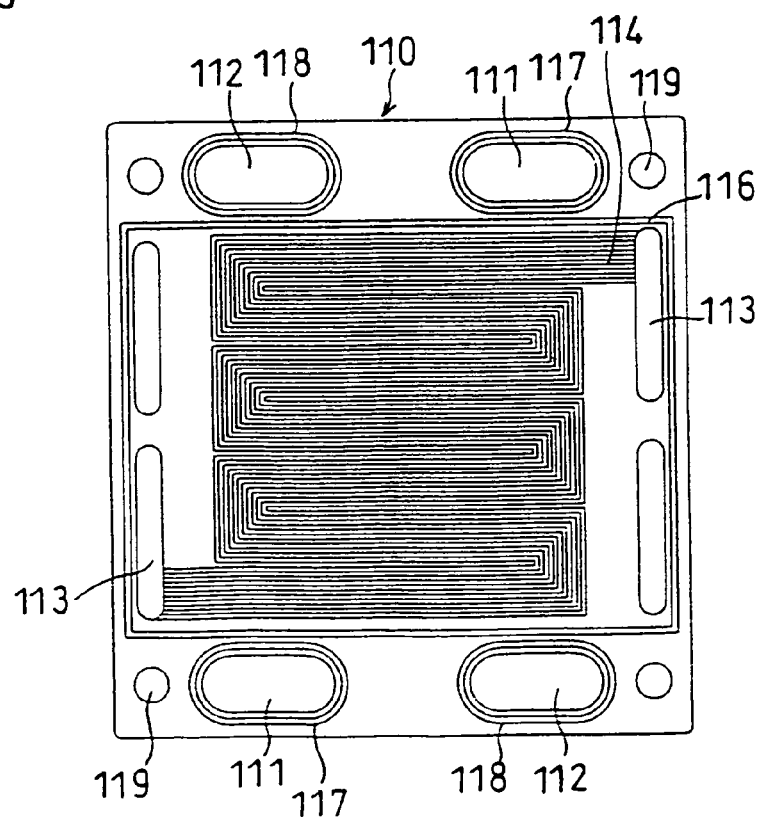
FIG. 35 is a back view of the cathode-side separator plate of FIG. 34.
Figure 36:
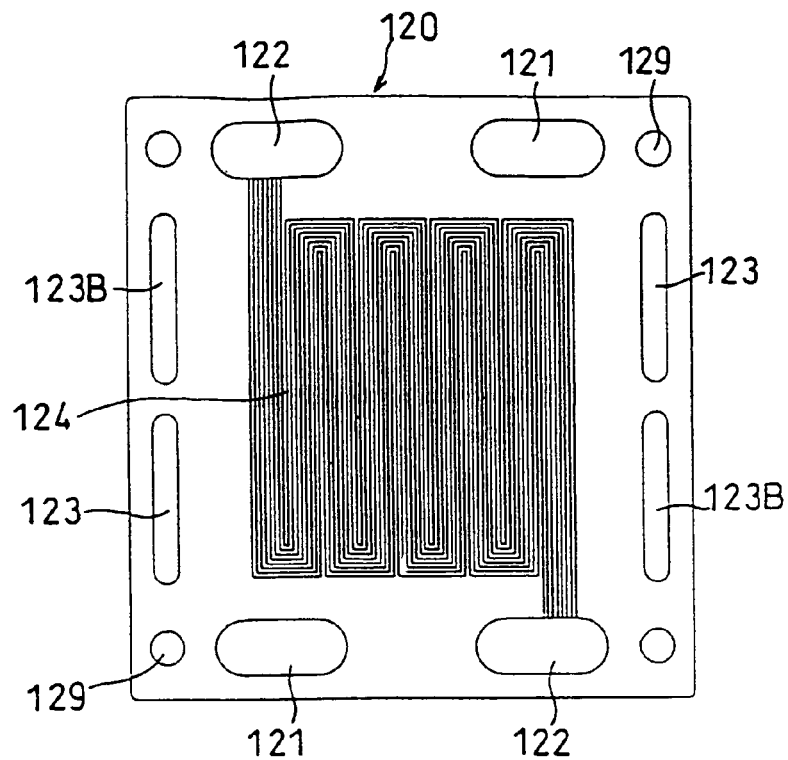
FIG. 36 is a front view of an anode-side separator plate in Embodiment 3 of the present invention.

FIG. 34 is a front view of a cathode-side separator plate of a fuel cell in this embodiment, and FIG. 35 is a back view thereof. FIG. 36 is a front view of an anode-side separator plate.

A cathode-side separator plate 110 has a pair of oxidant gas manifold apertures 111, a pair of fuel gas manifold apertures 112, a pair of cooling water manifold apertures 113, and four bolt holes 119 for clamping bolts. The separator plate 110 has, on the cathode facing side, a gas flow channel 115 connected to the pair of manifold apertures 111. On the backside, the separator plate 110 has a cooling water flow channel 114 connected to the pair of cooling water manifold apertures 113. The backside also has a sealing member groove 116 surrounding the manifold apertures 113 and the flow channel 114, and sealing member grooves 117 and 118 surrounding each of the manifold apertures 111 and 112. The separator plate 110 further has a pair of dummy manifold apertures 113B in balance with the manifold apertures 113.

An anode-side separator plate 120 has a pair of oxidant gas manifold apertures 121, a pair of fuel gas manifold apertures 122, a pair of cooling water manifold apertures 123, dummy manifold apertures 123B, and four bolt holes 129 for clamping bolts. The separator plate 120 has, on the anode facing side, a gas flow channel 124 connected to the pair of manifold apertures 122. In the same manner as the cathode-side separator plate, the backside of the separator plate 120 includes: a cooling water flow channel connected to the pair of cooling water manifold apertures 123; a sealing member groove surrounding the manifold apertures 123 and the cooling water flow channel; and sealing member grooves surrounding each of the manifold apertures 121 and 122, although they are not shown.

Figure 37:
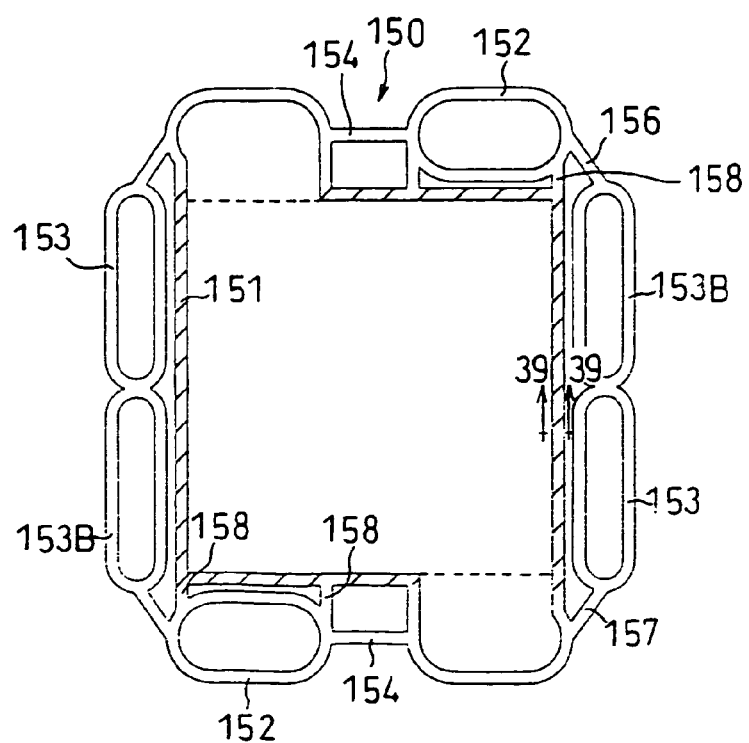
FIG. 37 is a front view of a cathode-side sealing member in Embodiment 3 of the present invention.
Figure 39:
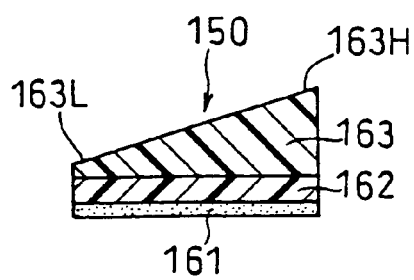
FIG. 39 is an enlarged sectional view taken on line 39-39 of FIG. 37.

As illustrated in FIG. 37, a cathode-side sealing member 150 has a part 151, which surrounds the pair of oxidant gas manifold apertures 111 and the gas flow channel 115 of the cathode-side separator plate 110 to form a closed loop. The sealing member 150 further includes: ring-shaped parts 152 surrounding each of the fuel gas manifold apertures 112; vertical parts 158 and horizontal parts 154 connecting the parts 152 to the part 151; ring-shaped parts 153 and 153B surrounding each of the cooling water manifold apertures 113 and the dummy manifold apertures 113B, the parts 153 and 153B being connected to each other; and parts 156 and 157 connecting the ends of the parts 153 and 153B to the part 151. As illustrated in FIG. 39, the sealing member 150 has a three-layered structure of an adhesive layer 161, a resin film 162, and a rubber layer 163. The part 151 is shaped like a wedge of which cross section is thin on the inner side and thick on the outer side. The parts 152, 153 and 153B are shaped like a wedge of which cross section is thick on the inner side, i.e., the manifold aperture side, and thin on the outer side.

The parts 154, 156, 157 and 158 also have a wedge-shaped section. Although the wedge-shaped cross section of these parts may be thick on either inner or outer side, it is preferably thick on the inner side and thin on the outer side.

Figure 38:
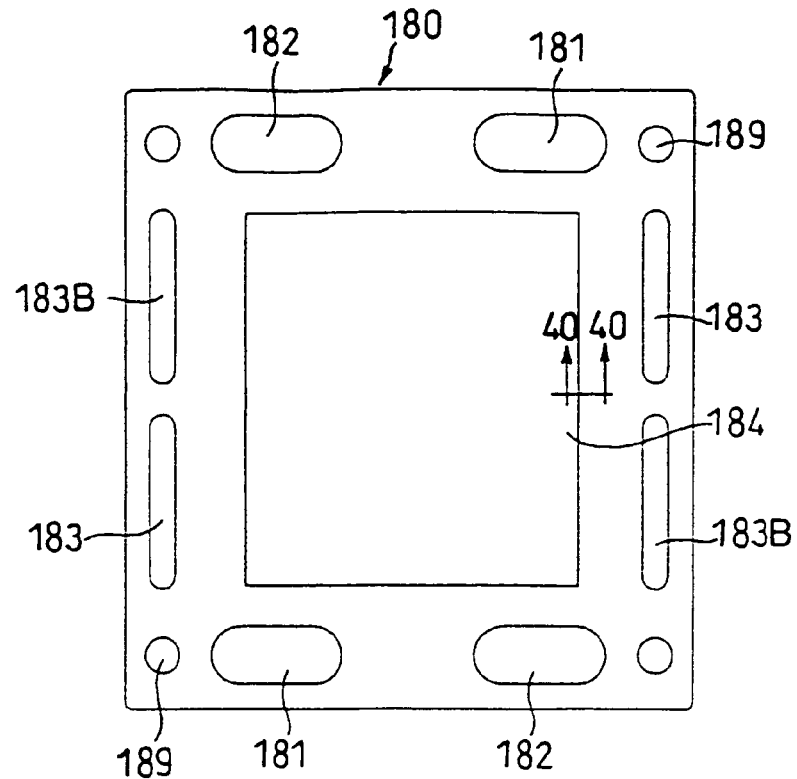
FIG. 38 is a front view of an anode-side sealing member in Embodiment 3 of the present invention.
Figure 40:
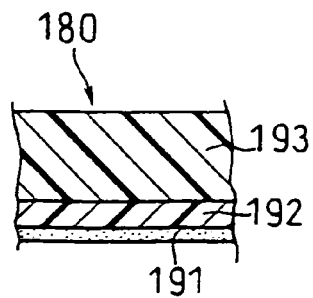
FIG. 40 is an enlarged sectional view taken on line 40-40 of FIG. 38.

As illustrated in FIG. 38, an anode-side sealing member 180 has manifold apertures 181, 182, 183, 183B and holes 189, communicating with the manifold apertures 121, 122, 123, 123B and holes 129, respectively, as well as a cut-away part 184 opposite to the anode. Although the sealing member 180 also has a three-layered structure of an adhesive layer 191, a resin film 192, and a rubber layer 193, similar to that of the sealing member 150, the sealing member 180 is in the form of a flat plate having a uniform thickness, as illustrated in FIG. 40.

Figure 41:
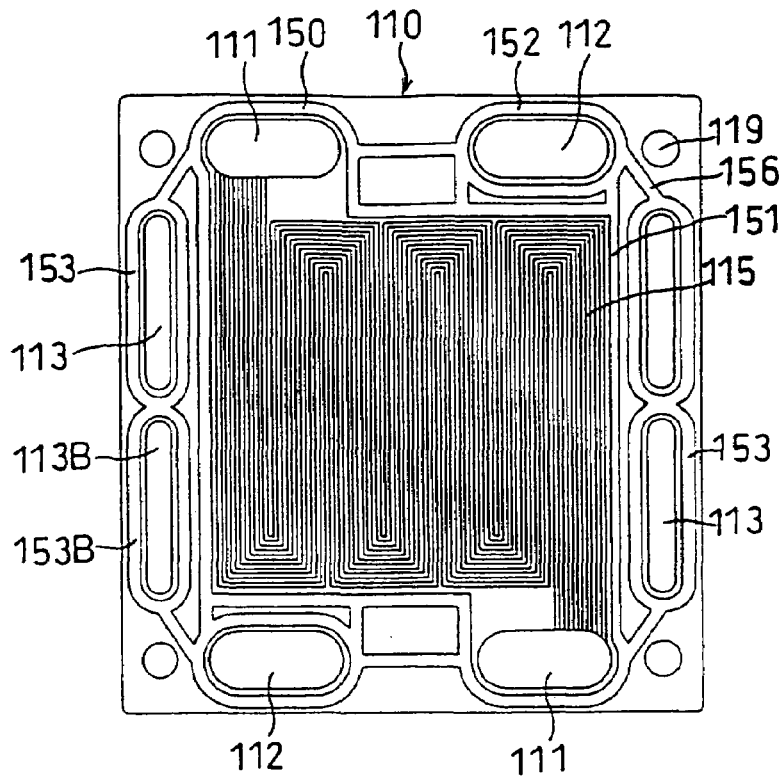
FIG. 41 is a front view of the cathode-side separator plate combined with the sealing member in Embodiment 3 of the present invention.
Figure 42:
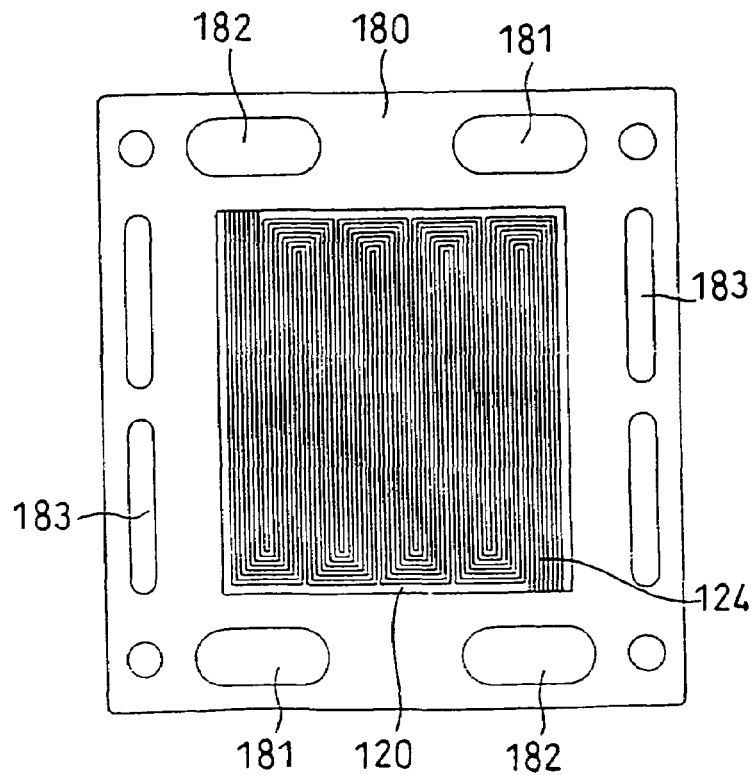
FIG. 42 is a front view of the anode-side separator plate combined with the sealing member in Embodiment 3 of the present invention.

The cathode-side sealing member 150 is placed on the cathode-facing surface of the cathode-side separator plate 110 such that its adhesive layer comes downward, and bonded thereto by hot pressing. Likewise, the anode-side sealing member 180 is placed on the anode-facing surface of the anode-side separator plate 120 such that its adhesive layer comes downward, and bonded thereto by hot pressing. FIGS. 41 and 42 illustrate the cathode-side separator plate and the anode-side separator plate, respectively, to which the sealing members are bonded in the above manner.

A unit cell is fabricated by sandwiching an MEA, which includes a polymer electrolyte membrane interposed between a pair of electrodes, between these separator plates joined with the sealing members. Between adjoining unit cells, a cooling section is provided at the joint of the backside of the cathode-side separator plate and the backside of the anode-side separator plate. Between these jointed separator plates, O-rings are fitted into the grooves 116, 117 and 118 of FIG. 35. This assembling procedure is described below.

First, guide pins are set in an assembly jig, and the anode-side separator plate 120 joined with the sealing member is placed thereon. Then, the MEA is carefully set along the guide pins such that the anode gas diffusion layer does not overlap the edge of the cut-away part 184 of the sealing member 180.

There is clearance between the guide pins set in the jig and respective components assembled. Since the dimensions of the MEA, in particular, vary greatly depending on the humidity of the assembling environment, there should be a large clearance. For stable assembly of the MEA, a clearance of 1 mm is necessary at the guide part.

After the MEA is set, the cathode-side separator plate 110 is mounted. Since the separator plate is not transparent, the cathode gas diffusion layer of the MEA and the sealing member cannot be directly observed, so the mounting is performed along the guide pins. It is desirable to set the cathode gas diffusion layer of the MEA in the center of the cathode-side sealing member 150. However, a combination of jig clearance and errors in the dimensions of the MEA and the separator plates leads to displacement.

When a related art sealing member in the form of a flat plate is used, the gas diffusion layer overlaps the edge of the sealing member around the upper limit of possible displacement, thereby resulting in insufficient sealing. If the clearance is made large, to facilitate the assembly, gas passes through the clearance and is not supplied to the electrode.

By contrast, when the sealing member having a wedge-shaped cross section of the present invention is used, even if the gas diffusion layer somewhat overlaps a lower part 163L of the sealing member 150 due to a dimensional error, the sealing is performed by a higher part 163H of the wedge shape. Therefore, gas is prevented from leaking out of the part 151 of the sealing member 150, so that sufficient sealing characteristics can be secured. Further, because of the wedge shape of the sealing member, a large clearance can be obtained between the sealing member and the gas diffusion layer in the planar direction of the separator plate, while the clearance can be kept small in the direction of the height. Therefore, the degradation in power generation performance, due to gas passing through the clearance without flowing a gas flow channel, does not occur.

As is clear from the above description, it is preferable that the cathode surrounding part of the part 151, i.e., the diagonally shaded portion in FIG. 37, be shaped like a wedge of which cross section is thin on the inner side and thick on the outer side. With respect to the parts other than the part 151, the cross section of the wedge shape may be thin on either inner or outer side, but it is preferably thin on the inner side and thick on the outer side in the same manner as the electrode surrounding part.

As described above, using the sealing member in accordance with the present invention, a cell is assembled by placing the anode-side separator plate joined with the sealing member on a jig with guide pins, setting the MEA along the guide pins, and thereafter mounting the cathode-side separator plate. According to this procedure, the assembly of a cell can be performed visually and carefully such that the anode gas diffusion layer does not overlap the edge of the cut-away part 184 of the sealing member 180. It is therefore possible to reduce the variations in pressure loss due to an assembly error on the anode side, where the utilization of reactive gas is high. On the cathode side, the joint of the cathode gas diffusion layer and the sealing member cannot be directly observed during the assembly, but the use of the sealing member having a wedge-shaped cross section makes it possible to prevent the gas leakage due to an assembly error.

EXAMPLE 7

A catalyst powder was prepared by placing 25% by weight of platinum particles, having an average particle size of approximately 30 Å, on an acetylene black carbon powder. This catalyst powder was mixed with a dispersion of perfluorocarbon sulfonic acid powder in ethanol. The mixture was applied onto one side of a 250 μm thick carbon fiber nonwoven fabric, and then dried to form an electrode catalyst layer. In the resultant electrode, the content of platinum was 0.5 mg/cm$^2$, and the content of perfluorocarbon sulfonic acid was 1.2 mg/cm$^2$.

The cathode and the anode produced in the above manner had the same constitution. They were bonded by hot pressing to both sides of the center part of a hydrogen-ion conductive polymer electrolyte membrane, having a slightly larger area than the electrodes, such that the printed catalyst layers came in contact with the electrolyte membrane. In this way, a membrane electrode assembly (MEA) was produced. The hydrogen-ion conductive polymer electrolyte membrane was a thin film of perfluorocarbon sulfonic acid having a thickness of 175 μm and had the same size as the separator plates which will be described later. The electrolyte membrane was punched with a trimming die to make holes corresponding to the respective manifold apertures for fuel gas, cooling water, and oxidant gas of the separator plates.

The constitution of each component of the fuel cell produced in this example is explained below.

A cathode-side separator plate 110 and an anode-side separator plate 120 having the above-described structure were produced by machining gas-tight isotropic graphite plates of 3 mm in thickness to form gas flow channels and manifold apertures. The width of grooves constituting the gas and cooling water flow channels was 1.5 mm, and the pitch thereof was 3 mm. The oxidant gas flow channel, the fuel gas flow channel, and the cooling water flow channel were serpentine and composed of seven parallel grooves, four parallel grooves, and six parallel grooves, respectively.

An anode-side sealing member 180 was a sheet which included a 100 μm thick polyimide film 192 having a 25 μm thick adhesive layer 191, made of butyl rubber, on one side and a 125 μm thick fluorocarbon rubber layer 193 on the other side. The fluorocarbon rubber layer 193 was formed on the polyimide film 192 by molding. This sheet was punched with a trimming die to form manifold apertures, bolt holes, and an electrode-opposing part (cut-away part 184). The dimensions of the electrode-opposing part were determined such that the clearance between the electrode part and itself was 0.25 mm on one side.

A cathode-side sealing member 150 was produced by molding fluorocarbon rubber 163 on a 100 μm thick polyimide film 162 so as to surround the area that needs to be sealed. The fluorocarbon rubber 163 had a width of 3 mm and a wedge-shaped cross section of which height was 300 μm on the higher side and 50 μm on the lower side. That is, as explained in Embodiment 3, a part 151 had a cross section which was thin on the inner side and thick on the outer side. Parts 152, 153, and 153B had a cross section which was thick on the inner side and thin on the outer side. The fluorocarbon rubber was molded on the polyimide film by setting the polyimide film in a mold, closing the mold, and molding fluorocarbon rubber at a temperature of 200° C. and a molding pressure of 150 kgf/cm$^2$. Secondary cross-linking was performed at 200° C. for 10 hours. Thereafter, an adhesive layer 161, made of butyl rubber and having a thickness of 25 μm was transferred to the polyimide film, and the surface of the adhesive layer was covered with a release film made of polypropylene. The resultant sheet was punched with a trimming die to form manifold apertures, bolt holes, and an electrode-opposing part. The dimensions of the electrode-opposing part were determined such that the clearance between the electrode part and itself was 0.25 mm on one side.

The sealing members 150 and 180 thus produced were placed on the separator plates 110 and 120, respectively, and hot pressed thereto at a temperature of 100° C. and a press load of 2,000 kgf for one minute.

Thereafter, as explained previously, guide pins were set in an assembly jig, and the anode-side separator plate, the MEA, and the cathode-side separator plate were sequentially assembled along the guide pins. In this way, 50 unit cells were stacked. The electrode area of the MEA was 100 cm$^2$. A current collector plate and an insulator plate were attached to each end of the resultant cell stack, and this stack was sandwiched between stainless steel end plates and clamped with clamping rods at a clamping load of 700 kgf. The surface pressure applied to the MEA and the separator plate was checked with pressure-sensitive paper, and it was found that the surface pressure applied to the MEA was 10 kgf/cm$^2$. As a result, it was found that the reaction force of the sealing member was 200 kgf.

The fuel cell thus produced was checked for gas leakage. The leakage check was performed by closing the outlet-side manifold aperture, introducing a helium gas into the fuel cell from the inlet-side manifold aperture at a pressure of 0.5 kgf/cm$^2$, and measuring the flow rate of the gas which flowed thereinto. As a result, no leakages of the air, fuel gas and cooling water were observed, which confirmed that this fuel cell had no problem with respect to the fluid sealing characteristics as a stacked fuel cell.

COMPARATIVE EXAMPLE 3

A related art flat-plate-type sealing member was used for the sealing on the oxidant gas side. The constitution was the same as that of Example 7 except that the sealing member on the oxidant gas side was a flat plate. In the same manner as in Example 7, 50 unit cells were stacked using an assembly jig, and the resultant fuel cell was subjected to a leakage check in the same manner. Since the surface pressure applied to the MEA was 10 kgf/cm$^2$ at a clamping load of 2,000 kgf, the clamping was performed at 2,000 kgf. As a result, some of the cells caused outward gas leakage or cross gas leakage from the oxidant gas side to the fuel gas side, or both thereof, thereby resulting in sealing failure. The conditions of the leakage check were the same as those of Example 7.

After this test, the fuel cell of Example 7 and the fuel cell of Comparative Example 3 were decomposed, and it was found that the cathode-side gas diffusion layer of the MEA was somewhat displaced from the center of the cathode-side sealing member in both of the fuel cells. With the fuel cell of Example 7, the sealing was provided by the higher part of the sealing member having a wedge-shaped cross section. Thus, it was found that even if the gas diffusion layer somewhat overlaps the edge of the sealing member, sufficient sealing characteristics can be obtained within the possible dislocation range of the gas diffusion layer during the assembly. On the other hand, with the fuel cell of Comparative Example 3, the gas diffusion layer and the sealing member were also dislocated, and it was found that even just partial overlapping between the gas diffusion layer and the flat-plate-type sealing member impairs the sealing characteristics, inviting a sealing failure.

Next, from the fuel cell of Comparative Example 3, unit cells causing sealing failure were removed, and 30 cells capable of normal operation were selected by conducting a leakage check. Using the selected 30 cells, a fuel cell was assembled. This fuel cell and the fuel cell of Example 7 including 50 cells were evaluated for their performance as follows.

While each of the fuel cell of Example 7 and the fuel cell of Comparative Example 3 was retained at 75° C., a hydrogen gas humidified and heated to have a dew point of 70° C. was supplied to the anode and air humidified and heated to have a dew point of 60° C. was supplied to the cathode. As a result, at the time of no load when current was not output to the outside, the fuel cell of Example 7 and the fuel cell of Comparative Example 3 exhibited an open-circuit voltage of 50 V and 30V, respectively. It was confirmed that there were no troubles such as cross leakage and short.

Figure 44:
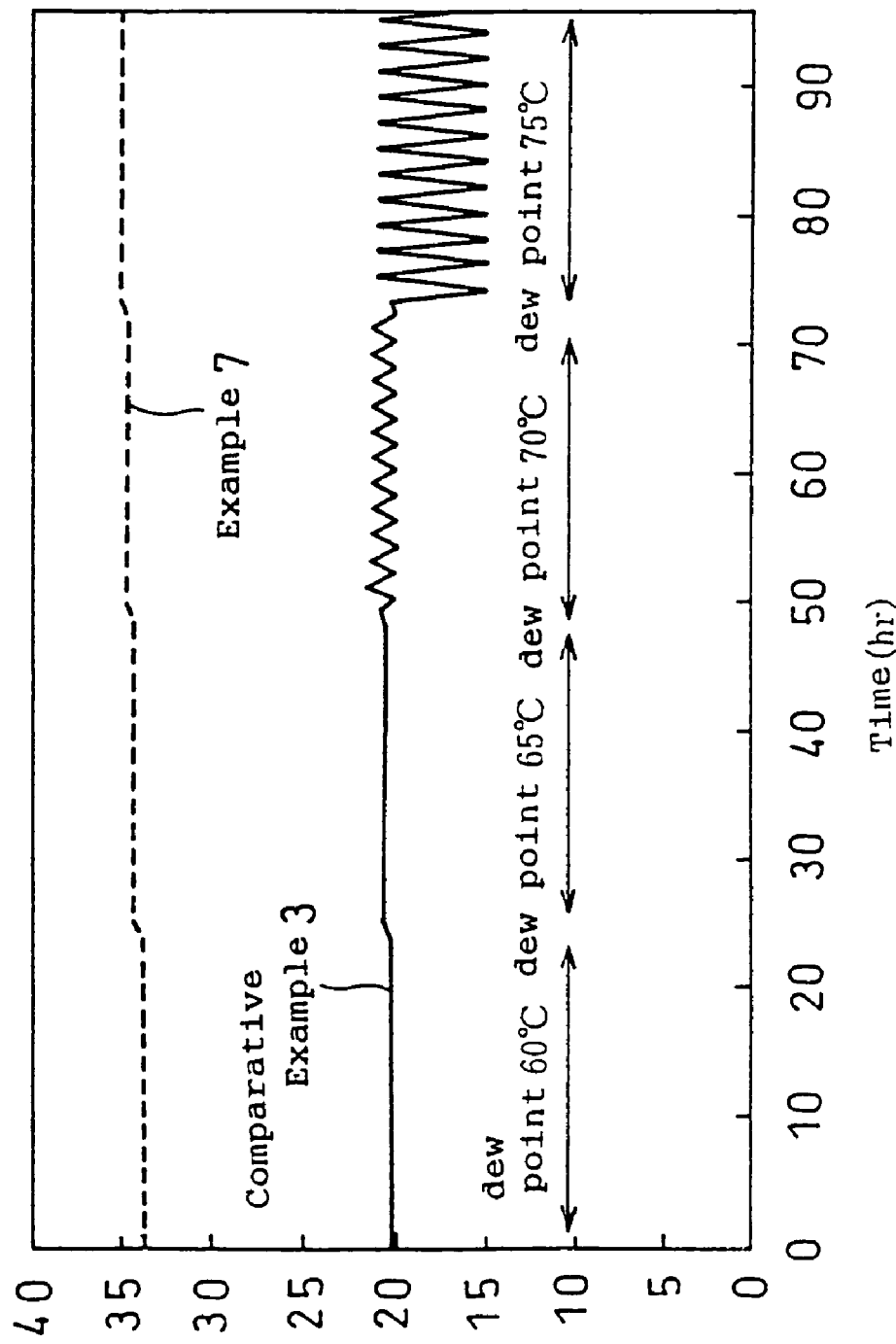
FIG. 44 is a graph showing the output voltage characteristics of fuel cells of Example 7 of the present invention and Comparative Example 3.

These fuel cells were operated to generate power at a fuel utilization of 80%, an oxygen utilization of 40% and a current density of 0.3 A/cm$^2$. While the fuel gas was constantly humidified such that the dew point of 70° C. was retained, the degree of humidification of the air was varied in increments of 5° C. from 60° C., and under each operating condition, the power generation was performed for 24 hours. FIG. 44 shows voltage stabilities of the fuel cells. The fuel cell of Comparative Example 3 exhibited instability in output voltage when the dew point of the oxidant gas was 70° C. or higher, and it exhibited a drop in output voltage at the dew point of 75° C. By contrast, the fuel cell of Example 7 exhibited stability in output voltage up to the dew point of 75° C. The pressure loss on the oxidant gas side was 5% higher in the fuel cell of Comparative Example 3 than the fuel cell of Example 7, and the pressure loss fluctuated at the dew points of 70° C. or higher.

These evaluated fuel cells were decomposed to check the gas flow channels of the separator plates, and it was found that the fuel cell of Comparative Example 3 had more water droplets in the gas flow channels of the cathode-side separator plates than the fuel cell of Example 7.

COMPARATIVE EXAMPLE 4

A cell in which the one-side clearance between the cathode-side sealing member and the gas diffusion layer in Comparative Example 3 was enlarged from 0.25 mm to 1.0 mm, was produced. A fuel cell including a stack of 30 cells was produced in the same manner as in Comparative Example 3, except for the enlarged clearance between the gas diffusion layer and the sealing member.

Figure 45:
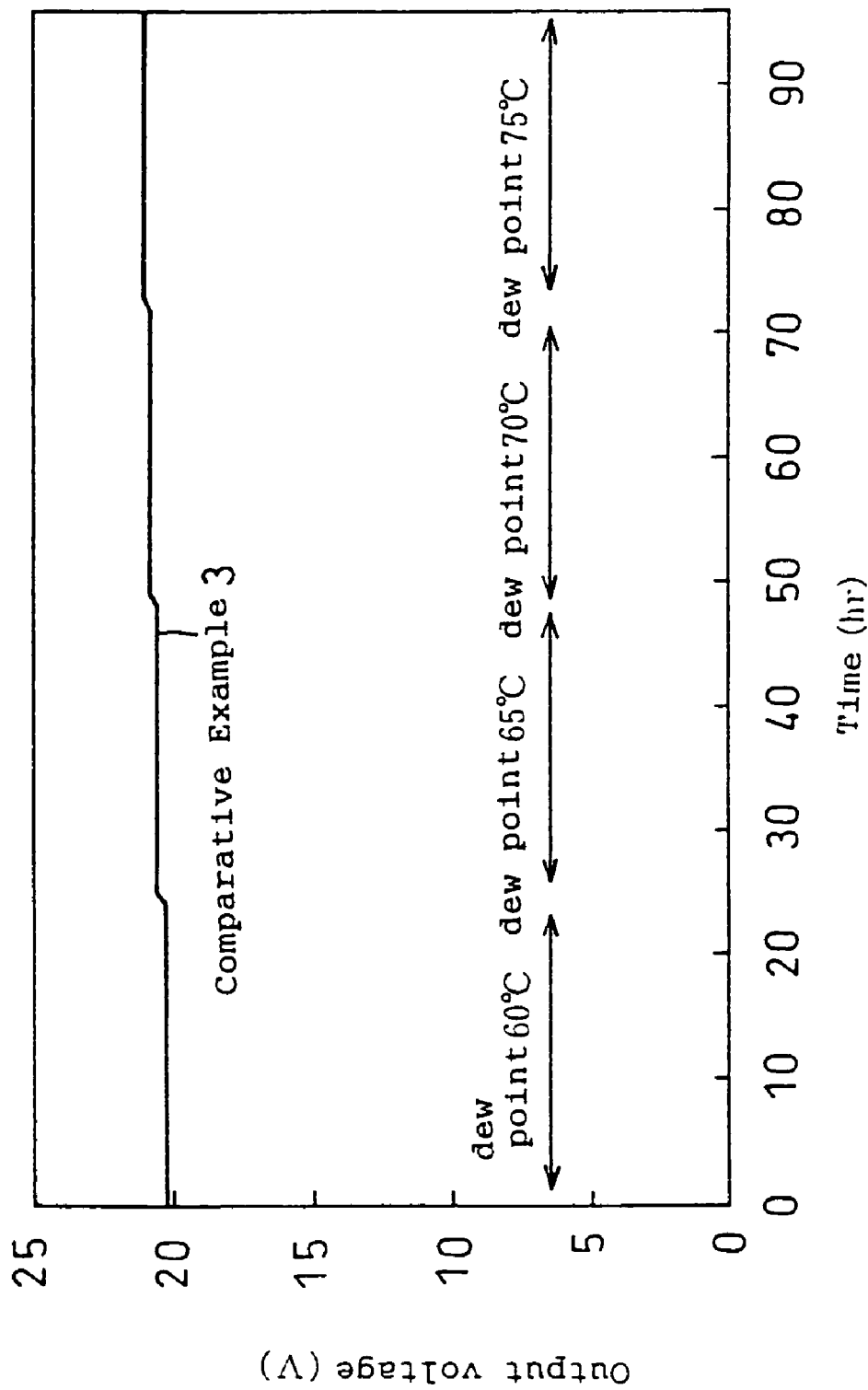
FIG. 45 is a graph showing the output characteristics of fuel cells of Example 7 of the present invention and Comparative Example 4.

This fuel cell was evaluated under the same conditions as those of Comparative Example 3. The cell open-circuit voltage was 30 V, and the output characteristics upon the variation of the dew point of the oxidant gas are shown in FIG. 45. The output voltage of the fuel cell of Comparative Example 4 was stable, up to the dew point of 75° C., in comparison with that of the fuel cell of Comparative Example 3. However, the absolute values of the output voltage under the stable conditions were lower than those of Comparative Example 3. The fluctuations in the pressure loss on the oxidant gas side were not observed.

After the evaluation, the fuel cell of Comparative Example. 4 was decomposed to check the gas flow channels of the cathode-side separator plates. Water droplets equivalent to those of the fuel cell of Example 7 were found.

Solid polymer electrolyte fuel cells generate water, as well as power, on the cathode side. For stable power generation, it is important to discharge the generated water promptly and stably. An unstable discharge of the generated water leads to an unstable supply of reactive gas, causing fluctuations in output voltage. In the worst case, due to the shortage of reactive gas, reversal of electrode polarity occurs, possibly causing an irreversible deterioration of the cell.

From the evaluation and analysis results of Example 7 and Comparative Examples 3 and 4, it was found that the clearance between the cathode-side gas diffusion layer and the sealing member is effective in discharging the generated water and obtaining stable output voltages.

However, it was also confirmed that if the clearance is too large, the amount of gas passing through the clearance without contributing to the electrode reaction increases, resulting in a decrease in output voltage. In this sense, it was confirmed that the fuel cell of Example 7 is preferable in terms of securing a necessary clearance which does not cause such performance degradation on the cathode side.

The sealing method of Example 7 employing a wedge-shaped cross section does not need grooves for receiving O-rings, as opposed to the sealing method employing O-rings. Thus, it is needless to say that the sealing method of Example 7 can reduce the thickness of the separator plates, and therefore, the size of the fuel cell.

EXAMPLE 8

Using the same MEAs, sealing members, and separator plates as those of Example 7, 20 cells were stacked in the same manner as in Example 7. However, cell stacks of five patterns were produced by varying the one-side clearance between the electrode and the sealing member, as shown in Table 1. The assembling characteristics of these cell stacks are shown in Table 2.

TABLE 1

|  | Pattern 1 | Pattern 2 | Pattern 3 | Pattern 4 | Pattern 5 |
|---|---|---|---|---|---|
| One-side clearance between electrode and sealing member | 0.1 mm | 0.2 mm | 0.25 mm | 0.35 mm | 0.5 mm |

A current collector plate and an insulator plate were attached to each end of each cell stack. The resultant stack was sandwiched between stainless steel end plates and clamped with clamping rods at a clamping load of 2,000 kgf. The surface pressure applied to the MEA and the separator plate was checked with pressure-sensitive paper, and it was found that the surface pressure applied to the MEA was 10 kgf/cm$^2$.

The fuel cells thus produced were subjected to a gas leakage check under the same conditions as those of Example 7. Also, these fuel cells were decomposed after the leakage check. The results are shown in Table 2.

TABLE 2

|  | Pattern 1 | Pattern 2 | Pattern 3 | Pattern 4 | Pattern 5 |
|---|---|---|---|---|---|
| Assembling characteristics | Poor | Slightly poor | Good | Good | Good |
| Leakage check | Leakage | Leakage | No leakage Normal | No leakage Normal | No leakage Normal |
| Observation after decomposition | Overlap of gas diffusion layer with sealing member | Overlap of gas diffusion layer with sealing member |  |  |  |

These results indicate that the one-side clearance (cl) between the sealing member and the gas diffusion layer is preferably 0.25 mm (Pattern 3) or more, from the viewpoints of assembling characteristics and sealing reliability. The fuel cell of Pattern 3 was evaluated under the same conditions as those of Example 7. A cell open circuit voltage of 20 V was obtained, and it was found that there were no problems such as cross leakage and short. With respect to the output voltage characteristics upon the variation of dew point of the oxidant gas, a stable high output voltage of 14 V (0.7 V per unit cell) was obtained up to the dew point of 75° C.

Next, the variations in the pressure loss of the unit cells were evaluated by the differences in the flow channel pattern of the separator plates and the pattern of the clearance between the gas diffusion layer and the sealing member. The forming method of the gas flow channels, the production method of the sealing members, the fabrication method of the cells, and the configurations of the cell components were the same as those as described above. Table 3 shows evaluated patterns. The variations in pressure loss were evaluated by supplying a dry nitrogen gas, of which reactive gas utilization was 40%, from the inlet-side manifold at room temperature, and measuring the pressure loss between the inlet-side manifold and the outlet-side manifold. The evaluation results are shown in Table 4 and FIG. 46.

TABLE 3

|  | Pattern 1 | Pattern 2 | Pattern 3 | Pattern 4 | Pattern 5 | Pattern 6 |
|---|---|---|---|---|---|---|
| Gas channel/ Number of paths P | 7 | 2 | 3 | 1 | 6 | 2 |
| Gas channel/ Length L | 1080 mm | 3717 mm | 2451 mm | 2270 mm | 450 mm | 1260 mm |
| Gas channel/ Hydraulic diameter D of cross section | 1 mm | 1 mm | 1 mm | 0.73 mm | 0.82 mm | 0.7 mm |
| Gas channel/ (L/D/P) × 2 | 309 | 3717 | 1634 | 6219 | 183 | 1800 |
| Clearance/ Length l | 0.244 mm | 0.244 mm | 0.244 mm | 0.12 mm | 0.12 mm | 0.12 mm |
| Clearance/ Hydraulic diameter d of cross section | 0.374 mm | 0.272 mm | 0.272 mm | 0.299 mm | 0.25 mm | 0.25 mm |
| Clearance/ l/d | 652 | 898 | 898 | 402 | 480 | 480 |
| l/d/ [(L/D/P) × 2] | 2.1 | 0.24 | 0.55 | 0.06 | 2.6 | 0.27 |

TABLE 4

|  | Pattern 1 | Pattern 2 | Pattern 3 | Pattern 4 | Pattern 5 | Pattern 6 |
|---|---|---|---|---|---|---|
| Assembling characteristics | Good | Good | Good | Good | Good | Good |
| Leakage check | No leakage | No leakage | No leakage | No leakage | No leakage | No leakage |
| Pressure loss variation (ΔkPa) | 0.5 | 7 | 1 | 10 | 0.5 | 1.5 |
| Evaluation | Good | Slightly poor | Good | Poor | Good | Good |

Figure 46:
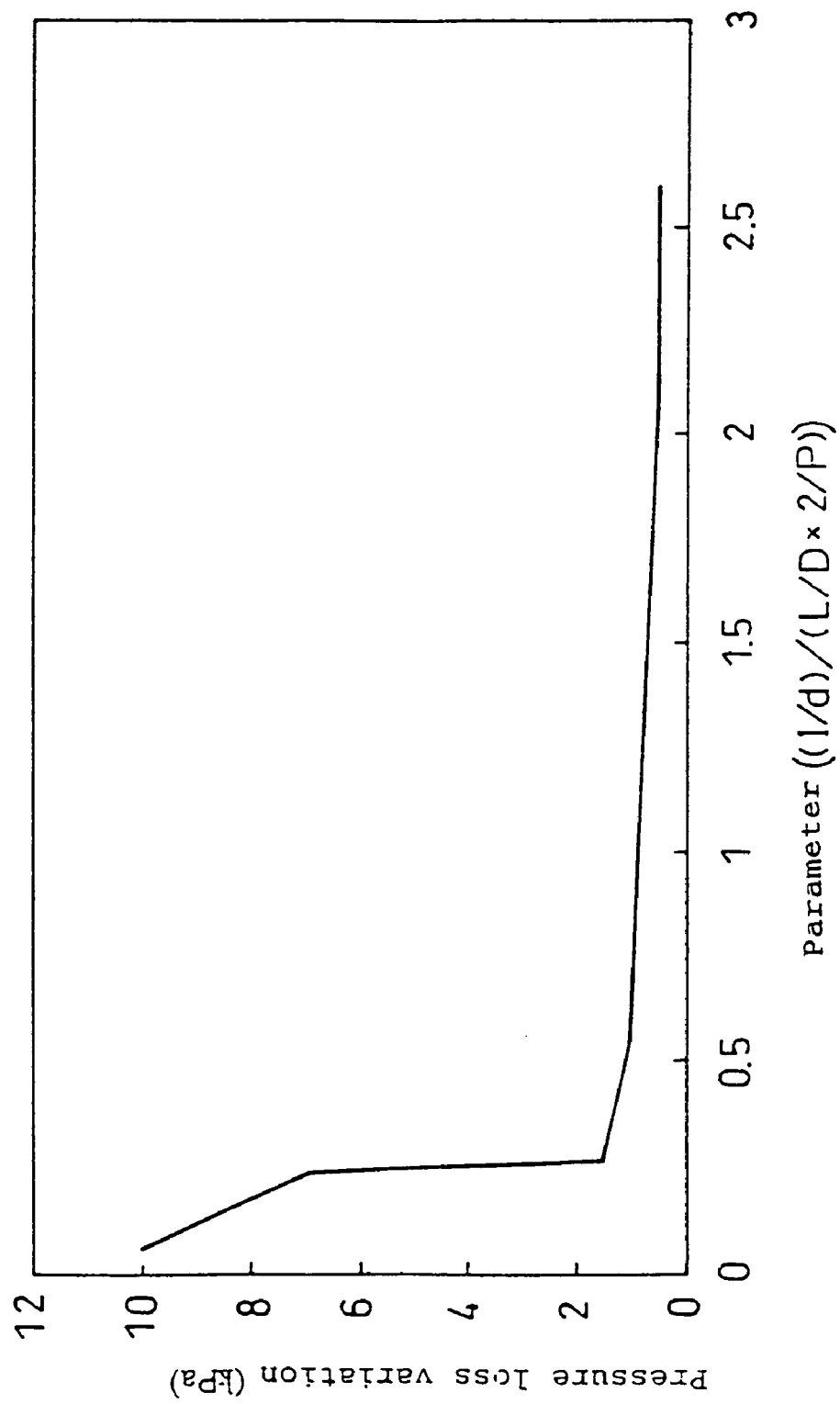
FIG. 46 is a graph showing the relationship between pressure loss variations and parameters regulating a separator plate and a sealing member in Example 7 of the present invention.

FIG. 46 is a graph showing the pressure loss variation in connection with the relation between the gas flow channel and the clearance between the gas diffusion layer and the sealing member. The parameter (l/d)/(L/D×2/P) is a modified ratio of values defined by the length (L) of a gas flow channel of a cathode-side separator plate, the hydraulic diameter (D) of a cross section of the gas flow channel, the number of paths (P) of the gas flow channel, the hydraulic diameter (d) of a cross section of clearance, and the length (l) of the clearance. FIG. 46 indicates that the pressure loss variation decreases sharply around the value of the parameter of 0.27. It is noted that a gas flow channel includes one or more grooves and that the term "path" refers to each groove of the gas flow channel.

Figure 43:
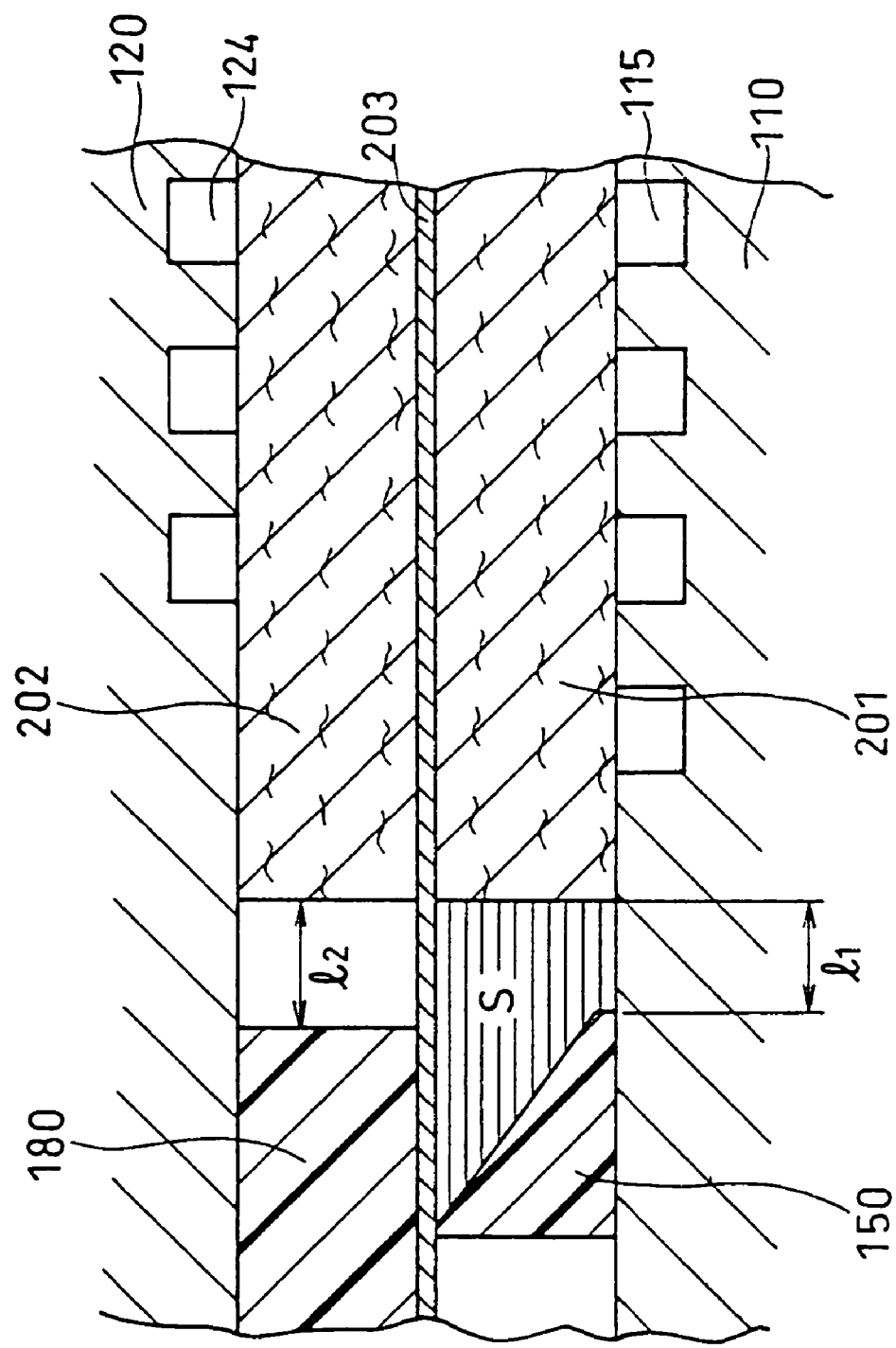
FIG. 43 is a model view of clearance between a gas diffusion layer and a sealing member.

FIG. 43 is a model of clearance between a gas diffusion layer and a sealing member. A cathode-side sealing member 150 and an anode-side sealing member 180 are located outside a cathode 201 and an anode 202 sandwiching a polymer electrolyte membrane 203, and this assembly is sandwiched between a cathode-side separator plate 110 and an anode-side separator plate 120. The clearance between the cathode 201 and the sealing member 150 is represented by $l_1$, and the clearance between the anode 202 and the sealing member 180 is represented by $l_2$. The cross section of the clearance between the cathode 201 and the sealing member 150 is represented by S. The hydraulic diameter on the cathode side is represented by the following formula:

Hydraulic diameter=(area of cross section $S$)÷(peripheral length of cross section $S$)×4.

Figure 47:
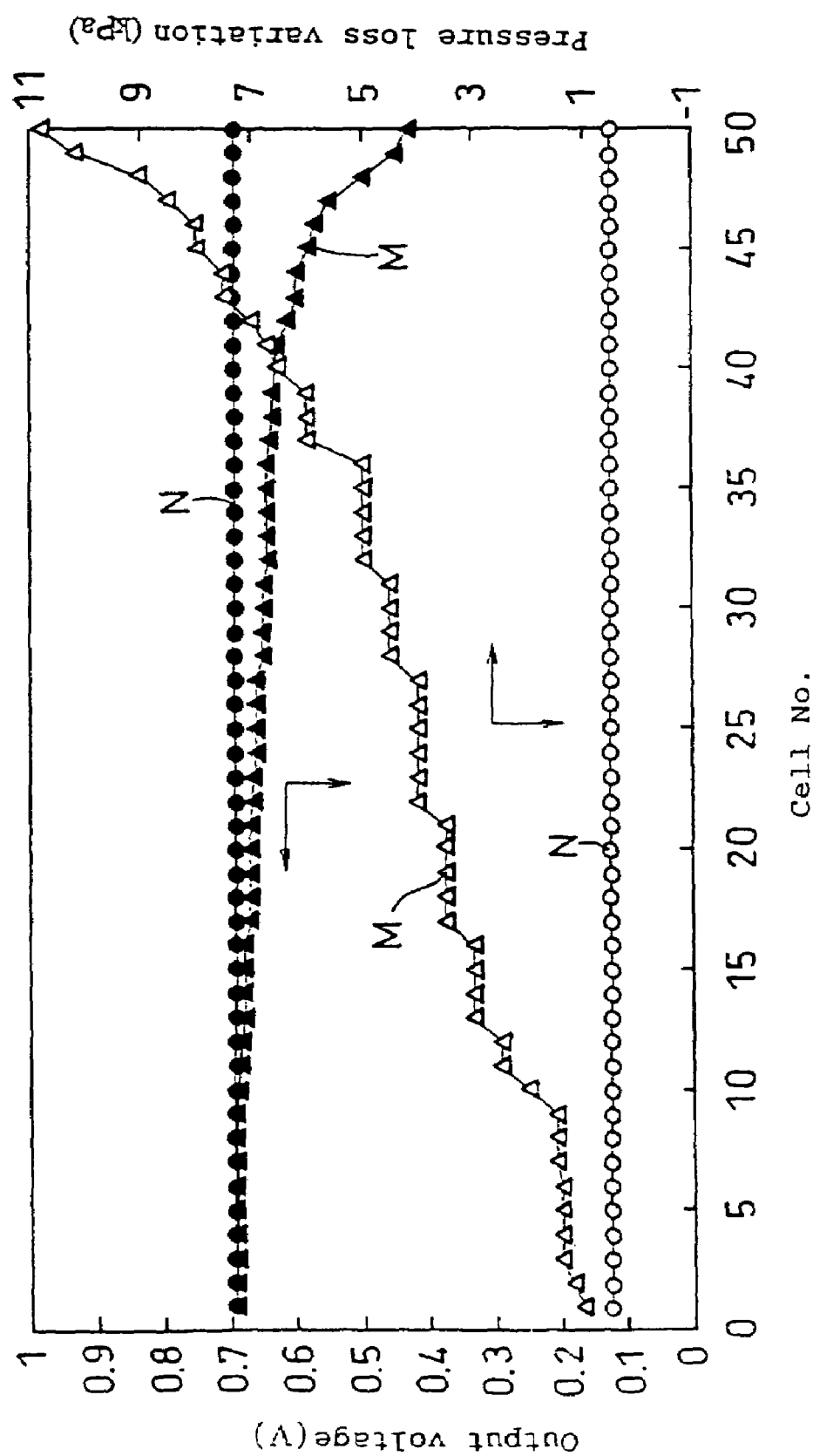
FIG. 47 is a graph showing the output characteristics of fuel cells of Example 8 of the present invention and Comparative Example 4.

FIG. 47 shows the output voltage characteristics of a fuel cell M including a stack of 50 unit cells having pressure loss variations. This fuel cell used the same separator plates as those of Example 7 and flat-plate-type sealing members. By adjusting the clearance between the gas diffusion layer and the sealing member, unit cells having pressure loss variations were selected and stacked to produce a fuel cell. The fuel cell had the same constitution as that of Example 7 except for the use of such unit cells.

FIG. 47 also shows the output voltage characteristics of a fuel cell N of a comparative example, including a stack of 50 unit cells having pressure loss variations of within 0.5 kPa. From the results of the comparative example, it was confirmed that when the pressure loss variations are small, the output voltages of the respective unit cells are uniform and have small variations. Accordingly, it was confirmed that this fuel cell has no problem with its manifold configuration and gas flow configuration in terms of even distribution of reactive gas to the respective unit cells.

When the range of the pressure loss variations increased from around 1.5 kPa, a decline in output voltage was observed. The reason of this decline is that the variations in pressure loss within the fuel cell caused an uneven distribution of reactive gas, impairing the power generating ability of the cells to which reactive gas was supplied at low flow rates. That is, it was confirmed that keeping the pressure loss variations of the unit cells, to be incorporated into the fuel cell, within 1.5 kPa is effective in increasing the output of the fuel cell and stabilizing the performance thereof.

From the relationship between the output voltage characteristics and the pressure loss variations in a fuel cell stack, as well as the relationship between the parameter ((l/d)/(L/D/P× 2)) and the pressure loss variations in a unit cell, the present inventors have found that it is important to secure a clearance satisfying the following formula (3):

$$0.27 < (l/d)/(L/D \times 2/P) \tag{3}$$

This formula defines that the hydraulic diameter d of the clearance between the sealing member and the gas diffusion layer needs to satisfy the formula (1):

$$d < (D \times l \times P)/0.54L \tag{1}$$

The results of this example indicate that the one-side clearance cl between the sealing member and the gas diffusion layer needs to be 0.25 mm or more from the viewpoints of assembling characteristics and sealing reliability, and that securing a one-side clearance, of which hydraulic diameter "d" satisfies the formula (1), is important.

Although the constitution satisfying the above requirements may have any shape, the constitution of a sealing member having a wedge-shaped cross section, as applied in Example 7, is preferable and application of this wedge-shaped cross section to a cathode-side sealing member was preferable.

EXAMPLE 9

Using the same MEAs, sealing members and separator plates as those of Example 7, 8 kinds of cell stacks were produced by stacking 20 cells in the same manner as in Example 7. Since these cell stacks differ in the clearance between the electrode and the sealing member, the pressure loss Pc in the clearance and the pressure loss Pf in the gas flow channel of the separator plate are different as shown in Table 5. Within the same cell stack, the pressure loss ratios Pc/Pf on the anode and cathode sides were designed to be the same. Cell stacks g and h had the same gas flow channel pattern as the other cell stacks, but their flow channels were larger in cross section than those of the other cell stacks.

With respect to the pressure losses in the clearance and the gas flow channel, a unit cell of each cell stack was measured in advance. The measured values were used as the pressure loss Pc in the clearance and the pressure loss Pf in the gas flow channel of the separator plate in the cell stacks. Specifically, by the difference in the flow channel pattern and the pattern of the clearance between the gas diffusion layer and the sealing member, the variations in pressure losses of unit cells were evaluated. By providing an inlet for pressure measurement on the gas inlet and outlet sides of the cell, the pressure loss was measured. In measuring the pressure in the clearance, a silicone adhesive was filled into the part of the gas flow channel of the separator plate corresponding to the electrode and applied to the gas diffusion layer to close the pores. In measuring the pressure in the gas flow channel, a silicon adhesive was filled into the clearance and applied to the gas diffusion layer to close the pores. The pressure loss was measured by supplying a dry nitrogen gas, of which reaction gas utilization was set at 40%, from the inlet-side manifold at room temperature.

TABLE 5

| | Cell stack | | | | | | | |
|---|---|---|---|---|---|---|---|---|
| | a | b | c | d | e | f | g | h |
| Pc (Pa) | 250 | 350 | 447 | 475 | 743 | 900 | 495 | 1641 |
| Pf (Pa) | 486 | 486 | 486 | 486 | 438 | 486 | 193 | 91 |
| Pc/Pf | 0.5 | 0.7 | 0.9 | 1.0 | 1.7 | 1.9 | 2.6 | 18 |
| Voltage stability | x | x | Δ | ○ | ○ | ○ | ● | ● | x means poor,
Δ slightly poor,
○ good, and
● very good.

A current collector plate and an insulator plate were attached to each end of each cell stack. The resultant stack was sandwiched between stainless steel end plates and clamped with clamping rods at a clamping load of 2,000 kgf. The surface pressure applied to the MEA and the separator plate was checked with pressure-sensitive paper, and it was found that the surface pressure applied to the MEA was 10 $kgf/cm^2$.

The resultant fuel cells were subjected to a gas leakage check under the same conditions as those of Example 1. As a result, these fuel cells were found to have no problem with respect to their sealing characteristics.

Thereafter, the respective fuel cells were operated to generate power, and the voltage stability was evaluated. The results are shown in Table 5.

The results show that the cell voltage stability changes greatly around the Pc/Pf ratio of 0.9.

Normally, the pressure loss in the clearance is designed to be large, i.e., the Pc/Pf ratio is designed to be large such that the amount of gas passing through the clearance is small. When the pressure loss in the clearance is small, i.e., when the Pc/Pf ratio is small, gas necessary for power generation passes through the clearance, and it becomes difficult for the gas to flow through the gas flow channel. As a result, gas necessary for power generation is not supplied to the electrode, resulting in voltage instability.

However, the present inventors have found that even if the Pc/Pf ratio is somewhat small, the operation of fuel cells is possible. The reasons are as follows. Under the conditions of power generation by polymer electrolyte fuel cells, gas generally contains moisture, so part of the gas becomes droplets. Thus, the flow of such gas is in the state of a two-layer flow. In cases where the Pc/Pf ratio is small, if the gas is dry, the gas flows through the gas flow channel in an amount less than the amount appropriate for the amount of power to be generated. In the state of a two-layer flow, however, Pc increases even under such conditions. Therefore, the amount of gas passing through the clearance decreases, so that the operation becomes possible.

As described above, the present inventors have found that the practically operable range is defined by the ratio of the pressure loss Pc in the clearance to the pressure loss Pf in the gas flow channel. That is, the inventors have found that it is effective that 0.9<Pc/Pf.

The foregoing description illustrates and describes the present invention with respect to only the preferred embodiments of the invention. But it is to be understood that the invention is capable of use in various other combinations, modifications, and environments. Also, the invention is capable of change or modification, within the scope of the inventive concept, that is commensurate with the above teachings and the skill or knowledge of one skilled in the relevant art.

The embodiments described herein are further intended to explain best modes known of practicing the invention and to enable others skilled in the art to utilize the invention in these and other embodiments with various modifications that may be required by the particular applications or uses of the invention. Accordingly, the description is not intended to limit the invention to the form disclosed herein.

This application is based on Japanese Patent Application No. 2003-070357 filed on Mar. 14, 2003, the entire technical contents of which are expressly incorporated by reference herein.

What is claimed is:
1. A polymer electrolyte fuel cell comprising:
a membrane electrode assembly forming a cell comprising a hydrogen-ion conductive polymer electrolyte membrane and an anode and a cathode sandwiching said polymer electrolyte membrane, each of said anode and said cathode being positioned in a substantially central part of said polymer electrolyte membrane;
an anode-side separator plate having a pair of fuel gas manifold apertures, a pair of oxidant gas manifold apertures, and a fuel gas flow channel connected to said pair of fuel gas manifold apertures for supplying and discharging a fuel gas to and from the anode;
a cathode-side separator plate having a pair of fuel gas manifold apertures, a pair of oxidant gas manifold apertures, and an oxidant gas flow channel connected to said pair of oxidant gas manifold apertures for supplying and discharging an oxidant gas to and from the cathode;
an anode-side sealing member provided on the anode-side surface of said anode-side separator plate; and
a cathode-side sealing member provided on the cathode-side surface of said cathode-side separator plate, wherein:
said membrane electrode assembly is sandwiched under pressure between said anode-side and cathode-side separator plates to form said cell,
said anode-side sealing member and said cathode-side sealing member seal the cell, in cooperation with the polymer electrolyte membrane, at sealing parts where the anode-side and cathode-side sealing members are opposed to each other, to prevent the fuel gas and the oxidant gas from leaking out of said fuel gas flow channel and said oxidant gas flow channel,
said fuel gas flow channel being positioned in a substantially central part of the separator plate, said pair of fuel gas manifold apertures and said pair of oxidant gas manifold apertures being positioned in outer parts of the separator plate relative to said fuel gas flow channel,
said oxidant gas flow channel being positioned in a substantially central part of the separator plate, said pair of fuel gas manifold apertures and said pair of oxidant gas manifold apertures being positioned in outer parts of the separator plate relative to said oxidant gas flow channel,
said polymer electrolyte membrane is large enough to cover the anode and the cathode but the edge of said polymer electrolyte membrane does not reach said fuel and oxidant gas manifold apertures,
said anode-side sealing member has a first anode-side sealing section that surrounds the anode and the fuel gas manifold apertures to form a closed loop and a second anode-side sealing section that surrounds said polymer electrolyte membrane in combination with said first anode-side sealing section, said first anode-side sealing section being in contact with said polymer electrolyte membrane at the part surrounding the anode,
said cathode-side sealing member has a first cathode-side sealing section that surrounds the cathode and the oxidant gas manifold apertures to form a closed loop and a second cathode-side sealing section that surrounds said polymer electrolyte membrane in combination with said first cathode-side sealing section, said first cathode-side sealing section being in contact with said polymer electrolyte membrane at the part surrounding the cathode,
said anode-side and cathode-side sealing sections substantially correspond in position, and said anode-side and cathode-side sealing members are sandwiched between said anode-side and cathode-side separator plates and pressed against each other or the polymer electrolyte membrane at the respective sealing sections, and at the pressed parts, one of said sealing members has a pointed rib that comes in contact with said polymer electrolyte membrane or the other sealing member in a linear manner, and the other sealing member comes in contact with said polymer electrolyte membrane or said one sealing member surface to surface.

2. The polymer electrolyte fuel cell in accordance with claim 1, wherein said one of the sealing members is so configured that the height of the rib at the part of the first sealing section not in contact with said polymer electrolyte membrane and the height of the rib at the second sealing section are greater than the height of the rib at the part of the first sealing section in contact with said polymer electrolyte membrane.

3. The polymer electrolyte fuel cell of claim 2, wherein the height of the rib at the part of the first sealing section that is in contact with the polymer electrolyte membrane is greater than the height of the rib at the part of the first sealing section not in contact with the polymer electrolyte membrane by approximately the thickness of the polymer electrolyte membrane or more.

4. The polymer electrolyte fuel cell in accordance with claim 1, wherein the ratio of pressure loss Pc in the clearance between the electrode and the sealing members to pressure loss Pf in the gas flow channel adjacent to the electrode is greater than 0.9.

5. The polymer electrolyte fuel cell in accordance with claim 1 wherein at least one of the anode-side and cathode separator plates has a main surface covered with the corresponding sealing member.

6. The polymer electrolyte fuel cell in accordance with claim 1, wherein at least one of the anode-side and cathode-side sealing members is molded on the corresponding separator plate.

7. The polymer electrolyte fuel cell in accordance with claim 1, wherein at least one of the anode-side and cathode-side sealing members is fitted to the corresponding separator plate.

8. The polymer electrolyte fuel cell in accordance with claim 1, wherein at least one of the anode-side and cathode-side sealing members is bonded to the corresponding separator plate.

9. The polymer electrolyte fuel cell in accordance with claim 1, wherein:

the first anode-side sealing section includes: an electrode sealing part mostly surrounding the fuel gas flow channel, manifold aperture sealing parts surrounding the outer half of the fuel gas manifold apertures, and sealing parts located on both sides of each of connection grooves connecting the fuel gas manifold apertures to the fuel gas flow channel;

the first cathode-side sealing section includes: an electrode sealing part mostly surrounding the oxidant gas flow channel, manifold aperture sealing parts surrounding the outer half of the oxidant gas manifold apertures, and sealing parts located on both sides of each of connection grooves connecting the oxidant gas manifold apertures to the oxidant gas flow channel; and said anode-side and cathode-side sealing sections correspond in position except:

the sealing parts of the anode-side sealing section located on both sides of each of the connection grooves connecting the fuel gas manifold apertures to the fuel gas flow channel;

the parts of the anode-side sealing section located between the oxidant gas manifold apertures and the fuel gas flow channel;

the sealing parts of the cathode-side sealing section located on both sides of each of the connection grooves connecting the oxidant gas manifold apertures to the oxidant gas flow channel; and the parts of the cathode-side sealing section located between the fuel gas manifold apertures and the oxidant gas flow channel.

10. A polymer electrolyte fuel cell comprising:

a membrane electrode assembly forming a cell comprising a hydrogen-ion conductive polymer electrolyte membrane and an anode and a cathode sandwiching said polymer electrolyte membrane, each of said anode and said cathode being positioned in a substantially central part of said polymer electrolyte membrane;

an anode-side separator plate having a pair of fuel gas manifold apertures, a pair of oxidant gas manifold apertures, and a fuel gas flow channel connected to said pair of fuel gas manifold apertures for supplying and discharging a fuel gas to and from the anode;

a cathode-side separator plate having a pair of fuel gas manifold apertures, a pair of oxidant gas manifold apertures, and an oxidant gas flow channel connected to said pair of oxidant gas manifold apertures for supplying and discharging an oxidant gas to and from the cathode;

an anode-side sealing member provided on the anode-side surface of said anode-side separator plate; and a cathode-side sealing member provided on the cathode-side surface of said cathode-side separator plate, wherein:

said membrane electrode assembly being sandwiched under pressure between said anode-side and cathode-side separator plates to form said cell, said anode-side sealing member and said cathode-side sealing member seal the cell, in cooperation with the polymer electrolyte membrane, at sealing parts where the anode-side and cathode-side sealing members are opposed to each other, to prevent the fuel gas and the oxidant gas from leaking out of said fuel gas flow channel and said oxidant gas flow channel, said fuel gas flow channel being positioned in a substantially central part of the separator plate, said pair of fuel gas manifold apertures and said pair of oxidant gas manifold apertures being positioned in outer parts of the separator plate relative to said fuel gas flow channel, said oxidant gas flow channel being positioned in a substantially central part of the separator plate, said pair of fuel gas manifold apertures and said pair of oxidant gas manifold apertures being positioned in outer parts of the separator plate relative to said oxidant gas flow channel, one of said sealing members has a pointed rib that contacts said sealing parts in a linear manner, and the other of said sealing members contacts said sealing parts surface-to-surface, said anode-side sealing member includes a part surrounding said anode and said cathode sealing member includes a part surrounding said cathode, the rib of said one of the sealing members is, at said anode or cathode surrounding part, shaped like a wedge of which cross section is thin on the inner side and thick on the outer side, and the wedge-shaped rib is provided along the edge of the electrode so that the electrode is surrounded by the wedge-shaped rib.

11. The polymer electrolyte fuel cell in accordance with claim 10, wherein one-side clearance cl between said cathode and said cathode surrounding part of said cathode-side sealing member and a hydraulic diameter d of the clearance cl satisfy the formula: $d < (D \times l \times P)/0.54L$, wherein l is the length of the clearance cl, L is the length of the oxidant gas flow channel per one path of the cathode-side separator plate, D is the hydraulic diameter of the oxidant gas flow channel per one path of the cathode-side separator plate, P is the number of paths of the oxidant gas flow channel of the cathode-side separator plate, and the hydraulic diameter d=(cross section of the clearance)÷(peripheral length of the cross section)×4.

12. The polymer electrolyte fuel cell in accordance with claim 11, wherein the one-side clearance cl satisfies the formula: 0.25 mm<cl.

13. The polymer electrolyte fuel cell in accordance with claim 10, wherein:

the cathode-side sealing member comprises: (a) a first part that surrounds said oxidant gas flow channel and said pair of oxidant gas manifold apertures to form a closed loop; (b) a pair of second parts that surround each of said pair of fuel gas manifold apertures to form closed loops; and (c) third parts that connect the first part with the second part, the first part is shaped like a wedge of which cross section is thin on the inner side and thick on the outer side, and the second parts are shaped like a wedge of which cross section is thick on the inner side and thin on the outer side, and the wedge-shaped rib is provided along the edge of the electrode but not around the whole perimeter of the electrode.

14. The polymer electrolyte fuel cell in accordance with claim 10, wherein the ratio of pressure loss Pc in the clearance between the electrode and the sealing member to pressure loss Pf in the gas flow channel adjacent to the electrode is greater than 0.9.

15. The polymer electrolyte fuel cell in accordance with claim 10, wherein at least one of the anode-side and cathode separator plates has a main surface covered with the corresponding sealing member.

16. The polymer electrolyte fuel cell in accordance with claim 10, wherein at least one of the anode-side and cathode-side sealing members is molded on the corresponding separator plate.

17. The polymer electrolyte fuel cell in accordance with claim 10, wherein at least one of the anode-side and cathode-side sealing members is fitted to the corresponding separator plate.

18. The polymer electrolyte fuel cell in accordance with claim 10, wherein at least one of the anode-side and cathode-side sealing members is bonded to the corresponding separator plate.

19. A polymer electrolyte fuel cell comprising:

a membrane electrode assembly forming a cell comprising a hydrogen-ion conductive polymer electrolyte membrane and an anode and a cathode sandwiching said polymer electrolyte membrane, each of said anode and said cathode being positioned in a substantially central part of said polymer electrolyte membrane;

an anode-side separator plate having a pair of fuel gas manifold apertures, a pair of oxidant gas manifold apertures, and a fuel gas flow channel connected to said pair of fuel gas manifold apertures for supplying and discharging a fuel gas to and from the anode;

a cathode-side separator plate having a pair of fuel gas manifold apertures, a pair of oxidant gas manifold apertures, and an oxidant gas flow channel connected to said pair of oxidant gas manifold apertures for supplying and discharging an oxidant gas to and from the cathode;

an anode-side sealing member provided on the anode-side surface of said anode-side separator plate; and a cathode-side sealing member provided on the cathode-side surface of said cathode-side separator plate, wherein:

said membrane electrode assembly being sandwiched under pressure between said anode-side and cathode-side separator plates to form said cell, said anode-side sealing member and said cathode-side sealing member seal the cell, in cooperation with the polymer electrolyte membrane, at sealing parts where the anode-side and cathode-side sealing members are opposed to each other, to prevent the fuel gas and the oxidant gas from leaking out of said fuel gas flow channel and said oxidant gas flow channel, said fuel gas flow channel being positioned in a substantially central part of the separator plate, said pair of fuel gas manifold apertures and said pair of oxidant gas manifold apertures being positioned in outer parts of the separator plate relative to said fuel gas flow channel, said oxidant gas flow channel being positioned in a substantially central part of the separator plate, said pair of fuel gas manifold apertures and said pair of oxidant gas manifold apertures being positioned in outer parts of the separator plate relative to said oxidant gas flow channel, one of said sealing members has a pointed rib that contacts said sealing parts in a linear manner, and the other of said sealing members contacts said sealing parts surface-to-surface, said anode-side sealing member includes a sealing part that surrounds said fuel gas flow channel and said fuel gas manifold apertures to form a closed anode loop, and said cathode-side sealing member includes a sealing part that surrounds said oxidant gas flow channel and said oxidant gas manifold apertures to form a closed cathode loop, the rib of the part of said anode or cathode loop surrounding the gas flow channel is shaped like a wedge of which cross section is thin on the inner side and thick on the outer side, and the wedge-shaped rib is provided along the edge of the electrode but not around the whole perimeter of the electrode.

20. The polymer electrolyte fuel cell in accordance with claim 19, wherein:

the cathode-side sealing member comprises: (a) a first part that surrounds said oxidant gas flow channel and said pair of oxidant gas manifold apertures to form a closed loop; (b) a pair of second parts that surround each of said pair of fuel gas manifold apertures to form closed loops; and (c) third parts that connect the first part with the second part, and the first part is shaped like a wedge of which cross section is thin on the inner side and thick on the outer side, and the second parts are shaped like a wedge of which cross section is thick on the inner side and thin on the outer side.

21. The polymer electrolyte fuel cell in accordance with claim 19, wherein the ratio of pressure loss Pc in the clearance between the electrode and the sealing members to pressure loss Pf in the gas flow channel adjacent to the electrode is greater than 0.9.

22. The polymer electrolyte fuel cell in accordance with claim 19, wherein at least one of the anode-side and cathode separator plates has a main surface covered with the corresponding sealing member.

23. The polymer electrolyte fuel cell in accordance with claim 19, wherein at least one of the anode-side and cathode-side sealing members is molded on the corresponding separator plate.

24. The polymer electrolyte fuel cell in accordance with claim 19, wherein at least one of the anode-side and cathode-side sealing members is fitted to the corresponding separator plate.

25. The polymer electrolyte fuel cell in accordance with claim 19, wherein at least one of the anode-side and cathode-side sealing members is bonded to the corresponding separator plate.

26. The polymer electrolyte fuel cell in accordance with claim 19, wherein one-side clearance cl between said cathode and said cathode surrounding part of said cathode-side sealing member and a hydraulic diameter d of the clearance cl satisfy the formula: $d < (D \times l \times P)/0.54L$,
wherein l is the length of the clearance cl, L is the length of the oxidant gas flow channel per one path of the cathode-side separator plate, D is the hydraulic diameter of the oxidant gas flow channel per one path of the cathode-side separator plate, P is the number of paths of the oxidant gas flow channel of the cathode-side separator plate, and the hydraulic diameter d=(cross section of the clearance)÷(peripheral length of the cross section)×4.

27. The polymer electrolyte fuel cell in accordance with claim 26, wherein the one-side clearance cl satisfies the formula: 0.25 mm<cl.

28. A polymer electrolyte fuel cell comprising:
a membrane electrode assembly forming a cell comprising a hydrogen-ion conductive polymer electrolyte membrane and an anode and a cathode sandwiching said polymer electrolyte membrane;
an anode-side separator plate having a pair of fuel gas manifold apertures, a pair of oxidant gas manifold apertures, and a fuel gas flow channel connected to said pair of fuel gas manifold apertures for supplying and discharging a fuel gas to and from the anode;
a cathode-side separator plate having a pair of fuel gas manifold apertures, a pair of oxidant gas manifold apertures, and an oxidant gas flow channel connected to said pair of oxidant gas manifold apertures for supplying and discharging an oxidant gas to and from the cathode;
an anode-side sealing member provided on the anode-side surface of said anode-side separator plate; and
a cathode-side sealing member provided on the cathode-side surface of said cathode-side separator plate, wherein:
said membrane electrode assembly being sandwiched under pressure between said anode-side and cathode-side separator plates to form said cell,
said anode-side sealing member and said cathode-side sealing member seal the cell, in cooperation with the polymer electrolyte membrane, at sealing parts where the anode-side and cathode-side sealing members are opposed to each other, to prevent the fuel gas and the oxidant gas from leaking out of said fuel gas flow channel and said oxidant gas flow channel,
one of said sealing members has a pointed rib that contacts said sealing parts in a linear manner, and the other of said sealing members contacts said sealing parts surface-to-surface, and
said anode-side and cathode-side sealing members have a three-layered structure of a resin film, an adhesive layer formed on a separator side of said resin film, and a rubber layer formed on a face of said resin film opposite to said adhesive layer.

29. A polymer electrolyte fuel cell comprising:
a membrane electrode assembly forming a cell comprising a hydrogen-ion conductive polymer electrolyte membrane and an anode and a cathode sandwiching said polymer electrolyte membrane;
an anode-side separator plate having a pair of fuel gas manifold apertures, a pair of oxidant gas manifold apertures, and a fuel gas flow channel connected to said pair of fuel gas manifold apertures for supplying and discharging a fuel gas to and from the anode;
a cathode-side separator plate having a pair of fuel gas manifold apertures, a pair of oxidant gas manifold apertures, and an oxidant gas flow channel connected to said pair of oxidant gas manifold apertures for supplying and discharging an oxidant gas to and from the cathode;
an anode-side sealing member provided on the anode-side surface of said anode-side separator plate; and
a cathode-side sealing member provided on the cathode-side surface of said cathode-side separator plate, wherein:
said membrane electrode assembly being sandwiched under pressure between said anode-side and cathode-side separator plates to form said cell,
said anode-side sealing member and said cathode-side sealing member seal the cell, in cooperation with the polymer electrolyte membrane, at sealing parts where the anode-side and cathode-side sealing members are opposed to each other, to prevent the fuel gas and the oxidant gas from leaking out of said fuel gas flow channel and said oxidant gas flow channel,
one of said sealing members has a pointed rib that contacts said sealing parts in a linear manner, and the other of said sealing members contacts said sealing parts surface-to-surface,
the pair of anode-side and cathode-side sealing members comprises:
anode-side and cathode-side electrode sealing parts that sandwich the polymer electrolyte membrane around the anode and the cathode;
anode-side and cathode-side manifold aperture sealing parts that sandwich the polymer electrolyte membrane around the anode-side and cathode-side fuel gas manifold apertures and the anode-side and cathode-side oxidant gas manifold apertures; and
anode-side and cathode-side connection groove sealing parts that sandwich the polymer electrolyte membrane on both sides of respective connection grooves connecting the fuel gas flow channel to the anode-side fuel gas manifold apertures and connecting the oxidant gas flow channel to the cathode-side oxidant gas manifold apertures,
the anode-side sealing member comprises a first anode-side sealing section that surrounds the fuel gas flow channel and the pair of anode-side fuel gas manifold apertures to form a closed loop,
the anode-side and cathode-side manifold aperture sealing parts each comprises:
anode-side oxidant gas manifold aperture sealing parts that surround the anode-side oxidant gas manifold apertures;

anode-side cooling water manifold aperture sealing parts that surround a pair of anode-side cooling water manifold apertures; and the first anode-side sealing section comprises:
the anode-side electrode sealing part, which surrounds the fuel gas flow channel;
anode-side fuel gas ones of the anode-side manifold aperture sealing parts that surround the outer half of the anode-side fuel gas manifold apertures; and
the anode-side connection groove sealing parts located on both sides of the anode-side connection grooves, the anode-side sealing member comprises a second anode-side sealing section that forms a closed loop in combination with the anode-side fuel gas manifold aperture sealing parts of the first anode-side sealing section, and the anode-side oxidant gas and cooling water apertures are located outside the closed loop.

30. The polymer electrolyte fuel cell of claim 29, wherein the anode-side sealing member separates:
the anode-side fuel gas manifold apertures from the anode, with the anode-side manifold aperture sealing part and the anode-side electrode sealing part, which surrounds the anode; and
the anode-side oxidant gas manifold apertures from the anode, with the anode-side manifold aperture sealing part and the anode-side electrode sealing part.

31. The polymer electrolyte fuel cell of claim 29, wherein the anode-side sealing member separates the anode-side fuel gas and oxidant gas manifold apertures from the anode with the anode-side manifold aperture sealing part.

32. The polymer electrolyte fuel cell of claim 29, wherein the anode-side sealing member separates the anode-side fuel gas and oxidant gas manifold apertures from the anode with the anode-side electrode sealing part, which surrounds the anode.

33. The polymer electrolyte fuel cell of claim 29, wherein the cathode-side sealing member covers the whole main surface of the cathode-side separator plate, including the cathode-side electrode sealing part, the cathode-side manifold aperture sealing part, and the cathode-side connection groove sealing part.

34. The polymer electrolyte fuel cell of claim 29, wherein the cathode-side sealing member is approximately the same size as the anode-side sealing member.

35. The polymer electrolyte fuel cell of claim 29, wherein the anode-side sealing member comprises first, second, third, and fourth sealing parts, wherein:
the first sealing parts connect the anode-side fuel gas manifold aperture sealing parts with the anode-side oxidant gas manifold aperture sealing parts;
the second sealing parts connect the anode-side fuel gas manifold aperture sealing parts with the anode-side cooling water manifold aperture sealing parts;
the third sealing parts connect the anode-side oxidant gas manifold aperture sealing parts with anode-side spare manifold aperture sealing parts; and
the fourth sealing parts connect the anode-side cooling water manifold aperture sealing parts with the anode-side spare manifold aperture sealing parts.

36. A polymer electrolyte fuel cell comprising:
a membrane electrode assembly forming a cell comprising a hydrogen-ion conductive polymer electrolyte membrane and an anode and a cathode sandwiching said polymer electrolyte membrane;
an anode-side separator plate having a pair of fuel gas manifold apertures, a pair of oxidant gas manifold apertures, and a fuel gas flow channel connected to said pair of fuel gas manifold apertures for supplying and discharging a fuel gas to and from the anode;
a cathode-side separator plate having a pair of fuel gas manifold apertures, a pair of oxidant gas manifold apertures, and an oxidant gas flow channel connected to said pair of oxidant gas manifold apertures for supplying and discharging an oxidant gas to and from the cathode;
an anode-side sealing member provided on the anode-side surface of said anode-side separator plate; and
a cathode-side sealing member provided on the cathode-side surface of said cathode-side separator plate, wherein:
said membrane electrode assembly being sandwiched under pressure between said anode-side and cathode-side separator plates to form said cell,
said anode-side sealing member and said cathode-side sealing member seal the cell, in cooperation with the polymer electrolyte membrane, at sealing parts where the anode-side and cathode-side sealing members are opposed to each other, to prevent the fuel gas and the oxidant gas from leaking out of said fuel gas flow channel and said oxidant gas flow channel,
one of said sealing members has a pointed rib that contacts said sealing parts in a linear manner, and the other of said sealing members contacts said sealing parts surface-to-surface,
the cathode-side sealing member comprises a first cathode-side sealing section that surrounds the oxidant gas flow channel and the pair of cathode-side oxidant gas manifold apertures to form a closed loop,
the cathode-side sealing member further comprises:
cathode-side fuel gas manifold aperture sealing parts that surround the cathode-side fuel gas manifold apertures;
cathode-side cooling water manifold aperture sealing parts that surround a pair of cathode-side cooling water manifold apertures; and
first cathode-side sealing parts located on both sides of each of a plurality of connection grooves of the anode-side separator plate, which connection grooves connect the anode-side fuel gas manifold apertures to the fuel gas flow channel,
the first cathode-side sealing section comprises:
a cathode-side electrode sealing part that surrounds the oxidant gas flow channel; and
cathode-side oxidant gas manifold aperture sealing parts surrounding the outer half of the cathode-side oxidant gas manifold apertures,
the cathode-side sealing parts are located on both sides of each of a plurality of cathode-side connection grooves that connect the cathode-side oxidant gas manifold apertures to the oxidant gas flow channel,
a second cathode-side sealing section comprises:
cathode-side manifold aperture sealing parts; and
second cathode-side sealing parts connecting the cathode-side manifold aperture sealing parts,
the second sealing section forms a closed loop in combination with the cathode-side oxidant gas manifold aperture sealing parts of the first cathode-side sealing section, and
the cathode-side fuel gas and cooling water apertures are located outside the closed loop.

37. The polymer electrolyte fuel cell of claim 36, wherein the cathode-side sealing member has a flat surface on a major planar side facing the anode-side separator plate and is mounted along a sealing member groove of the cathode-side separator plate, which sealing member groove receives the cathode-side sealing member.

38. The polymer electrolyte fuel cell of claim 36, wherein the cathode-side sealing member further comprises first, second, third, and fourth sealing parts, wherein:

the first sealing parts connect the cathode-side fuel gas manifold aperture sealing parts with the cathode-side oxidant gas manifold aperture sealing parts;

the second sealing parts connect the cathode-side fuel gas manifold aperture sealing parts with the cathode-side cooling water manifold aperture sealing parts;

the third sealing parts connect the cathode-side oxidant gas manifold aperture sealing parts with cathode-side spare manifold aperture sealing parts; and the fourth sealing parts connect the cathode-side cooling water manifold aperture sealing parts with the cathode-side spare manifold aperture sealing parts.

* * * * *